(12) United States Patent
Betensky et al.

(10) Patent No.: US 6,961,188 B2
(45) Date of Patent: Nov. 1, 2005

(54) ZOOM LENS SYSTEM

(75) Inventors: Ellis I. Betensky, Halifax (CA); James Brian Caldwell, Hallandale Beach, FL (US); Iain A. Neil, Calabasas, CA (US); Takanori Yamanashi, Woodland Hills, CA (US)

(73) Assignee: Panavision Inc., Woodland Hills, CA (US)

( * ) Notice: Subject to any disclaimer, the term of this patent is extended or adjusted under 35 U.S.C. 154(b) by 130 days.

(21) Appl. No.: 10/622,914

(22) Filed: Jul. 18, 2003

(65) Prior Publication Data
US 2004/0021953 A1 Feb. 5, 2004

Related U.S. Application Data
(60) Provisional application No. 60/397,882, filed on Jul. 22, 2002.

(51) Int. Cl.[7] ................................. G02C 15/14
(52) U.S. Cl. .................. 359/676; 359/432; 359/683; 359/689
(58) Field of Search ................. 359/676, 683, 359/689, 432

(56) References Cited

U.S. PATENT DOCUMENTS

| | | |
|---|---|---|
| 2,454,686 A | 11/1948 | Back |
| 3,192,829 A | 7/1965 | Yamaji |
| 3,947,084 A | 3/1976 | Noyes |
| 3,970,366 A | 7/1976 | Sekiguchi |
| 4,033,674 A | 7/1977 | Sekiguchi |
| 4,411,488 A | 10/1983 | Neil |
| 4,676,581 A * | 6/1987 | Roberts ............ 359/354 |
| 4,909,614 A | 3/1990 | Itoh et al. |
| 4,971,428 A | 11/1990 | Moskovich |
| 5,194,886 A | 3/1993 | Mukai et al. |
| 5,270,857 A | 12/1993 | Oizumi et al. |
| 5,448,411 A | 9/1995 | Morooka |
| 5,721,641 A | 2/1998 | Aoki |
| 5,771,123 A | 6/1998 | Hamano |
| 5,790,309 A | 8/1998 | Ohtake |
| 5,835,272 A | 11/1998 | Kodama |
| 6,157,494 A | 12/2000 | Nagata |

OTHER PUBLICATIONS

"Lens mechanism technology," by D.F. Horne, *Crane, Russak & Company, Inc., New York*, Oct. 1975.

"Zoom Lenses II," by Ellis I. Betensky et al., *Proceedings of SPIE–The International Society for Optical Engineering*, SPIE vol. 3129, Jul. 28–29, 1997 (pp 90–96).

"Selected Papers on Zoom Lenses," by Allen Mann, *SPIE Optical Engineering Press*, SPIE Milestone Series, vol. MS85, Copyright 1993 (entire book).

"Zoom Lenses," by Allen Mann, *Proceedings, SPIE–The International Society for Optical Engineering*, vol. 2539, Jul. 11–12 1995 (entire vol.).

"Zoom Lenses," by Iain a. Neil et al., *Proceedings Of SPIE–The International Society for Optical Engineering*, vol. 4487, Jul. 31, 2001 (entire vol.).

* cited by examiner

Primary Examiner—Scott J. Sugarman
(74) Attorney, Agent, or Firm—Morrison & Foerster LLP

(57) ABSTRACT

A zoom lens system is disclosed. The zoom lens system forms a final image of an object and a first intermediate real image between the object and the final image. The zoom lens system includes a first optical unit located between the object and the first intermediate real image. The first optical unit comprises at least one optical subunit which is moved to change the size (magnification) of the first intermediate real image. The zoom lens system also includes a second optical unit located between the first intermediate real image and the final image, at least a portion of which is moved to change the size (magnification) of the final image. The zoom lens system provides a wide zoom range of focal lengths with continuous zooming between the focal lengths and optional image stabilization.

161 Claims, 76 Drawing Sheets

POSITION 2

POSITION 4

POSITION 8

POSITION 10

POSITION 12

POSITION 13

POSITION 15

POSITION 17

POSITION 20

POSITION 12

POSITION 15

RAY ABERRATIONS (MILLIMETERS)
POSITION 3

RAY ABERRATIONS (MILLIMETERS)
POSITION 5

- - - - - - - - - 643.8469 NM
- - - - - - - - - 587.5600 NM
——————— 546.0700 NM
- - - - - - - - - 486.1300 NM
- - - - - - - - - 460.0000 NM

RAY ABERRATIONS (MILLIMETERS)
POSITION 7

RAY ABERRATIONS (MILLIMETERS)
POSITION 8

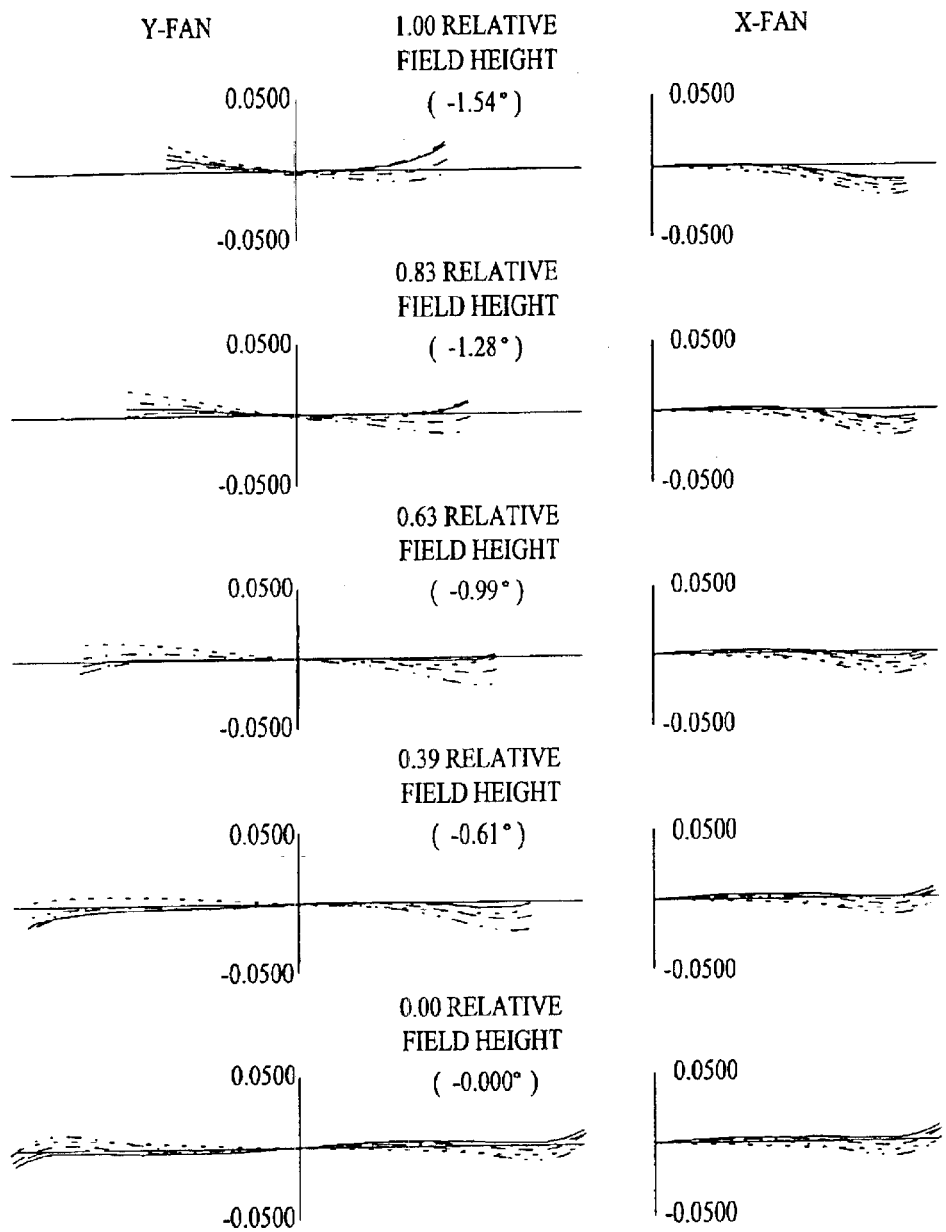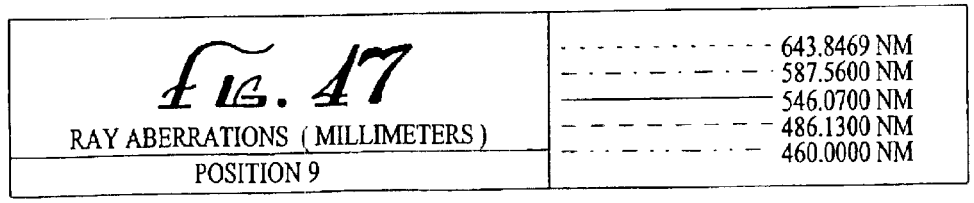

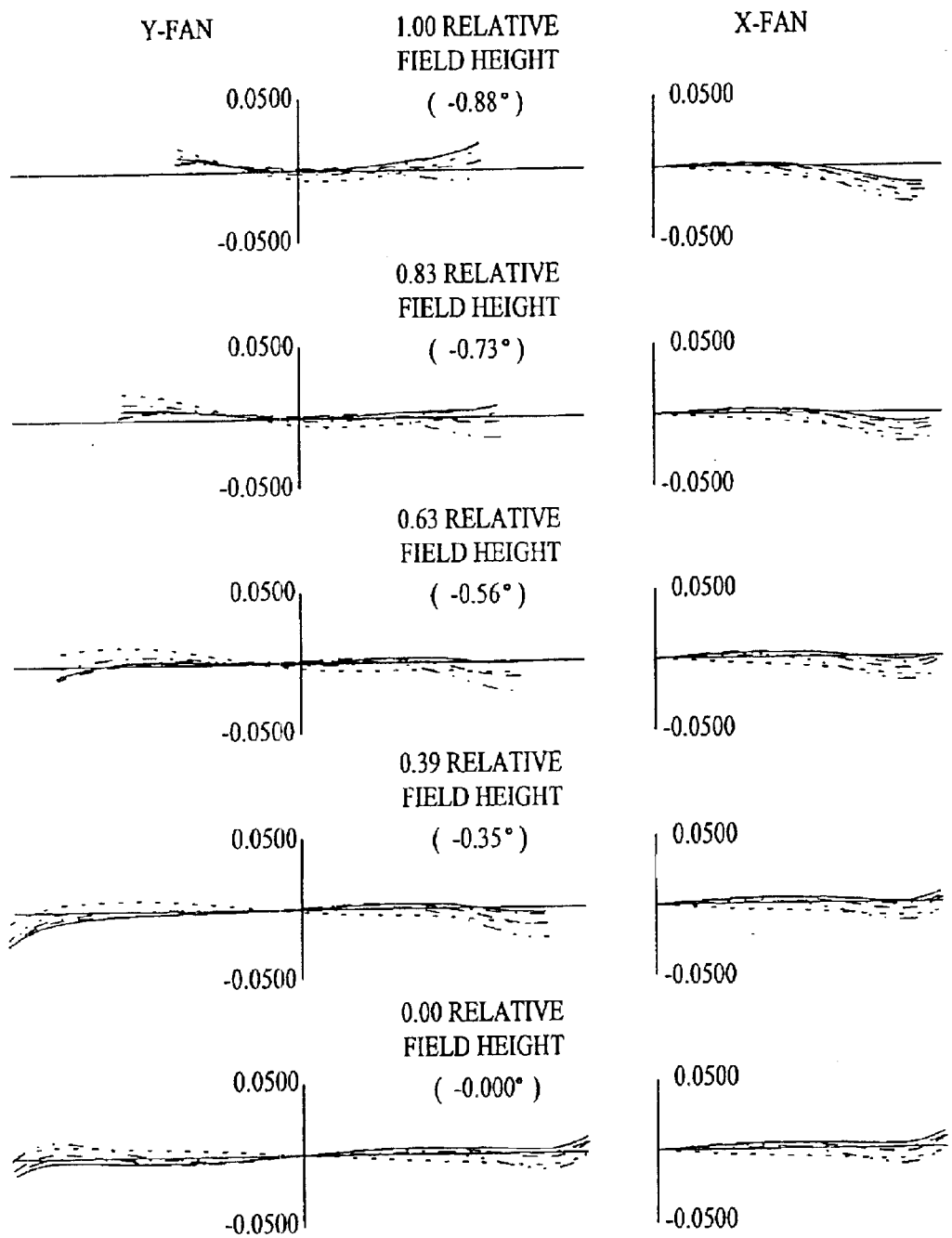

RAY ABERRATIONS (MILLIMETERS)
POSITION 11

Fig. 53 RAY ABERRATIONS (MILLIMETERS) POSITION 15

RAY ABERRATIONS (MILLIMETERS)
POSITION 17

RAY ABERRATIONS (MILLIMETERS)
POSITION 19

- - - - - - - - 643.8469 NM
— - — - — - — 587.5600 NM
——————— 546.0700 NM
— — — — — — 486.1300 NM
- - — - - — - 460.0000 NM

FOCUS CAM GRAPH

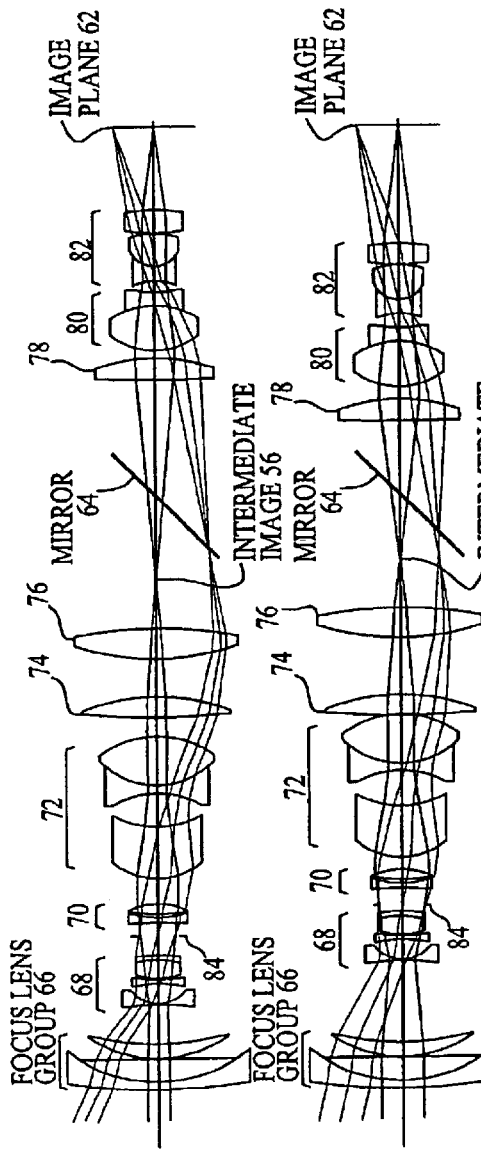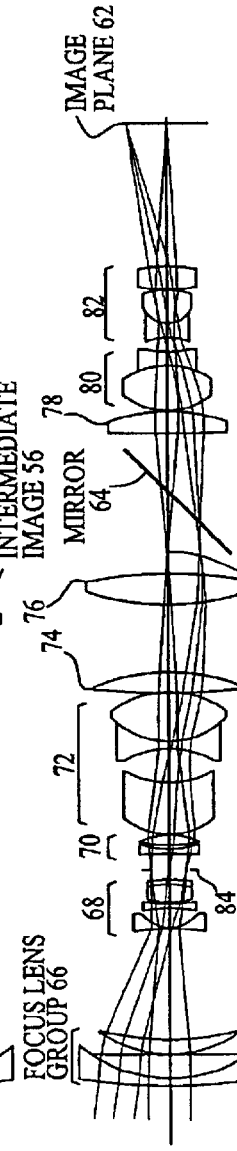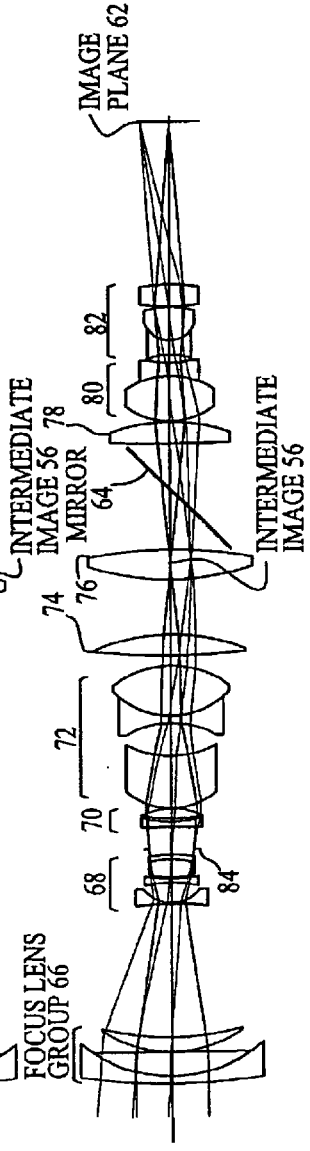

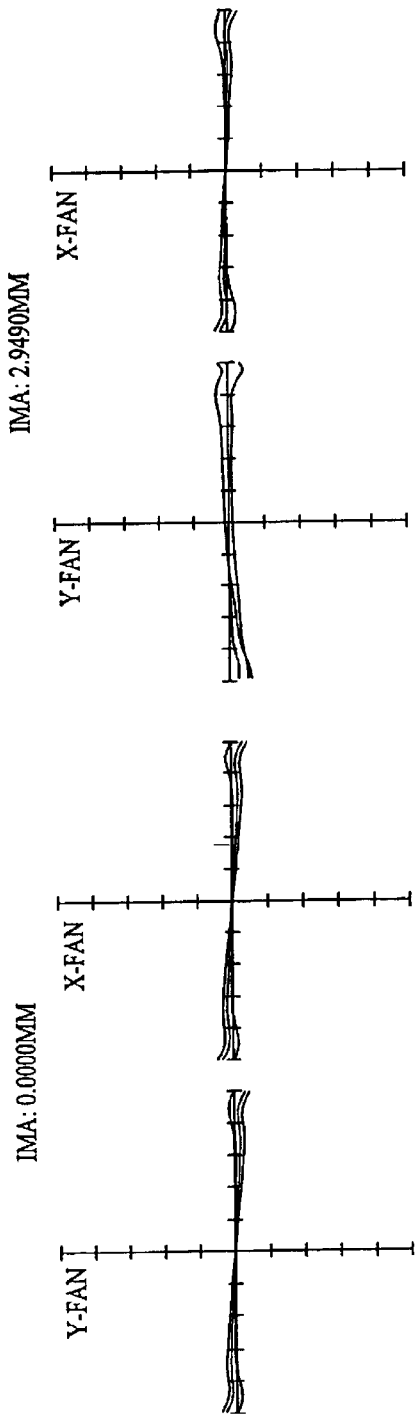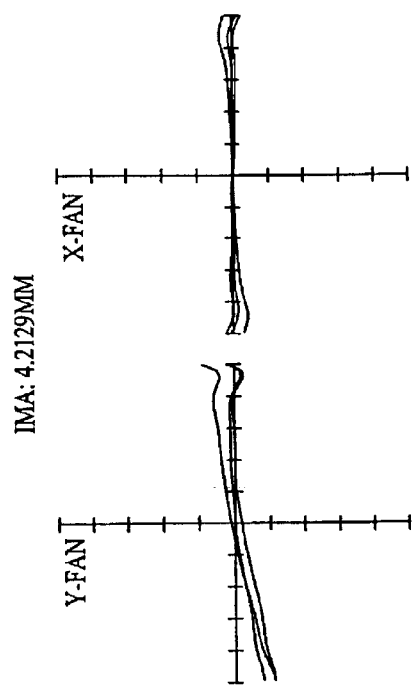
FIG. 74
WAVELENGTH RANGE 8-12 MICRONS
MAXIMUM VERTICAL SCALE +/- 200 MICRONS

WAVELENGTH RANGE 8-12 MICRONS
MAXIMUM VERTICAL SCALE +/- 200 MICRONS

ZOOM LENS SYSTEM

CROSS-REFERENCE TO RELATED APPLICATION

This application claims the benefit of U.S. Provisional Application No. 60/397,882, filed Jul. 22, 2002, which application is specifically incorporated herein, in its entirety, by reference.

BACKGROUND OF THE INVENTION

1. Field of the Invention

This invention relates to optical lens systems for cameras and other optical devices, and, in particular, to high performance zoom lens systems that produce a high quality image over a full zoom range of focal lengths and are capable of being provided with an extremely large zoom ratio.

2. Description of Related Art

General Background of the Invention. The use of zoom lens systems for all types of photography, such as broadcast television, high definition television ("HDTV"), advanced television ("ATV"), video camcorders, film cinematography and still photography has become increasingly popular. As the use of zoom lens systems has increased, the demand for wider ranges of zooming capability, i.e. large zoom ratios, has also increased. For example, the zoom lens systems used in broadcast television have steadily increased in zoom ratio capability over the years to a maximum of about 101 to 1 at present but there is a demand for a still larger zoom ratio. While the focal length range of a conventional zoom lens system may be increased by the use of a drop-in extender or other multiplier, such as a broadcast television zoom lens system with a focal length range of 8.9 mm to 900 mm being increased to 17.8 mm to 1800 mm to increase the telephoto capability, this does not change the zoom ratio of about 101 to 1. Moreover, for broadcast television zoom lens systems there are somewhat different requirements for "studio" (indoor) or "outside broadcast" (outdoor) use concerning the focal length range and acceptable "f" numbers, whereby it has become conventional practice to employ two different zoom lens systems for indoor and outdoor broadcast television uses to maximize the capabilities for both types of uses.

Further, in addition to the demand and desirability of using zoom lens systems with wider ranges of focal lengths, such lenses must retain superior optical characteristics and performance that previously has been accomplished only by using separate objective lenses of different fixed focal lengths or zoom lens systems with a limited zoom ratio. As the zoom ratio increases, the difficulty in providing a high performance optical system with superior characteristics and performance also increases. Even most previously available zoom lens systems of a limited zoom range have one or more undesirable limitations such as the inability to focus adequately over the entire focal length range, the inability to focus on close objects, the lack of adequate optical performance over the entire focal length range and focus distance, the cost, the large size for the limited zoom range achieved and the like.

Still further, as the zoom range of a lens system increases, generally the length and weight increases whereby the difficulty in maintaining the lens and camera steady also increases. Therefore image stabilization also becomes an issue for the design of a practical zoom lens system having a large focal length range and zoom ratio.

Moreover, as the focal length range of a zoom lens system increases, generally the focusing problems also increase. Although close focusing at long focal lengths of the zoom range is not absolutely necessary, it is required at lesser focal lengths. In the past, continuous focusing over a considerable conjugate range from infinity to objects at a very short distance such as about 8 feet or less has been difficult to achieve. Further, the problem of "breathing" of the final image (where the perceived size changes as the focus distance is changed) at shorter focal lengths must be minimized to avoid, for example, one person disappearing from the scene as the focus is changed to another person at a different distance from the lens. These focus performance requirements, including maintaining the quality of the final image, tend to increase substantially the weight and cost of the zoom lens system unless the size can be minimized and performance maximized by the overall lens design, including glass selection.

Background Information Concerning Zooming. As discussed above, zoom lens systems with a wide-range of focal lengths are very desirable in numerous photographic applications, including broadcast television, cinematography and video and still photography. One standard zoom lens system used in these applications has a four-group PN(P or N)P structure, where P stands for a group of at least one lens element wherein the lens group has positive power, N stands for a group of at least one lens element wherein the lens group has negative power, and the groups are identified consecutively from the object space toward the image space, as is conventional. The front positive group is often called the focusing group because it can be moved for focusing the zoom lens system at any focal length position without the need to refocus for any other focal length of the zoom lens. The second negative group is the variator, and it induces significant magnification change during zooming. The third group, which can in general have either positive or negative power, is the compensator, and it is movable to insure that the image plane remains stationary. It also can provide some of the magnification change to effect zooming. The final positive fourth group is often called the prime lens group because it forms a sharp image.

This basic zoom lens system is suitable for zoom ratios of 50:1 or even more. As the zoom ratio is extended to about 100:1, however, the variator is required to change its object magnification to such an extent during zooming that aberrations become impracticably large and difficult to correct. In addition, at such large zoom ratios there is a very large change in entrance pupil location during zooming, and this tends to make the front group very large and difficult to correct. Another problem derives from the fact that, to reduce the aberration change that results from a large change of magnification, it is desirable that the variator have reduced optical powers. Weaker optical power, however, also increases the lens travel and length of the optical system. For a narrow field-of-view this would not be a problem, but, for a wide field-of-view, large motions lead to an increase in the principal ray heights at the rear portion of the lens system. Since the requirements for either the front or the rear of the lens system can be satisfied, but not simultaneously, this results in no ideal place for the aperture stop. If the stop is placed near the front of the lens, the front lens element diameters, and resultant aberrations, are reduced, and if the aperture stop is placed nearer to the rear part of the lens system, the rear lens diameters and resultant aberrations are decreased.

SUMMARY OF THE INVENTION

General Summary of the Invention. It is an object of the present invention to provide a zoom lens system that overcomes the problems and inefficiencies of prior zoom lens systems having large zoom ratios. A further object is to provide a zoom lens system with a wide zoom range of focal lengths and high performance characteristics for both indoor and outdoor use. A still further object of this invention is to provide a zoom lens system with a ratio of about 300 to 1 and a zoom range, for example, from about 7 mm to 2100 mm focal length, with continuous zooming between the focal lengths. Still another object of this invention is to provide a high performance zoom lens system with an optical system having a front zoom lens group for forming an intermediate image and a rear zoom lens group to magnify that image to thereby produce an extremely large zoom ratio. Still another object is to provide such a zoom lens system with optical image stabilization. Still another object is to provide such a zoom lens system with a focusing lens group capable of precise focusing over the entire focal length range of the zoom ratio.

Although of particular benefit for achieving large zoom ratios, the zoom lens systems of the invention can have conventional zoom ratios, e.g., zoom ratios associated with such consumer products as video camcorders, still cameras and the like. It is an additional object of the invention to produce zoom lens systems for these smaller zoom ratio applications.

Other and more detailed objects and advantages of the present invention will readily appear to those skilled in the art from the various preferred embodiments.

Summary of the Zoom Ratio Aspects of the Invention. The present invention overcomes the obstacles that currently limit zoom lens systems to a zoom ratio of about 101:1. The basic idea of the invention can be viewed as the use of a compound zoom lens system that consists of two separate zoom lens portions wherein the front zoom lens portion forms an intermediate image, and the rear zoom lens portion is a relay that transfers the intermediate image formed by the front zoom lens portion to the final image. The total zoom ratio of the complete compound zoom lens system is equal to the zoom ratio of the front zoom lens multiplied by the zoom ratio of the relay. Thus, if the zoom ratio of the front zoom lens portion is 20:1 and the zoom ratio of the relay is 15:1, then the zoom ratio of the entire compound zoom lens system is 300:1. The present invention can be used to achieve a zoom ratio of 300:1 or more, which greatly exceeds the practical limit of conventional zoom lens systems.

BRIEF DESCRIPTION OF THE DRAWINGS

FIGS. 71 and 72A–72D are optical diagrams for an example of still another embodiment of the zoom lens system of this invention incorporating a mirror for folding the lens for added compactness, with FIGS. 72A–72D showing the folded lens in a flat (unfolded) orientation for clarity, and illustrating various positions of the zoom groups;

FIGS. 74–76 are ray aberration graphs corresponding to the position of the zoom groups shown in FIGS. 73A–73C, respectively.

DETAILED DESCRIPTION OF PREFERRED EMBODIMENTS

In the following description of preferred embodiments, reference is made to the accompanying drawings, which form a part hereof, and in which is shown by way of illustration specific embodiments in which the invention may be practiced. It is to be understood that other embodiments may be utilized and structural changes may be made without departing from the scope of the preferred embodiments of the present invention.

Figure 10:
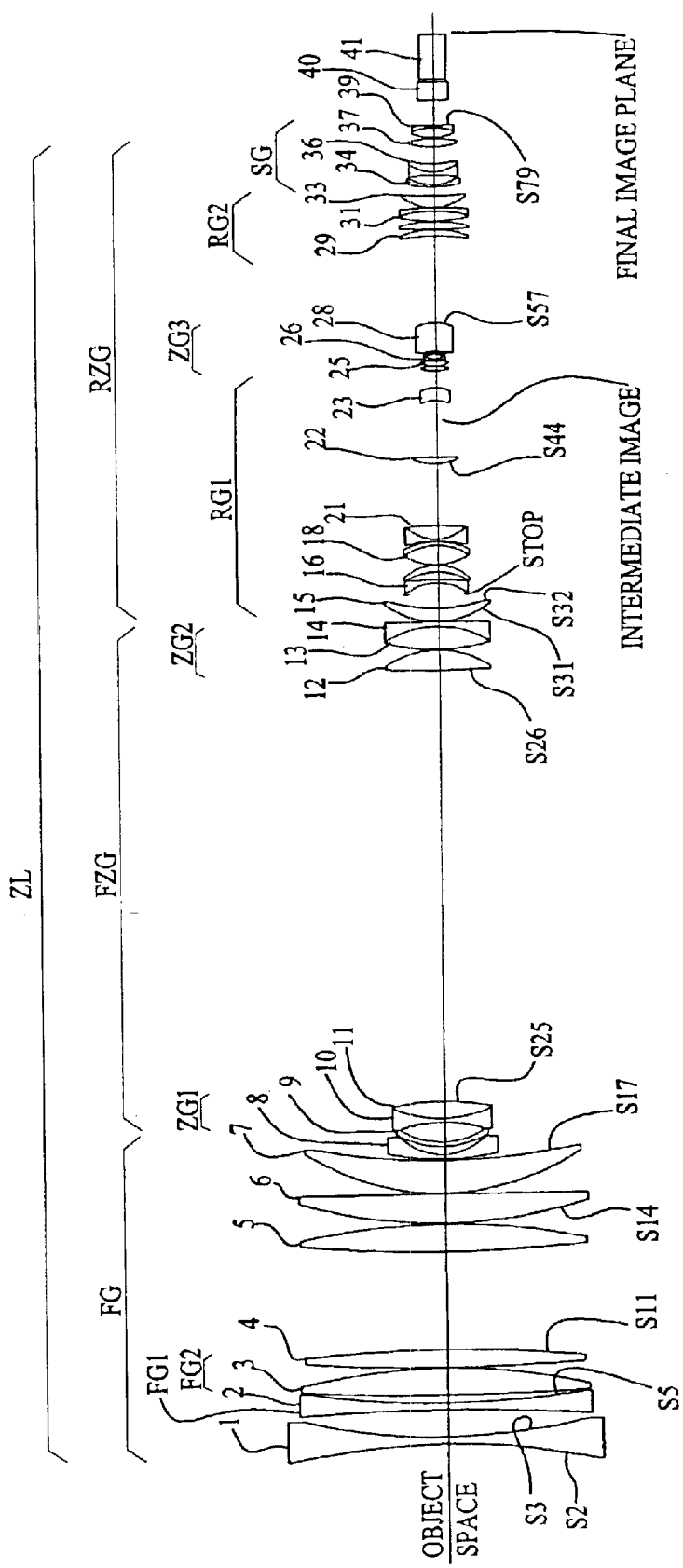
FIGS. 10–62 are figures that all relate to a single embodiment of the zoom lens system of the present invention that has a zoom ratio of about 300:1, with FIG. 10 being an optical diagram of the entire lens system, FIGS. 11–30 comprising optical diagrams of the lens system in 20 different representative positions of the movable lens elements, FIGS. 31–34 comprising optical diagrams of only the lens elements of the focus unit in four of the representative positions, FIGS. 35 and 36 illustrating only the front two zoom lens groups in two of the representative positions, FIGS. 37 and 38 illustrating only the rear zoom lens group in two of the representative positions, FIGS. 39–58 comprising ray aberration diagrams for the same 20 representative positions of all of the lens elements illustrated in FIGS. 11–30, respectively, FIG. 59 comprising a graph of the focus cam movement relative to the focus distances from minimum (bottom) to infinity (top), FIG. 60 comprising graphs of the three zoom cam movements relative to the system focal lengths, FIG. 61 comprising a graph of the "f" numbers of the system at the final image relative to the system focal lengths, and FIG. 62 comprising a graph of the stop diameters relative to the system focal lengths.

In accordance with its general aspects, the invention provides a zoom lens system for forming a final image of an object, said system forming a first intermediate real image between the object and the final image, said system comprising:

(a) a first optical unit (e.g., lens elements 8 through 15 in FIG. 10) located between the object and the first intermediate real image, said unit comprising at least one optical subunit which is moved to change the size (magnification) of the first intermediate real image (e.g., lens elements 8 through 11 are the primary source of magnification change for the first optical unit in FIG. 10); and (b) a second optical unit (e.g., lens elements 26 through 33 in FIG. 10) located between the first intermediate real image and the final image at least a portion of which (e.g., one or more optical subunits or the entire second optical unit) is moved to change the size (magnification) of the final image (e.g., in FIG. 10, lens elements 26 through 28 of the second optical unit are moved to change the size of the final image).

Preferably, the zoom lens system includes one or more optical subunits in either or both of the first and second optical units which is moved to hold the axial position of the final image substantially stationary as the focal length of the system is changed (e.g., lens elements 12 through 15 are the primary source of this function in FIG. 10). Such a subunit, however, may not be needed in all cases, e.g., if the overall optical system has an axially movable sensor.

Preferably, in addition to the first and second optical units, the zoom lens system comprises a focus unit (e.g., lens elements 1 through 7 in FIG. 10), a pupil imaging unit(e.g., lens elements 16 through 25 in FIG. 10), and/or an image stabilization unit (e.g., lens elements 34 through 39 in FIG. 10).

Preferably, the focus unit is (1) positioned in front of the first optical unit, (2) comprises two optical subunits that are movable along the zoom lens system's optical axis (e.g., lens element 2 and elements 3 and 4 in FIG. 10), and/or (3) comprises seven or less lens elements.

Preferably, the image stabilization unit comprises (1) at least one lens element that is laterally movable off the system's optical axis (e.g., lens elements 34 through 36 in FIG. 10), and/or (2) at least one lens element that is movable along the optical axis (e.g., lens elements 37 through 39 in FIG. 10). The light passing through the system is preferably substantially collimated between said laterally and axially movable lens elements of the image stabilization unit.

In addition to the first intermediate real image, the zoom lens systems of the invention can form additional intermediate real images between the object and the final image. The systems can include additional optical units besides the first and second units for changing the sizes (magnifications) of those additional intermediate real images.

Preferably, the first intermediate real image is formed in an air space between the optical elements of the zoom lens system (e.g., the lens elements, prisms, folding mirrors or the like used in the system) and does not pass through any surface of an optical element during zooming. When more than one intermediate real image is formed, this is also preferably true for all of the intermediate images.

The first optical unit in combination with other units of the system can have the form of a conventional zoom lens. Similarly, the second optical unit in combination with other units of the system can have a conventional zoom lens form. The overall system can thus be viewed as a "compounding" of two conventional zoom lenses with, in accordance with the invention, control of pupil imaging between the compounded zoom lenses.

The overall system can also be viewed as a front zoom lens which forms an intermediate image and a relay system which receives the intermediate image and changes its magnification to form the final image.

These approaches for describing the zoom lens systems of the invention are used herein in the detailed discussions of various aspects of the invention. Although these approaches provide a convenient way of describing the invention, it is to be understood that the invention is not limited to these descriptions and various embodiments and applications of the invention may not be completely amenable to such descriptions.

In accordance with other aspects, the invention provides a zoom lens system for forming a final image of an object, said system having a range of focal lengths between a maximum focal length and a minimum focal length and forming at least a first intermediate real image between the object and the final image for all focal lengths within said range, said system comprising:

(a) a first lens unit having a focal length that is changed to change the size (magnification) of the first intermediate real image, said first lens unit being located between the object and the first intermediate real image for all focal lengths within said range; and (b) a second lens unit for changing the size (magnification) of the final image, said second lens unit being located between the first intermediate real image and the final image for all focal lengths within said range.

In accordance with additional aspects, the invention provides a zoom lens system which comprises a variable focal length front lens unit which forms an intermediate real image and a variable magnification rear lens unit which forms an image (preferably, a real image) of the intermediate image.

In accordance with further aspects, the invention provides a compound zoom lens system that collects radiation from an object space and delivers the radiation to a final image in image space, said system comprising multiple zoom lens portions including a first zoom lens portion forming an intermediate image of the radiation from the object space and a last zoom lens portion forming the final image in the image space.

In accordance with still further aspects, the invention provides a zoom lens system for forming a final image of an object, said system having an optical axis, a front lens surface, an aperture stop, and a chief ray which crosses the optical axis at the aperture stop, said system comprising first and second lens units that are moved to change the focal length of the system, wherein:

(a) between the front lens surface and the final image, the chief ray crosses the optical axis at at least one other location besides said aperture stop for all focal lengths of the system; and (b) the system forms an intermediate real image that is located between the first and second lens units for all focal lengths of the system.

Description of Some Zooming Principles and Systems of the Invention. There are some unique aspects to a compound zoom lens system (i.e., a front zoom/zoom relay system) that enables an extraordinarily high degree of optical correction to be achieved. Imagine for a moment a simplified scenario in which the complete zooming motion takes place in stages. In the first stage the relay is initially set at a short focal length position that provides a small magnification of the intermediate image. The object conjugate of the relay will then have a small numerical aperture NA and its image conjugate will have a large numerical aperture NA. (As conventionally defined, the numerical aperture "NA" is equal to the sine of the vertex angle of the largest cone of meridional rays that can enter or leave an optical system or element, multiplied by the refractive index of the medium in which the vertex of the cone is located; and in the lens system optical prescriptions set forth below the "f" number equals the inverse of twice NA, i.e. f=1/2×NA). Since the NA in object space for the relay is equal to the NA in image space for the front zoom lens portion, then it is clear that in this first stage, the front zoom lens portion need only be well corrected for a small NA.

In the second stage, the front zoom lens portion is stationary at its long focal length position, and the relay then zooms to magnify the intermediate image to a greater and greater extent. As the focal length of the system increases during this second stage, the image NA of the relay becomes smaller and the object NA of the relay becomes larger. Hence, the image NA of the front zoom lens portion must also become larger. However, at the same time, the radial part of the intermediate image that is actually used becomes smaller and smaller as the system focal length gets larger.

Thus, the front zoom lens portion need not be corrected for a simultaneously large intermediate image size and a large relative aperture (NA). Rather, it needs to be corrected for a large intermediate image size at a small aperture, and for a small intermediate image size at a large aperture. This makes the design of the front zoom lens portion considerably easier than the design of a traditional zoom lens system having the same zoom ratio as the front zoom lens system of the present invention.

Likewise, the relay need only be corrected for a large image NA and large object size at the small magnification end of its focal lengths. At the other end of its zoom range of focal lengths, the object size is small and the image NA is also small.

As discussed above, in addition to a front zoom lens portion and a relay, the zoom lens systems of the invention preferably also include a pupil imaging unit. This unit serves to image the exit pupil of the front zoom lens portion into the entrance pupil of the relay. By selecting the appropriate powers, not only can the lens diameters, and attendant aberrations, of the relay be minimized, but control of the exit pupil position of the system can be improved.

As also discussed above, the intermediate image formed by the front zoom lens portion is preferably located at a position where it does not pass through any lens surfaces as the system is zoomed from its minimum to its maximum focal lengths. By being between the front zoom lens portion and the rear relay, the intermediate image is automatically behind the axially moving lens unit or units that provide zooming in the front zoom lens portion and in front of any axially moving lens units that provide zooming in the rear zoom portion. Since in certain embodiments of the invention the intermediate image can move during zooming, the locations for the lens surfaces on either side of the intermediate image, whether those surfaces are fixed or moving, are preferably chosen so that notwithstanding the motion of the intermediate image, the surfaces remain spaced from the intermediate image throughout the zoom range of the system.

Figure 1:
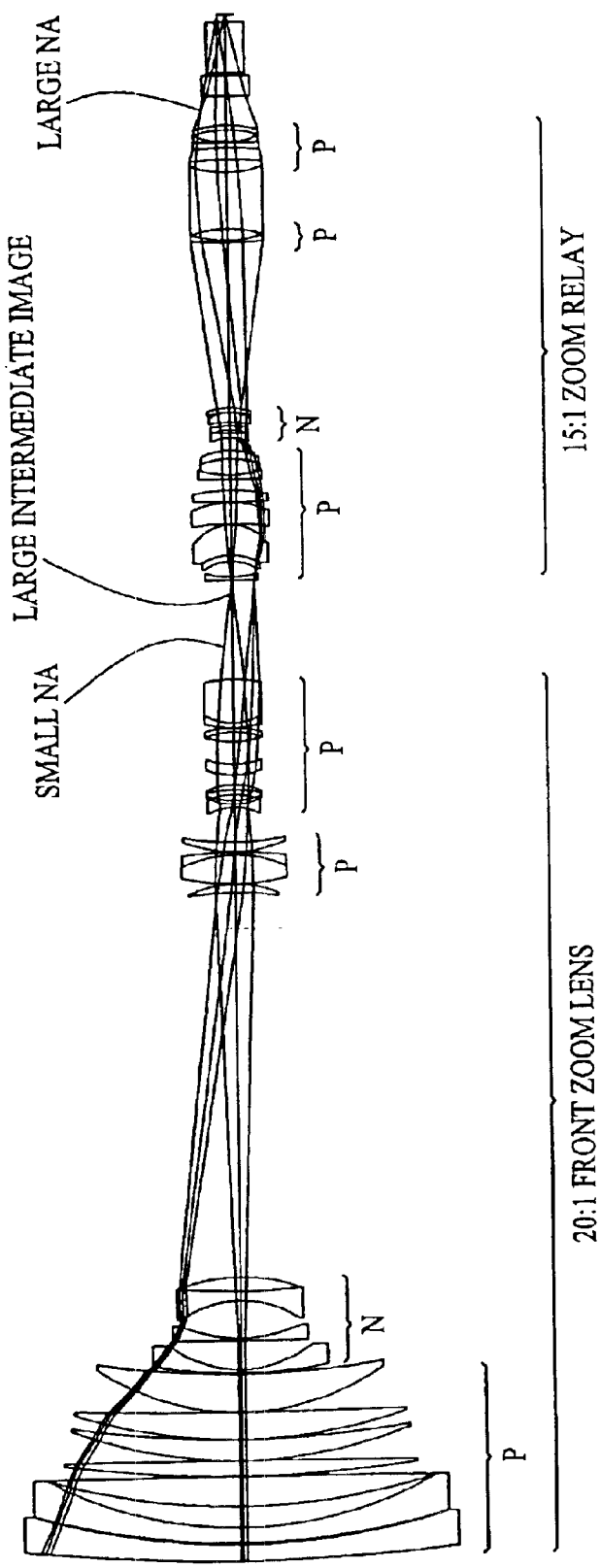
FIGS. 1–5 are optical diagrams of compound zoom lens systems of the present invention for describing some of the principles and variations in the moving and fixed units employed in the system and some of the possible embodiments of the invention, with FIGS. 1–3 illustrating a system having about a 300:1 zoom ratio, FIGS. 4A and 4B having about a 130:1 zoom ratio and FIGS. 5A and 5B having about a 13:1 zoom ratio in an ultra wide angle lens system.
Figure 2:
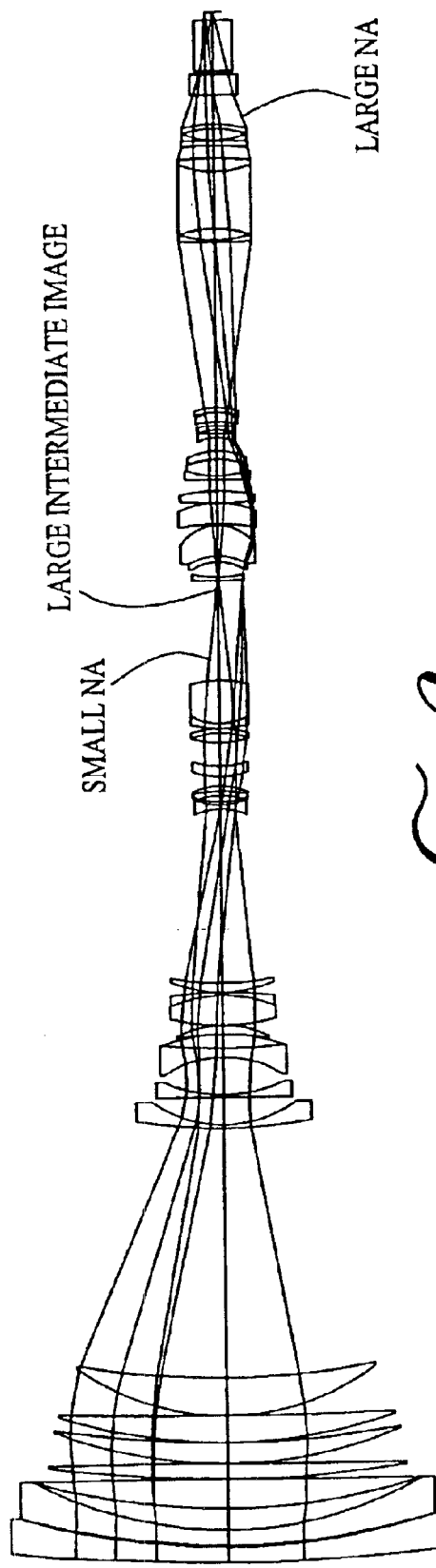
Figure 3:
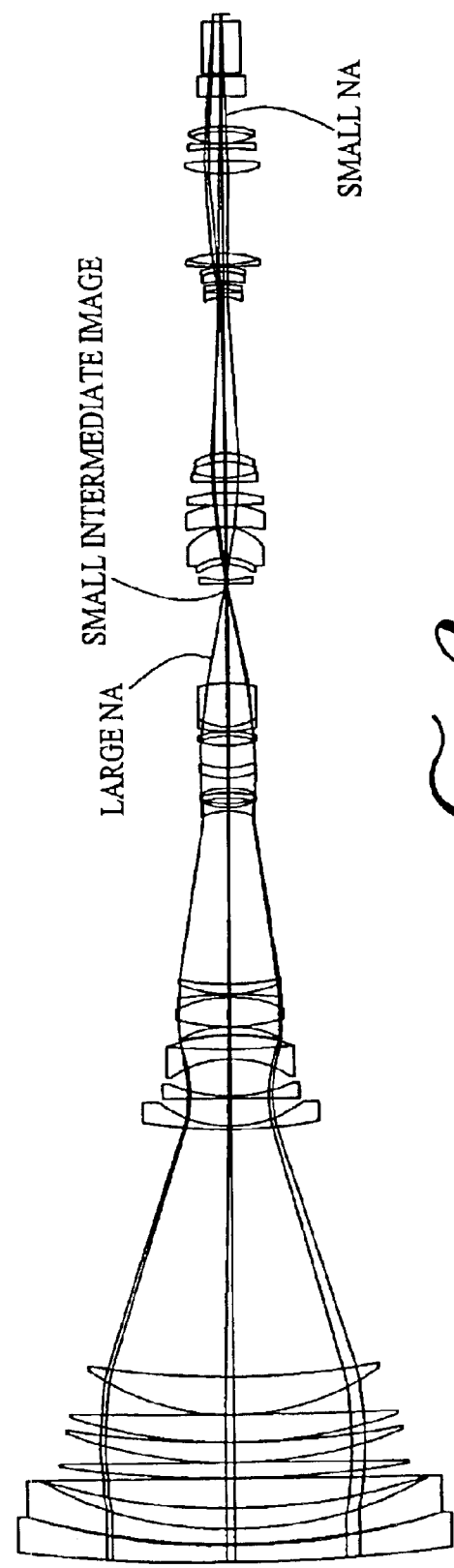

Various of the foregoing features of the invention are illustrated in FIGS. 1–3 for a PNPP—PNPP compound zoom lens system with a zoom ratio of about 300:1. As indicated in FIG. 1, this compound zoom lens system has a front zoom lens portion with a zoom ratio of about 20:1 and a rear zoom lens portion (relay) with a zoom ratio of about 15:1. The groups and their positive or negative power signs are also indicated in FIG. 1. In this compound zoom lens system, the relay is stationary as the front zoom lens portion is operated from its shortest focal length position (shown in FIG. 1) to its longest focal length position (shown in FIG. 2). Once the front zoom lens portion reaches its long focal length position, the relay begins to vary the magnification of the intermediate image to further increase the focal length of the compound system. FIG. 3 shows the system in its maximum focal length condition, in which the front zoom lens portion is at its maximum focal length position and the rear zoom (relay) lens portion is in its maximum magnification position.

FIGS. 1 and 2 show the small NA at the intermediate image plane and large NA at the final image plane that occurs during the initial phase of zooming from short to long. The size of the intermediate image is large during this phase, as shown in the figures. FIG. 3 shows that the NA becomes larger at the intermediate image and smaller at the final image at the longest focal length position.

Note that in this example there are 8 zoom lens groups, but only 4 of them are independently movable for zooming. The 1st, 4th, 5th, and 8th groups are all stationary with respect to the final image. During focusing, however, one or more of these groups can be made to move.

The scenario sketched out here is for exemplary purposes. In practice, the zooming motion need not be clearly divided into two stages, and as a result the relay or a part of it can move during the initial zooming stages and not just near the long end of the focal lengths.

The example of FIGS. 1–3 described above has a PNPP—PNPP construction in which the dash "-" signifies the end of the front zoom lens portion. Both the front zoom lens portion and rear zoom lens portion have variator and compensator zooming groups. One advantage of this configuration is that the intermediate image can be made absolutely stationary if desired. Rendering the image stationary will prevent it from passing through any optical surface that might reveal surface flaws and dust images that will appear at the final image. Using a four-group construction in the rear zoom lens portion also permits better control of the exit pupil position, which may be important for matching the telecentricity requirements of certain image sensors.

If movement of the intermediate image can be tolerated, then it is possible to eliminate one of the compensators. Removal of the rear compensator is preferred in this case because it only moves when the beam diameters are relatively small. The resulting construction will then be a PNPP-PNP configuration.

For both of these configurations care must be taken to match the exit pupil of the front zoom lens portion with the entrance pupil of the relay. For this purpose, an eyepiece-like group is beneficial for converting the diverging beams emanating from the intermediate image into approximately parallel beams entering a normal PNP- or PNPP-type zoom lens system corrected for infinite conjugates.

One aspect of high-speed (large aperture) ultra-wide-range of focal lengths compound zoom lens systems of this type is that the intermediate image and all of its image faults are highly magnified by the zoom groups in the relay at the long focal length position. This places stringent requirements on the correction of secondary color aberrations in the front zoom lens portion and especially the focusing group. In order to accomplish this correction, it is necessary to use at least one, and more likely several, fluor-crown glass elements. As an alternative, calcium fluoride or binary (diffractive) surfaces could also be used for this purpose.

A variety of binary (diffractive) surfaces (diffractive elements) can be used in the practice of the invention. For example, for certain applications, one or more diffractive optical elements of the type disclosed in U.S. Pat. No. 6,507,437, assigned to Canon, can be used, either alone or in combination with other approaches for correcting chromatic aberrations.

Figure 4:
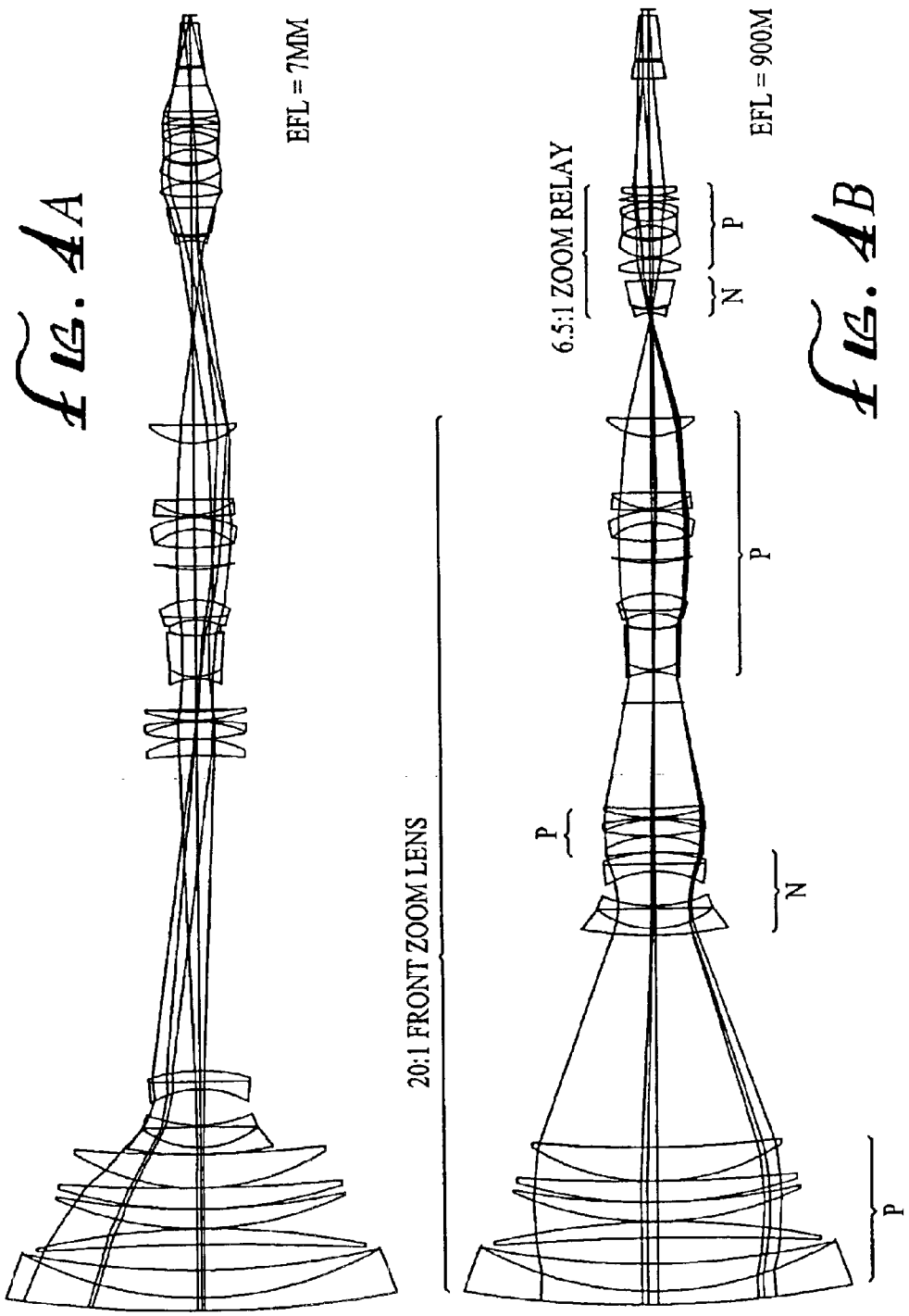

One big advantage of using a PNPP—PNPP or PNPP-PNP configuration over existing zoom lens systems is that both the front zoom lens portion and the rear zoom lens portion (relay) system can have very large zoom ratios. It is quite reasonable to have a zoom ratio of 20:1 or more for either the front zoom lens portion or the rear zoom lens portion in this case, so that a total zoom ratio of 400:1 or more is possible. However, if such a large zoom ratio is not required, it is possible to simplify the system significantly by instead using a relay with an NP configuration having two moving groups. Such a relay is very useful for large aperture applications with a total zoom ratio in the relay of about 3:1 to about 10:1. An example of a compound zoom lens system with a zoom ratio of about 130:1 having an about 20:1 zoom ratio PNPP front zoom lens portion and an about 6.5:1 zoom ratio relay is shown in FIGS. 4A and 4B. FIG. 4A illustrates the minimum focal length of about 7 mm and FIG. 4B illustrates the maximum focal length of about 900 mm. One disadvantage of this configuration is that the rearmost lens group is not stationary; hence it must be designed to withstand a considerable change of magnification at large apertures, which makes it somewhat difficult to design.

Figure 5:
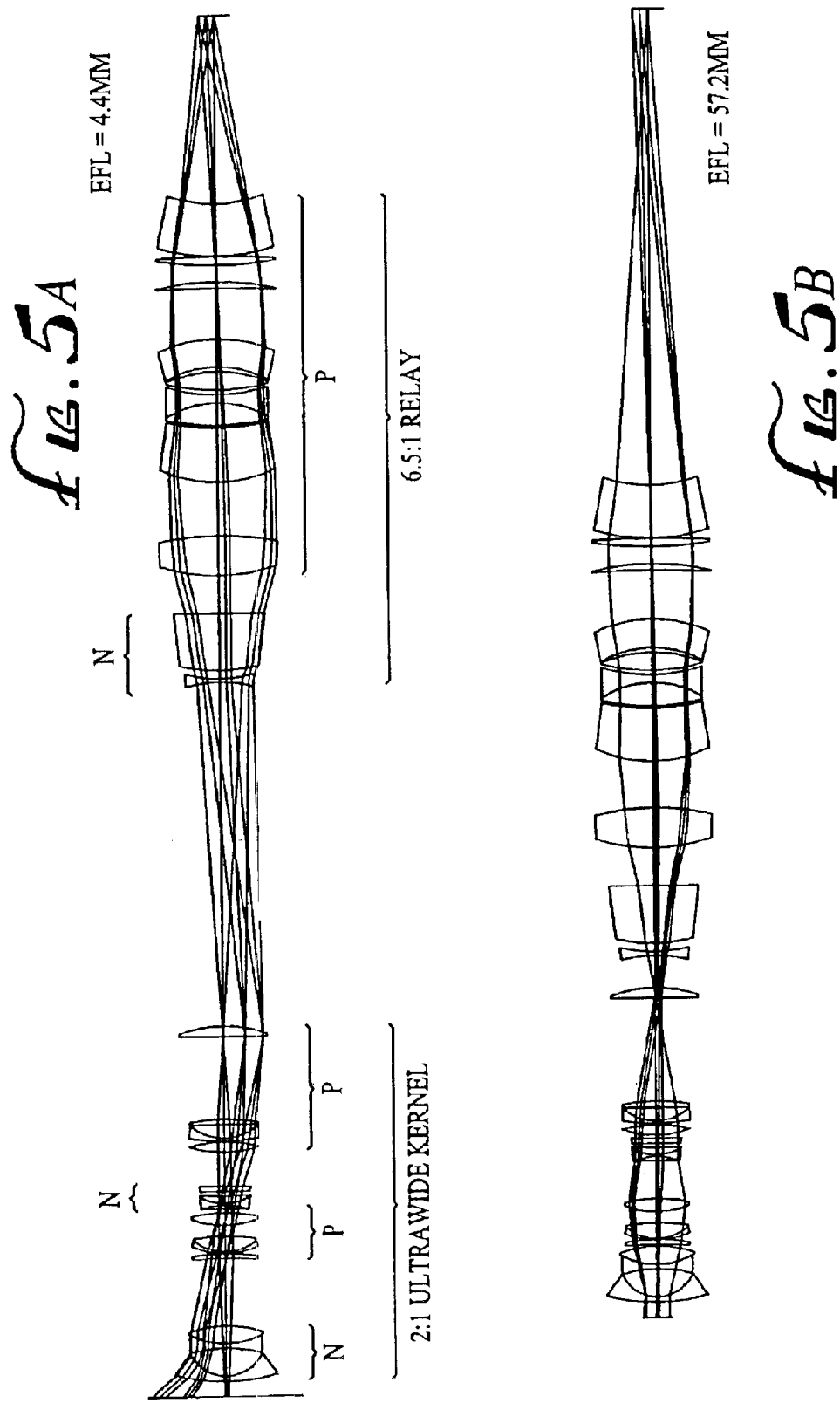
Figure 6:
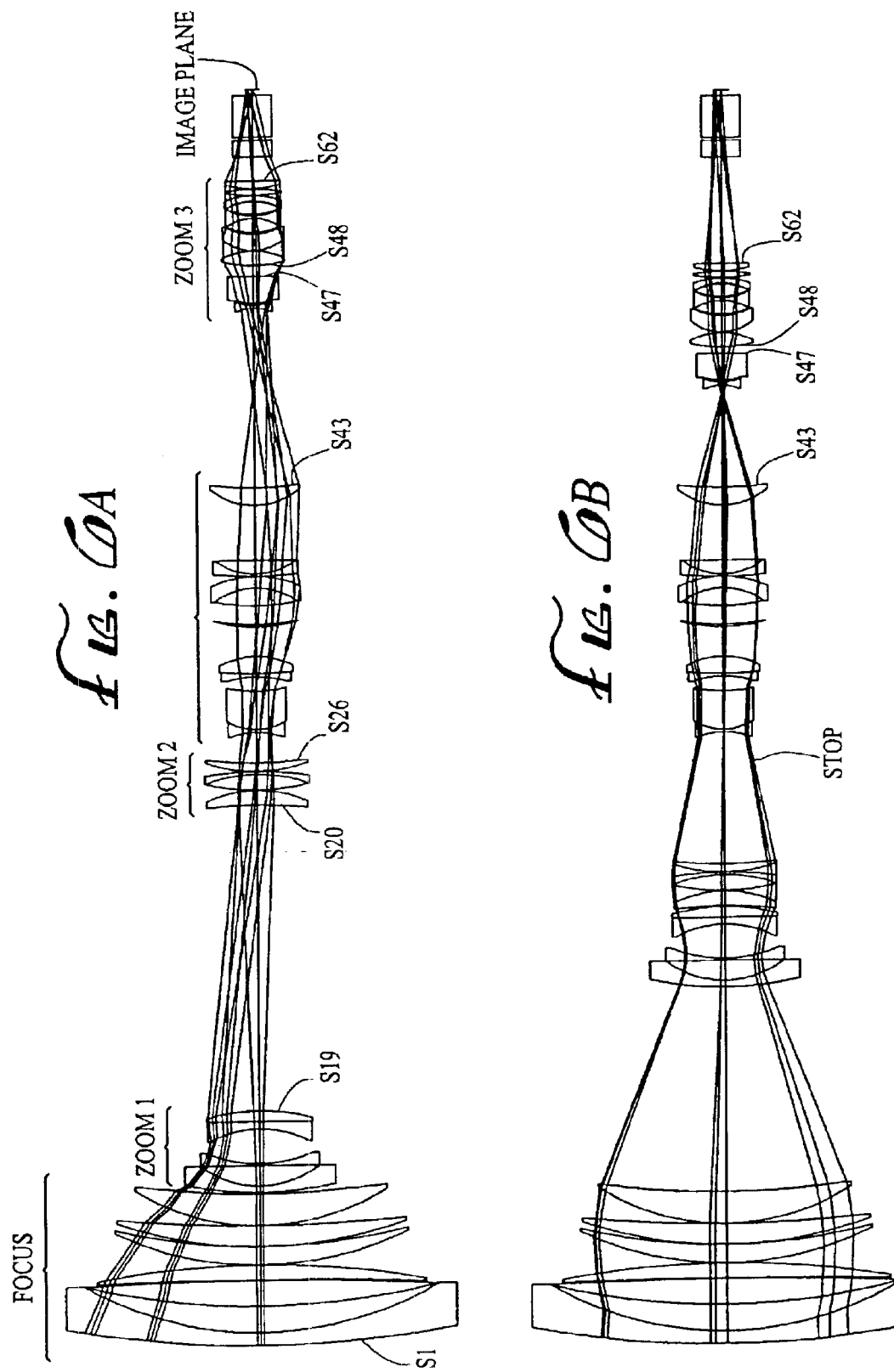
FIGS. 6A and 6B are optical diagrams of another embodiment of the zoom lens system of the present invention using three moving zoom lens groups, with the three zoom groups positioned for a short focal length in FIG. 6A and for a long focal length in FIG. 6B.
Figure 7:
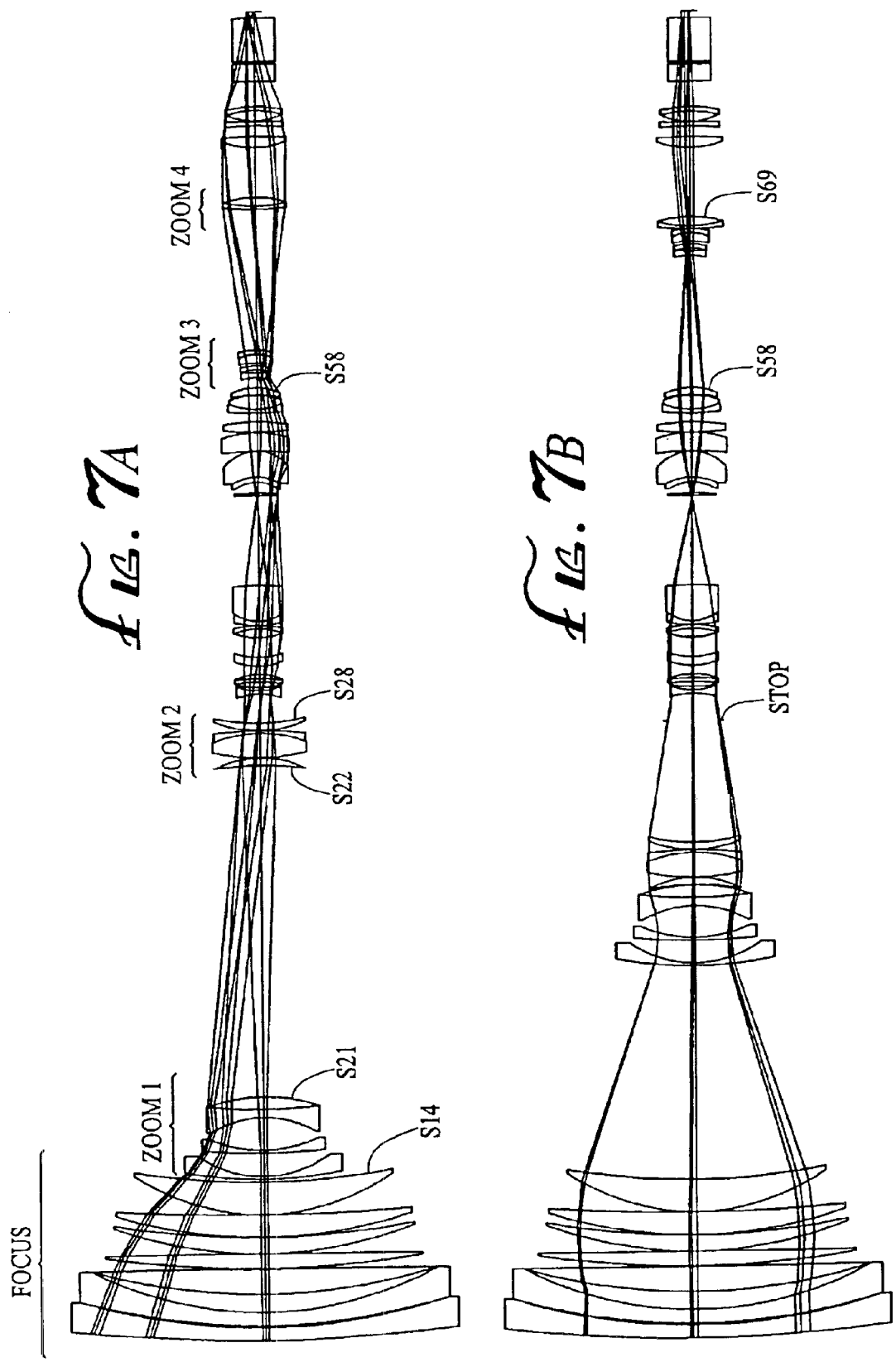
FIGS. 7A and 7B are optical diagrams of another embodiment of the zoom lens system of the present invention using four moving zoom lens groups, with the four zoom groups positioned for a short focal length in FIG. 7A and for a long focal length in FIG. 7B.
Figure 8:
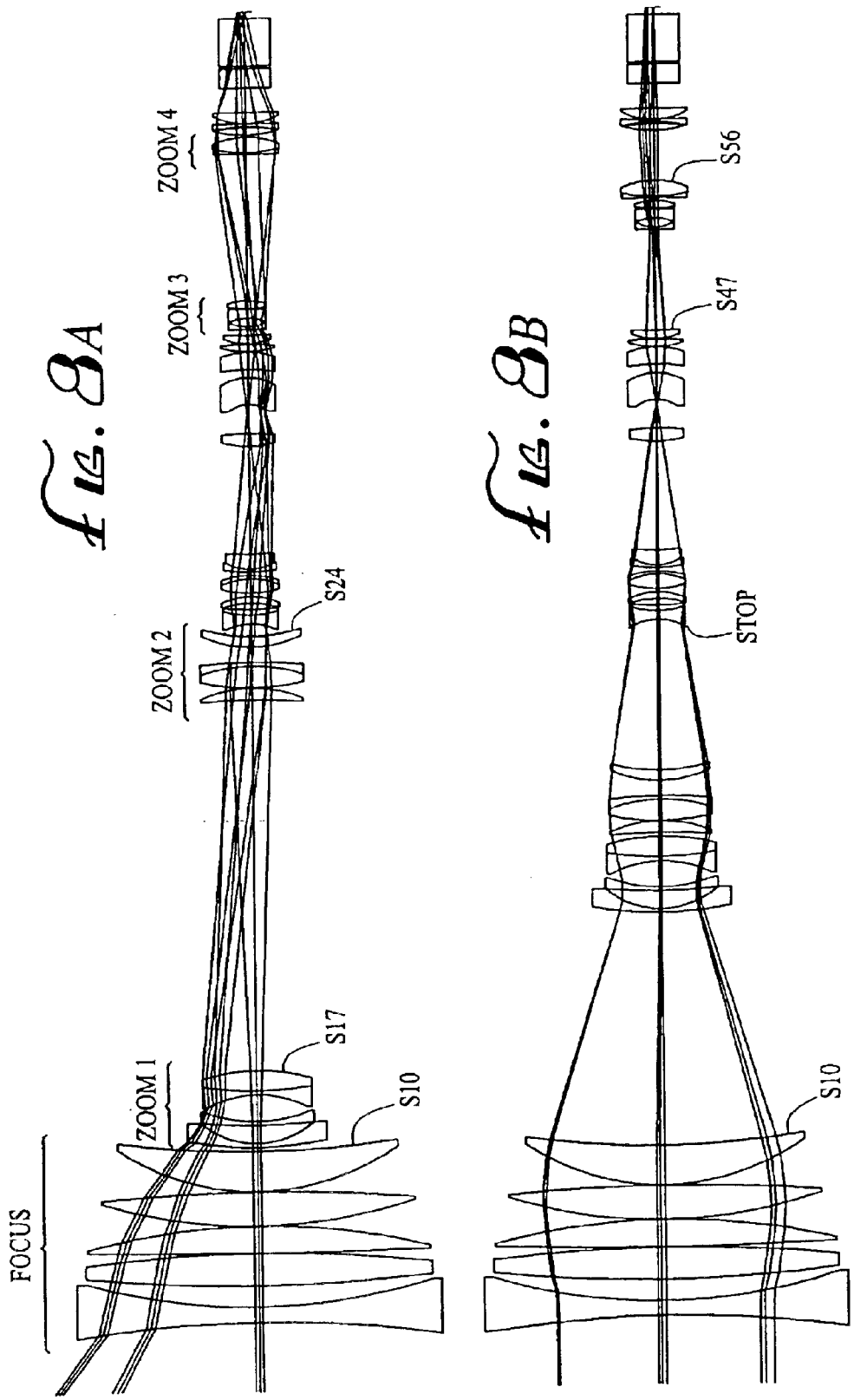
FIGS. 8A and 8B are optical diagrams of another embodiment of the zoom lens system of the present invention using four moving zoom lens groups, with the four zoom groups positioned for a short focal length in FIG. 8A and for a long focal length in FIG. 8B.
Figure 9:
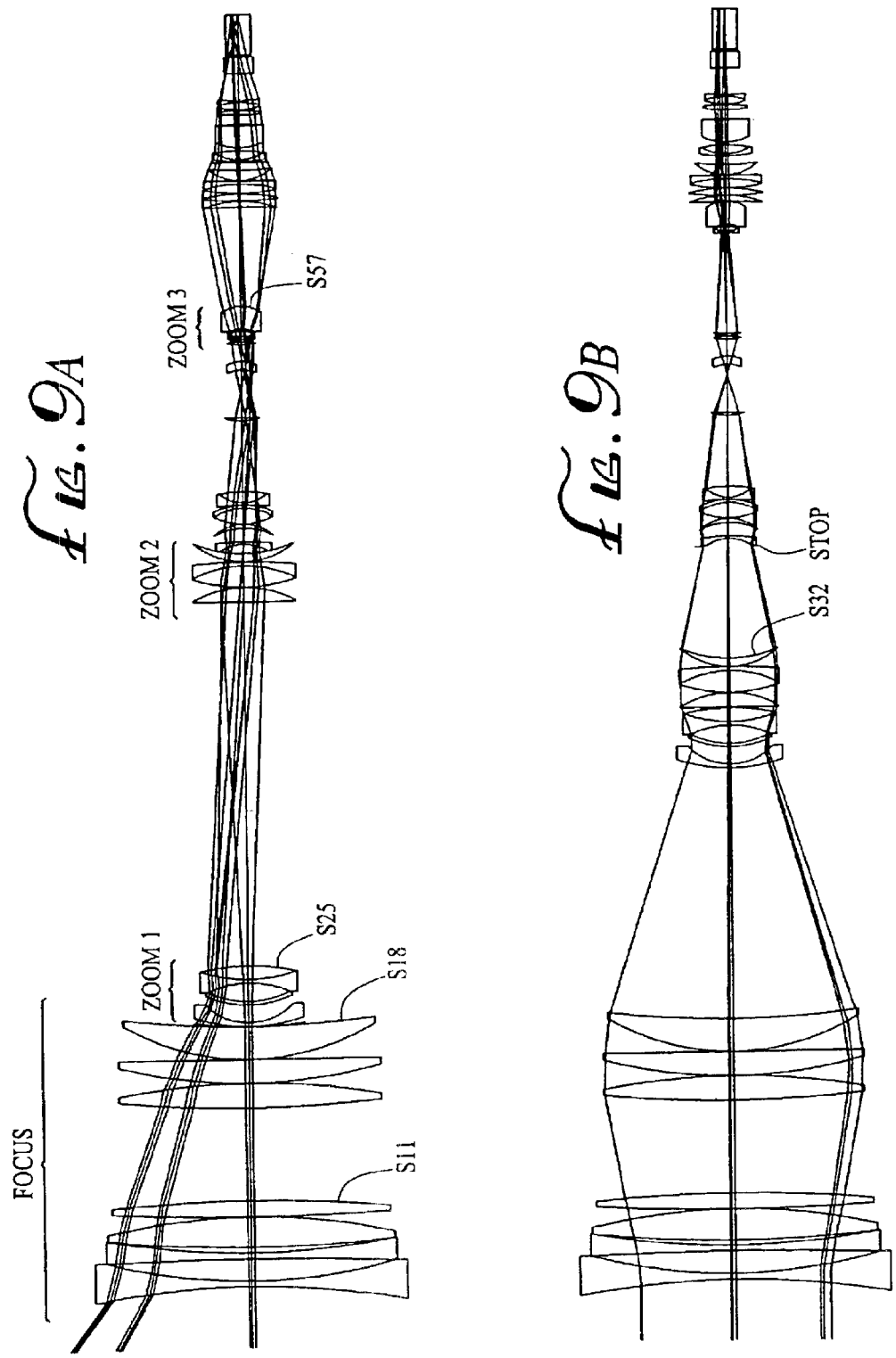
FIGS. 9A and 9B are optical diagrams of another embodiment of the zoom lens system of the present invention using three moving zoom lens groups, with the three zoom groups positioned for a short focal length in FIG. 9A and for a long focal length in FIG. 9B.

An even further simplified construction consisting of an NP front zoom lens portion and an NP rear zoom lens portion (relay) can also be designed, although the maximum zoom ratio in this case will be lowered. Clearly, the technique can be generalized to include a large number of combinations of various zoom lens arrangements for the front zoom lens portion and for the rear zoom lens portion. For example, a high zoom ratio, ultra wide angle zoom lens system can be constructed by using an NP, NPP or NPNP ultra wide angle front zoom lens portion having a zoom ratio of about 2:1 with an NP rear zoom lens portion (relay) having a zoom ratio of about 6.5:1. The result would be a compound zoom lens system with a zoom ratio of about 13:1 with a maximum full field of view of up to 100 degrees or more. FIGS. 5A and 5B illustrate a 4.4 mm–57.2 mm, f/3–f/7 compound zoom lens system with a zoom ratio of about 13:1 for a ⅔" sensor. The full-field angle at the wide-angle end of this compound zoom lens system is more than 102 degrees. Clearly, a PNPP-type rear zoom lens portion (relay) similar to the one used in FIGS. 1–3 could be used with this same ultra wide angle front zoom lens portion to yield an ultra wide angle compound zoom lens system with a zoom ratio of about 30:1.

The existence of an intermediate image is common to all of these configurations, and this offers some unique opportunities for aberration correction that are not typically available in zoom lens system types of the prior art. For example, aspheric surfaces placed on elements located near the intermediate image can have a strong impact on distortion and other field aberrations without disturbing the spherical aberration correction. Advantages of placing an aspheric surface in this area include that the tolerances are generous because the beam diameters are small, and the elements themselves are small. This means that the cost of using aspheric surfaces in this region is minimal.

Detailed Description of the Preferred Embodiments. As described above in the section entitled "Description of Some Zooming Principles and Systems of the Invention", each of the herein disclosed embodiments of the present invention includes a front zoom lens portion and a rear zoom lens portion thereby forming a compound zoom lens system. An intermediate image is formed after the front zoom lens portion whereby the rear zoom lens portion functions as a zoom relay to magnify the intermediate image so as to produce the magnified final image for capturing by film or any other kind of light detector or capture device, such as a charge coupled device (CCD), in a camera. For purposes of this application, the term "camera" is used generically to describe any kind of light detecting or capturing device that may be placed after the lens system of the present invention, including a still, video or movie capture device, whether containing film, videotape, optical disk, CMOS, CCD or another storage medium, or an eyepiece or the human eye. Any such "camera" may include additional lens elements. At present it is contemplated that the front zoom lens portion will be comprised of two moving zoom lens groups and the rear zoom lens portion will be comprised of either one or two moving zoom lens groups, but it is to be understood that more or fewer moving zoom lens groups may be used without departing from the present invention. Also, at present it is contemplated that only one intermediate image will be formed in the entire compound zoom lens system but other embodiments of the present invention may form more than one intermediate image.

In addition to the front and rear zoom lens portions, the compound zoom lens system of the present invention preferably includes a focus lens group. It is preferred that the focus lens group be positioned at the front of the lens system, as shown by each of the embodiments disclosed herein, although it is possible to accomplish some and maybe all of the focusing elsewhere in the compound zoom lens system in other embodiments of the invention.

When a single intermediate image is formed in this compound zoom lens system, the final image is upside down and reversed left-to-right from the conventional orientation produced by an objective lens and therefore the image orientation must be accommodated by the camera. For a video camera using a single chip for the detector, it is possible to merely rotate the chip 180 degrees about the optical axis so that the chip reads the final image as though it is conventionally oriented. Another solution to the orientation problem for a video camera is to reverse the order in which the data is scanned, i.e. instead of from left-to-right and top-to-bottom the data can be read right-to-left and bottom-to-top to achieve the conventional orientation. Still another solution to the orientation problem for a video camera that uses a "frame store" feature to store an entire frame on a memory chip before it is transmitted for use is to merely transmit the stored frame from the frame store memory in the reverse order. For a movie film camera, the entire camera with the film magazine may be turned upside down to, as a result, run the film upwardly for correcting the image orientation. Another solution for the orientation of the image in a movie film camera used in the conventional manner and employing the present zoom lens system is to use digital compositing wherein the film is digitally scanned and then, for example, after digital manipulation the image is imposed on new film in the conventional orientation. The use of a prism in or in connection with the lens system of this invention will also correct the orientation of the final image. For this approach, care must be taken so that the prism will not cause excessive deterioration of the quality of the final image, especially for high performance applications of the present lens system.

Due to the compound zoom arrangement of the zoom lens system of the present invention, the body of the compound lens system will often be of substantial length and therefore any deflection or vibration of the lens system relative to the camera may cause unacceptable deflection or vibration of the final image in the camera. Thus, at least for compound zoom lens systems of the present invention having large zoom ratios, long focal lengths and/or substantial length, it is contemplated that an image stabilization arrangement will be employed. While electronic image stabilization may be appropriate for some video camera applications, for higher performance zoom lens system applications it is preferred that an optical image stabilization arrangement be included in the body of the compound zoom lens system and preferably near the camera end of the lens system, such as is included in the embodiment of FIGS. 10–62 described below.

Although it is more desirable to design and construct the compound zoom lens system of this invention as an integral unit for maximum performance, it is also possible to use two or more separable components to achieve the basic features. For example, a conventional zoom lens or a modified form thereof may be used as the front zoom lens portion and then the rear zoom lens portion may be comprised of a separate attachment that relays and varies the magnification of (e.g. zooms) the image formed by the front zoom lens portion, which image becomes the "intermediate" image, to form the final image. Thus, the front zoom lens portion will provide one zoom ratio and the rear attachment zoom portion will provide another zoom ratio. However, for such a combination, the pupil imaging should be controlled to obtain a final image of acceptable optical quality. Other such combinations of conventional and/or modified lens portions may also be used to provide the compound zoom lens system of the present invention.

FIGS. 6A through 9B illustrate optical diagrams for four different embodiments of the zoom lens system of the present invention. At the far right of each of the FIGS. 6A–9B the two rectangular blocks represent the prism blocks for a conventional 3 CCD ⅔" detector, which is part of the video camera and therefore not part of the zoom lens system.

The following tables list the lens system optical prescriptions, the variable thickness positions for various surfaces, and the focal lengths and magnifications for various surface groups for each of those four embodiments. For simplicity and clarity in view of the large number of surfaces and the small scale of the optical diagrams that include all of the elements, only some of the surfaces in FIGS. 6A through 9B that correspond to the surfaces set forth in the lens system optical prescriptions are identified. A more detailed explanation of the tables is provided following the tables.

TABLES FOR FIGS. 6A & 6B
LENS SYSTEM OPTICAL PRESCRIPTION

| Surface | Radius | Thickness | Glass Index | Glass Dispersion |
|---|---|---|---|---|
| OBJECT | Infinity | Infinity | | |
| S1 | 925.010 | 10.000 | 1.90135 | 31.5 |
| S2 | 280.601 | 20.595 | | |
| S3 | 626.503 | 19.748 | 1.49699 | 81.6 |
| S4 | −2050.828 | 0.300 | | |
| 55 | −2871.294 | 12.027 | 1.49699 | 81.6 |
| S6 | −624.468 | 0.300 | | |
| S7 | 266.779 | 14.079 | 1.49699 | 81.6 |
| S8 | 497.283 | 0.300 | | |
| S9 | 351.230 | 16.228 | 1.49699 | 81.6 |
| S10 | 1246.212 | 0.300 | | |
| S11* | 185.443 | 25.083 | 1.49699 | 81.6 |
| S12 | 839.856 | Variable | | |
| S13 | 301.162 | 5.346 | 1.77249 | 49.6 |
| S14* | 71.693 | 15.360 | | |
| S15 | −3690.461 | 2.000 | 1.77249 | 49.6 |
| S16 | 100.162 | 27.480 | | |
| S17 | −70.544 | 5.456 | 1.80400 | 46.6 |
| S18 | −3458.086 | 8.858 | 1.92286 | 18.9 |
| S19 | −125.683 | Variable | | |
| S20 | −257.845 | 12.063 | 1.49699 | 81.6 |
| S21 | −78.411 | 0.127 | | |
| S22 | 149.706 | 13.001 | 1.49699 | 81.6 |
| S23 | −98.095 | 2.000 | 1.80349 | 30.4 |
| S24 | −266.962 | 0.100 | | |
| S25 | 114.669 | 6.712 | 1.49699 | 81.6 |
| S26 | 485.498 | Variable | | |
| STOP | Infinity | 24.165 | | |
| S28* | −41.960 | 2.000 | 1.60311 | 60.7 |
| S29 | 40.078 | 31.156 | 1.69894 | 30.1 |
| S30 | 83.406 | 12.225 | | |
| S31 | −64.844 | 2.590 | 1.60311 | 60.7 |
| S32 | 912.611 | 13.001 | 1.69894 | 30.1 |
| S33 | −52.224 | 24.076 | | |

-continued

TABLES FOR FIGS. 6A & 6B
LENS SYSTEM OPTICAL PRESCRIPTION

| | | | | |
|---|---|---|---|---|
| S34 | 99.845 | 2.313 | 1.49699 | 81.6 |
| S35 | 167.386 | 15.000 | | |
| S36 | 155.608 | 14.122 | 1.49699 | 81.6 |
| S37 | −47.886 | 9.568 | 1.87399 | 35.3 |
| S38 | −67.571 | 0.018 | | |
| S39 | 381.504 | 2.000 | 1.87399 | 35.3 |
| S40 | 49.653 | 11.590 | 1.43875 | 95.0 |
| S41 | −583.112 | 43.970 | | |
| S42* | 50.132 | 14.235 | 1.43875 | 95.0 |
| S43 | 482.784 | Variable | | |
| S44 | −23.147 | 2.000 | 1.69100 | 54.8 |
| S45* | 32.021 | 1.889 | | |
| S46 | 52.655 | 21.412 | 1.84666 | 23.8 |
| S47 | −380.467 | Variable | | |
| S48 | 102.416 | 11.302 | 1.49699 | 81.6 |
| S49 | −50.958 | 0.405 | | |
| S50* | 34.098 | 13.134 | 1.49699 | 81.6 |
| S51 | 43.222 | 1.521 | | |
| S52 | 58.738 | 10.784 | 1.49699 | 81.6 |
| S53 | −35.052 | 2.000 | 1.74319 | 49.3 |
| S54 | 43.422 | 1.334 | | |
| S55 | 57.389 | 10.079 | 1.49699 | 81.6 |
| S56 | −38.685 | 0.658 | | |
| S57 | −35.272 | 3.772 | 1.78472 | 25.7 |
| S58 | −56.940 | 0.500 | | |
| S59 | 166.529 | 4.833 | 1.69100 | 54.8 |
| S60 | −100.192 | 0.250 | | |
| S61 | 83.273 | 5.608 | 1.69100 | 54.8 |
| S62 | 808.144 | Variable | | |
| S63 | Infinity | 13.200 | 1.51680 | 64.1 |
| S64 | Infinity | 2.000 | | |
| S65 | Infinity | 33.000 | 1.60859 | 46.4 |
| S66 | Infinity | 5.000 | | |
| IMAGE | Infinity | | | |

Note:
Maximum image diameter = 11.0 mm
*Surface profiles of aspheric surfaces S11, S14, S28, S42, S45 and S50 are governed by the following conventional equation:

$$Z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

where:
CURV = 1/(Radius of Surface)
Y = Aperture height, measured perpendicular to optical axis
K, A, B, C, D = Coefficients
Z = Position of surface profile for a given Y value, as measured along the optical axis from the pole (i.e. axial vertex) of the surface.

| The coefficients for the surface S11 are: | The coefficients for the surface S42 are: |
|---|---|
| K = −0.2197954 | K = −0.0460624 |
| A = 9.0593667e−009 | A = −2.6257869e−007 |
| B = 1.7844857e−013 | B = −2.5945471e−010 |
| C = 1.5060271e−017 | C = 2.4316558e−013 |
| D = −9.7397917e−023 | D = −1.2995378e−016 |

| The coefficients for the surface S14 are: | The coefficients for the surface S45 are: |
|---|---|
| K = 0.7048333 | K = 0.0 |
| A = −3.0463508e−007 | A = −1.1056187e−005 |
| B = −1.1451797e−010 | B = 2.8606310e−008 |
| C = 3.4844023e−014 | C = −1.2655154e−010 |
| D = −2.2107339e−017 | D = 2.2826095e−013 |

| The coefficients for the surface S28 are: | The coefficients for the surface S50 are: |
|---|---|
| K = −0.9252575 | K = 0.0 |
| A = −1.8743376e−007 | A = −1.8976230e−006 |
| B = −1.0562170e−009 | B = 1.2489903e−009 |
| C = 2.8892387e−012 | C = −2.3703340e−012 |
| D = −3.6671423e−015 | D = 3.0161146e−015 |

-continued

TABLES FOR FIGS. 6A & 6B
LENS SYSTEM OPTICAL PRESCRIPTION

VARIABLE THICKNESS POSITIONS AND DATA

|      | P1      | P2      | P3      | P4      | P5      | P6      | P7      | P8      |
|------|---------|---------|---------|---------|---------|---------|---------|---------|
| EFL  | 7.257   | 9.008   | 16.013  | 36.022  | 82.023  | 174.970 | 399.652 | 900.099 |
| F/No.| 1.450   | 1.450   | 1.450   | 1.450   | 1.450   | 2.000   | 4.000   | 5.000   |
| S12  | 1.000   | 23.202  | 72.004  | 118.539 | 150.121 | 162.578 | 162.380 | 162.474 |
| S19  | 243.711 | 218.457 | 160.764 | 96.265  | 43.111  | 0.500   | 57.093  | 0.500   |
| S26  | 1.000   | 4.080   | 12.979  | 30.924  | 52.631  | 82.760  | 26.357  | 82.523  |
| S43  | 142.978 | 142.908 | 142.764 | 142.760 | 142.409 | 140.110 | 89.130  | 81.860  |
| S47  | 8.255   | 8.273   | 8.377   | 8.434   | 8.540   | 4.765   | 3.198   | 5.165   |
| S62  | 19.000  | 19.000  | 19.000  | 19.000  | 19.000  | 25.160  | 77.703  | 83.508  |

| Surface Groups | Focal Lengths |
|----------------|---------------|
| S1–S12         | 266.611       |
| S13–S19        | −46.300       |
| S20–S26        | 91.566        |
| S27–S43        | 55.841        |
| S44–S47        | −32.720       |
| S48–S62        | 42.594        |

Surface Group Magnifications

| Surfaces | P1 M' | P1 MP' | P2 M' | P2 MP' | P3 M' | P3 MP' | P4 M' | P4 MP' |
|----------|-------|--------|-------|--------|-------|--------|-------|--------|
| S1–S12   | 0.000 | 0.754  | 0.000 | 0.672  | 0.000 | 0.492  | 0.000 | 0.320  |
| S13–S19  | −0.238| 7.670  | −0.268| 7.215  | −0.374| 6.275  | −0.599| 5.828  |
| S20–S26  | −0.350| 0.876  | −0.385| 0.843  | −0.495| 0.746  | −0.699| 0.550  |
| S27–S43  | 0.871 | −1.159 | 0.870 | −1.159 | 0.854 | −1.159 | 0.844 | −1.159 |
| S44–S47  | 0.321 | −2.846 | 0.322 | −2.829 | 0.325 | −2.794 | 0.327 | −2.793 |
| S48–S62  | −1.170| −0.304 | −1.170| −0.305 | −1.170| −0.308 | −1.170| −0.308 |

| Surfaces | P1 M' | P5 MP' | P6 M' | P6 MP'   | P7 M' | P7 MP' | P8 M' | P8 MP'   |
|----------|-------|--------|-------|----------|-------|--------|-------|----------|
| S1–S12   | 0.000 | 0.195  | 0.000 | 0.123    | 0.000 | 0.163  | 0.000 | 0.124    |
| S13–S19  | −1.012| 7.410  | −1.390| −119.200 | −1.382| 4.682  | −1.386| −141.400 |
| S20–S26  | −0.945| 0.312  | −1.275| −0.017   | −0.715| 0.599  | −1.279| −0.014   |
| S27–S43  | 0.834 | −1.159 | 0.833 | −1.159   | 0.774 | −1.159 | 0.826 | −1.159   |
| S44–S47  | 0.330 | −2.712 | 0.338 | −2.278   | 0.769 | −0.501 | 0.856 | −0.451   |
| S48–S62  | −1.170| −0.313 | −1.315| −0.361   | −2.549| −0.731 | −2.693| −0.727   |

Where, P1 M' is lens group magnification of lens group which equals (entrance marginal ray angle)/(exit marginal ray angle) and, P1 MP' is lens group magnification which equals entrance principal ray angle/exit principal ray angle and so on, upto P8 M' and P8 MP'; the first two characters representing position number, for example P1 M' and P1 MP' are for position 1.

TABLES FOR FIGS. 7A & 7B
LENS SYSTEM OPTICAL PRESCRIPTION

| Surface | Radius    | Thickness | Glass Index | Glass Dispersion |
|---------|-----------|-----------|-------------|------------------|
| OBJECT  | Infinity  | Infinity  |             |                  |
| S1      | 1273.174  | 10.255    | 1.80099     | 35.0             |
| S2      | 475.265   | 1.538     |             |                  |
| S3      | 510.054   | 10.255    | 1.80099     | 35.0             |
| S4      | 279.310   | 14.066    |             |                  |
| S5      | 459.720   | 19.331    | 1.49699     | 81.6             |
| S6      | 21434.630 | 0.308     |             |                  |
| S7      | 800.941   | 10.451    | 1.49699     | 81.6             |
| S8      | 27454.520 | 0.308     |             |                  |
| S9      | 309.779   | 13.334    | 1.49699     | 81.6             |
| S10     | 634.103   | 0.308     |             |                  |
| 511     | 361.606   | 17.818    | 1.49699     | 81.6             |
| 512     | 2023.306  | 0.308     |             |                  |
| S13*    | 172.930   | 25.353    | 1.49699     | 81.6             |
| S14     | 568.502   | Variable  |             |                  |
| S15     | 330.425   | 2.070     | 1.77249     | 49.6             |
| S16*    | 73.838    | 18.829    |             |                  |
| S17     | 726.741   | 2.051     | 1.77249     | 49.6             |

-continued

TABLES FOR FIGS. 7A & 7B
LENS SYSTEM OPTICAL PRESCRIPTION

| | | | | |
|---|---|---|---|---|
| S18 | 102.189 | 25.577 | | |
| S19* | −73.683 | 6.352 | 1.77249 | 49.6 |
| S20* | 359.798 | 9.948 | 1.80809 | 22.8 |
| S21 | −116.821 | Variable | | |
| S22 | −176.211 | 5.797 | 1.49699 | 81.6 |
| S23 | −69.609 | 0.003 | | |
| S24 | 144.415 | 20.317 | 1.49699 | 81.6 |
| S25 | −85.878 | 2.051 | 1.80349 | 30.4 |
| S26 | −282.651 | 0.000 | | |
| S27 | 85.718 | 6.142 | 1.49699 | 81.6 |
| S28 | 157.754 | Variable | | |
| STOP | Infinity | 22.498 | | |
| S30* | −34.201 | 2.051 | 1.60729 | 59.4 |
| S31 | 42.409 | 2.743 | 1.69894 | 30.1 |
| S32 | 101.162 | 4.085 | | |
| S33 | −82.300 | 3.589 | 1.60311 | 60.7 |
| S34 | −90.892 | 3.444 | 1.69894 | 30.1 |
| S35 | −39.457 | 6.472 | | |
| S36 | 51.200 | 7.178 | 1.49699 | 81.6 |
| S37 | 55.671 | 15.382 | | |
| S38 | 67.546 | 6.750 | 1.49699 | 81.6 |
| S39 | −47.804 | 3.076 | 1.87399 | 35.3 |
| S40 | −74.620 | 0.018 | | |
| S41 | 95.357 | 3.076 | 1.87399 | 35.3 |
| S42 | 35.060 | 30.000 | 1.43875 | 95.0 |
| S43 | −130.232 | 68.459 | | |
| S44 | Infinity | 2.051 | | |
| S45 | Infinity | 2.051 | 1.77249 | 49.6 |
| S46 | −341.189 | 8.763 | | |
| S47* | −30.765 | 4.102 | 1.78469 | 26.3 |
| S48 | −36.525 | 21.109 | 1.51680 | 64.2 |
| S49 | −30.389 | 0.308 | | |
| S50 | −160.796 | 14.522 | 1.51680 | 64.2 |
| S51 | −66.413 | 0.308 | | |
| S52 | 461.095 | 8.390 | 1.51680 | 64.2 |
| S53 | −109.832 | 7.208 | | |
| S54* | 247.113 | 3.076 | 1.84666 | 23.8 |
| S55 | 57.348 | 10.868 | 1.49699 | 81.6 |
| S56 | −56.360 | 0.289 | | |
| S57 | −73.106 | 5.307 | 1.63853 | 55.4 |
| S58 | −44.690 | Variable | | |
| S59 | −28.736 | 3.076 | 1.83400 | 37.2 |
| S60 | 115.838 | 2.771 | | |
| S61 | −31.347 | 2.871 | 1.83480 | 42.7 |
| S62 | −73.220 | 2.468 | | |
| S63 | −57.858 | 7.254 | 1.84665 | 23.9 |
| S64 | −24.994 | 0.005 | | |
| S65 | −29.067 | 2.871 | 1.80400 | 46.6 |
| S66 | −49.737 | Variable | | |
| S67 | 507.291 | 2.051 | 1.74319 | 49.3 |
| S68 | 104.703 | 7.178 | 1.49699 | 81.6 |
| S69 | −76.662 | Variable | | |
| S70* | 69.871 | 8.624 | 1.49699 | 81.6 |
| S71 | −663.734 | 8.908 | | |
| S72 | −155.686 | 3.076 | 1.84665 | 23.9 |
| S73 | −1137.705 | 0.202 | | |
| S74 | 54.109 | 8.050 | 1.49699 | 81.6 |
| S75 | −73.493 | 0.393 | | |
| S76 | −66.184 | 2.871 | 1.74319 | 49.3 |
| S77 | −99.535 | 19.484 | | |
| S78 | Infinity | 13.537 | 1.51633 | 64.1 |
| S79 | Infinity | 2.051 | | |
| S80 | Infinity | 33.841 | 1.60859 | 46.4 |
| S81 | Infinity | 5.019 | | |
| IMAGE | Infinity | | | |

Note:
Maximum image diameter ≈ 11.0 mm
*Surface profiles of aspheric surfaces S13, S16, S19, S20, S30, S47, S54 and S70 are governed by the following conventional equation:

$$Z = \frac{(CURV)Y^2}{1 + (1 - (1+K)(CURV)^2 Y^2)^{1/2}} + (A)Y^4 + (B)Y^6 + (C)Y^8 + (D)Y^{10} + (E)Y^{12} + (F)Y^{14} + (G)Y^{16}$$

-continued

TABLES FOR FIGS. 7A & 7B
LENS SYSTEM OPTICAL PRESCRIPTION where:
CURV = 1/(Radius of Surface)
Y = Aperture height, measured perpendicular to optical axis
K, A, B, C, D, E, F, G = Coefficients
Z = Position of surface profile for a given Y value, as measured along the optical axis from the pole (i.e. axial vertex) of the surface.

| The coefficients for the surface S13 are: | The coefficients for the surface S20 are: | The coefficients for the surface S54 are: |
|---|---|---|
| K = −0.1600976 | K = 0.0 | K = 0.0 |
| A = 6.9210418e−009 | A = 3.4619978e−008 | A = −2.743254e−006 |
| B = 2.2313210e−013 | B = 4.2692157e−011 | B = −2.133804e−009 |
| C = 1.1852054e−017 | C = −7.0823340e−014 | C = 1.668568e−011 |
| D = −2.0918949e−021 | D = −2.3957687e−017 | D = −1.9544629e014 |
| E = 2.2579263e−025 | E = 5.4513203e−020 | E = 0.0 |
| F = 8.1799420e−030 | F = −1.4597367e−023 | F = 0.0 |
| G = −1.2582071e−033 | G = −4.1263059e−027 | G = 0.0 |

| The coefficients for the surface S16 are: | The coefficients for the surface S30 are: | The coefficients for the surface S70 are: |
|---|---|---|
| K = 0.9059289 | K = −0.8025989 | K = −2.3 |
| A = −4.3564263e−007 | A = −3.8556154e−007 | A = 3.877213e−007 |
| B = −1.3760665e−010 | B = −5.4410316e−010 | B = 4.916800e−010 |
| C = 1.1349273e−014 | C = 7.0427510e−012 | C = −1.461192e−012 |
| D = −3.8588303e−017 | D = −8.5740313e−015 | D = −3.258352e−017 |
| E = 1.5211558e−020 | E = −5.2635786e−017 | E = 4.664784e−018 |
| F = −5.1726796e−025 | F = 1.0608042e−019 | F = −4.216175e−021 |
| G = −2.0900671e−027 | G = 7.5783088e−023 | G = 0.0 |

| The coefficients for the surface S19 are: | The coefficients for the surface S47 are: |
|---|---|
| K = 0.0 | K = 0.0 |
| A = −6.5866466e−008 | A = −1.2184510e−005 |
| B = −3.2305127e−011 | B = 1.2115245e−007 |
| C = −3.5095033e−014 | C = −3.0828524e−010 |
| D = 4.0315700e−017 | D = −5.7252449e−014 |
| E = −6.1913043e−021 | E = 0.0 |
| F = −2.4403843e−023 | F = 0.0 |
| G = 9.0865109e−027 | G = 0.0 |

VARIABLE THICKNESS POSITIONS AND DATA

|  | P1 | P2 | P3 | P4 | P5 | P6 | P7 |
|---|---|---|---|---|---|---|---|
| EFL | 7.257 | 12.152 | 35.981 | 82.040 | 145.068 | 736.934 | 2088.142 |
| F/No. | 1.450 | 1.450 | 1.450 | 1.450 | 1.450 | 7.200 | 12.500 |
| S14 | 1.026 | 51.867 | 122.026 | 160.824 | 167.824 | 157.900 | 167.823 |
| S21 | 262.564 | 202.199 | 103.948 | 49.493 | 0.000 | 34.351 | 0.000 |
| S28 | 1.563 | 11.088 | 39.178 | 55.576 | 97.329 | 72.903 | 97.329 |
| S58 | 8.616 | 8.616 | 8.616 | 8.616 | 8.616 | 99.467 | 105.316 |
| S66 | 111.358 | 111.358 | 111.358 | 111.358 | 111.358 | 53.699 | 0.000 |
| S69 | 38.387 | 38.387 | 38.387 | 38.387 | 38.387 | 5.195 | 53.100 |

| Surface Groups | Focal Lengths |
|---|---|
| S1–S14 | 283.564 |
| S15–S21 | −52.598 |
| S22–S28 | 102.619 |
| S29–S58 | 51.668 |
| S59–S66 | −29.319 |
| S67–S69 | 178.034 |
| S70–S77 | 70.650 |

Surface Group Magnifications

| Surfaces | P1 M' | P1 MP' | P2 M' | P2 MP' | P3 M' | P3 MP' | P4 M' | P4 MP' |
|---|---|---|---|---|---|---|---|---|
| S1–S14 | 0.000 | 0.740 | 0.000 | 0.564 | 0.000 | 0.318 | 0.000 | 0.179 |
| S15–S21 | −0.260 | 7.365 | −0.347 | 6.511 | −0.644 | 6.193 | −1.207 | 7.342 |
| S22–S28 | −0.369 | 0.833 | −0.462 | 0.740 | −0.736 | 0.466 | −0.896 | 0.306 |
| S29–S58 | −2.392 | −0.356 | −2.392 | −0.356 | −2.392 | −0.356 | −2.392 | −0.356 |
| S59–S66 | −0.282 | 25.995 | −0.282 | 25.995 | −0.282 | 25.993 | −0.282 | 25.994 |
| S67–S69 | 14680.000 | 0.231 | 14680.000 | 0.231 | 14680.000 | 0.231 | 14680.000 | 0.231 |
| S70–S77 | 0.000 | 0.447 | 0.000 | 0.447 | 0.000 | 0.447 | 0.000 | 0.447 |

-continued

TABLES FOR FIGS. 7A & 7B
LENS SYSTEM OPTICAL PRESCRIPTION

| Surfaces | PS M' | PS MP' | P6 M' | P6 MP' | P7 M' | P7 MP' |
|---|---|---|---|---|---|---|
| S1–S14 | 0.000 | 0.117 | 0.000 | 0.174 | 0.000 | 0.117 |
| S15–S21 | −1.468 | −19.350 | −1.150 | 14.886 | −1.468 | −19.350 |
| S22–S28 | −1.303 | −0.101 | −1.065 | 0.137 | −1.303 | −0.101 |
| S29–S58 | −2.392 | −0.356 | −2.392 | −0.356 | −2.392 | −0.356 |
| S59–S66 | −0.282 | 25.994 | −2.227 | 0.319 | −4.006 | 0.300 |
| S67–S69 | 14680.000 | 0.231 | 271.410 | 2.365 | 81.569 | 1.386 |
| S70–S77 | 0.000 | 0.447 | −0.001 | −0.374 | −0.005 | −1.131 |

Where, P1 M' is lens group magnification of lens group which equals (entrance marginal ray angle)/(exit marginal ray angle) and, P1 MP' is lens group magnification which equals entrance principal ray angle/exit principal ray angle and so on, upto P7 M'and P7 MP'; the first two characters representing position number, for example P1 M' and P1 MP' are for position 1.

TABLES FOR FIGS. 8A & 8B
LENS SYSTEM OPTICAL PRESCRIPTION

| Surface | Radius | Thickness | Glass Index | Glass Dispersion |
|---|---|---|---|---|
| OBJECT | Infinity | Infinity | | |
| S1 | −763.589 | 10.000 | 1.80099 | 35.0 |
| S2 | 408.783 | 15.991 | | |
| S3 | 1218.452 | 22.500 | 1.49699 | 81.6 |
| S4 | −948.218 | 0.100 | | |
| S5 | 4440.119 | 19.600 | 1.49699 | 81.6 |
| S6 | −478.965 | 0.100 | | |
| S7 | 355.717 | 24.300 | 1.49699 | 81.6 |
| S8 | −1197.673 | 0.100 | | |
| S9 | 168.455 | 28.500 | 1.49699 | 81.6 |
| S10 | 686.627 | Variable | | |
| S11 | 240.261 | 2.650 | 1.77249 | 49.6 |
| S12* | 58.196 | 12.668 | | |
| S13 | 307.706 | 2.900 | 1.77249 | 49.6 |
| S14 | 100.924 | 19.233 | | |
| S15 | −70.095 | 3.050 | 1.77249 | 49.6 |
| S16 | 236.075 | 14.100 | 1.84666 | 23.8 |
| S17 | −126.479 | Variable | | |
| S18 | −420.335 | 9.200 | 1.49699 | 81.6 |
| S19 | −81.355 | 0.126 | | |
| S20 | 155.733 | 15.650 | 1.49699 | 81.6 |
| S21 | −98.523 | 2.750 | 1.80099 | 35.0 |
| S22 | −285.204 | 10.687 | | |
| S23 | 76.070 | 7.900 | 1.49699 | 81.6 |
| S24 | 118.043 | Variable | | |
| STOP | Infinity | 6.800 | | |
| S26* | −35.243 | 6.500 | 1.60674 | 45.1 |
| S27 | 55.360 | 0.106 | | |
| S28 | 55.900 | 4.050 | 1.75519 | 27.5 |
| S29 | 155.439 | 4.934 | | |
| S30 | −63.039 | 5.050 | 1.80518 | 25.4 |
| S31 | −39.609 | 2.240 | | |
| S32 | 56.818 | 10.900 | 1.45599 | 90.3 |
| S33 | −43.388 | 2.150 | 1.80099 | 35.0 |
| S34 | −61.503 | 2.158 | | |
| S35 | 107.501 | 2.100 | 1.80099 | 35.0 |
| S36 | 29.896 | 11.600 | 1.49699 | 81.6 |
| S37 | 166.103 | 78.890 | | |
| S38 | 59.002 | 9.670 | 1.83741 | 25.4 |
| S39 | −405.826 | 20.924 | | |
| S40 | −22.134 | 19.750 | 1.80099 | 35.0 |
| S41 | −33.299 | 5.803 | | |
| S42 | −129.563 | 12.646 | 1.49699 | 81.6 |
| S43 | −52.914 | 0.152 | | |
| S44 | 59.828 | 5.419 | 1.49699 | 81.6 |
| S45 | −209.080 | 0.100 | | |
| S46 | 37.693 | 6.143 | 1.74099 | 52.7 |
| S47 | 177.702 | Variable | | |
| S48 | −106.846 | 1.600 | 1.83480 | 42.7 |
| S49 | 21.576 | 6.448 | | |

-continued

TABLES FOR FIGS. 8A & 8B
LENS SYSTEM OPTICAL PRESCRIPTION

| | | | | |
|---|---|---|---|---|
| S50 | −27.697 | 6.650 | 1.80099 | 35.0 |
| S51 | 7367.260 | 0.829 | | |
| S52 | 129.249 | 5.126 | 1.84583 | 24.0 |
| S53 | −46.358 | Variable | | |
| S54 | 538.505 | 1.500 | 1.80099 | 35.0 |
| S55 | 95.344 | 11.395 | 1.60300 | 65.5 |
| S56 | −60.650 | Variable | | |
| S57 | 87.009 | 5.185 | 1.48749 | 70.2 |
| S58 | −165.647 | 1.434 | | |
| S59 | −85.357 | 1.500 | 1.80518 | 25.4 |
| S60 | −1236.715 | 0.100 | | |
| S61 | 50.007 | 7.563 | 1.69472 | 54.5 |
| S62 | 549.061 | 18.000 | | |
| S63 | Infinity | 13.537 | 1.51633 | 64.1 |
| S64 | Infinity | 2.051 | | |
| S65 | Infinity | 33.841 | 1.60859 | 46.4 |
| S66 | Infinity | Variable | | |
| IMAGE | Infinity | | | |

Note:
Maximum image diameter = 11.0 mm
*Surface profiles of aspheric surfaces S12 and S26 are governed by the following conventional equation:

$$Z = \frac{(CURV)Y^2}{1 + (1 - (1+K)(CURV)^2 Y^2)^{1/2}} + (A)Y^4 + (B)Y^6 + (C)Y^8 + (D)Y^{10}$$

where:
CURV = 1/(Radius of Surface)
Y = Aperture height, measured perpendicular to optical axis
K, A, B, C, D = Coefficients
Z = Position of surface profile for a given Y value, as measured along the optical axis from the pole (i.e. axial vertex) of the surface.

The coefficients for the surface S12 are:

K = 0.0
A = −1.3820532e−007
B = −2.7133115e−011
C = −9.2535195e−015
D = 3.3313103e−018

The coefficients for the surface S26 are:

K = −0.5520119
A = −1.0148386e−006
B = −5.9646048e−011
C = −1.3030573e−013
D = 3.2918363e−016

VARIABLE THICKNESS POSITIONS AND DATA

| | P1 | P2 | P3 | P4 | P5 | P6 | P7 |
|---|---|---|---|---|---|---|---|
| EFL | 7.274 | 12.145 | 36.011 | 82.004 | 144.947 | 738.776 | 2095.406 |
| F/No. | 1.450 | 1.450 | 1.450 | 1.450 | 1.450 | 9.400 | 14.100 |
| S10 | 3.154 | 50.878 | 126.861 | 163.460 | 167.963 | 167.403 | 168.654 |
| S17 | 271.009 | 213.056 | 113.646 | 61.255 | 10.607 | 68.828 | 3.277 |
| S24 | 2.350 | 12.345 | 35.982 | 51.876 | 97.922 | 40.276 | 104.616 |
| S47 | 4.633 | 5.482 | 4.658 | 5.264 | 6.015 | 53.226 | 73.878 |
| S53 | 105.364 | 104.868 | 105.482 | 104.798 | 103.775 | 14.725 | 2.050 |
| S56 | 1.550 | 1.550 | 1.550 | 1.550 | 1.550 | 43.752 | 35.462 |
| S66 | 4.969 | 4.799 | 4.853 | 4.815 | 5.202 | 4.818 | 5.114 |

| Surface Groups | Focal Lengths |
|---|---|
| S1–S10 | 262.599 |
| S11–S17 | −50.895 |
| S18–S24 | 98.756 |
| S25–S47 | 37.686 |

-continued

TABLES FOR FIGS. 8A & 8B
LENS SYSTEM OPTICAL PRESCRIPTION

| | | |
|---|---|---|
| S48–S53 | | −25.559 |
| S54–S56 | | 106.555 |
| S57–S62 | | 81.336 |

Surface Group Magnifications

| Surfaces | P1 M' | P1 MP' | P2 M' | P2 MP' | P3 M' | P3 MP' | P4 M' | P4 MP' |
|---|---|---|---|---|---|---|---|---|
| S1–S10  | 0.000  | 0.805  | 0.000  | 0.626  | 0.000  | 0.337  | 0.000  | 0.191 |
| S11–S17 | −0.248 | 7.962  | −0.323 | 7.245  | −0.625 | 7.155  | −1.136 | 9.531 |
| S18–S24 | −0.349 | 0.734  | −0.431 | 0.633  | −0.680 | 0.394  | −0.831 | 0.233 |
| S25–S47 | −1.752 | −0.293 | −1.612 | −0.293 | −1.683 | −0.293 | −1.613 | −0.293 |
| S48–S53 | −0.505 | 5.934  | −0.574 | 4.957  | −0.532 | 5.900  | −0.571 | 5.176 |
| S54–S56 | −1.558 | 1.108  | −1.529 | 1.487  | −1.539 | 1.120  | −1.533 | 1.378 |
| S57–S62 | 0.233  | 1.240  | 0.235  | 3.217  | 0.234  | 1.263  | 0.234  | 2.205 |

| Surfaces | PS M' | PS MP' | P6 M' | P6 MP' | P7 M' | P7 MP' |
|---|---|---|---|---|---|---|
| S1–S10  | 0.000  | 0.130   | 0.000  | 0.184  | 0.000  | 0.120  |
| S11–S17 | −1.263 | −8.111  | −1.246 | 6.886  | −1.285 | −6.384 |
| S18–S24 | −1.324 | −0.233  | −0.748 | 0.350  | −1.444 | −0.301 |
| S25–S47 | −1.813 | −0.293  | −1.890 | −0.293 | −2.412 | −0.293 |
| S48–S53 | −0.496 | 4.492   | −3.524 | 0.483  | −4.060 | 0.347  |
| S54–S56 | −1.600 | 1.750   | −1.939 | 2.244  | −1.904 | 1.880  |
| S57–S62 | 0.230  | −29.370 | 0.234  | −0.833 | 0.231  | −1.610 |

Where, P1 M' is lens group magnification of lens group which equals (entrance marginal ray angle)/(exit marginal ray angle) and, P1 MP' is lens group magnification which equals entrance principal ray angle/exit principal ray angle and so on, upto P7 M' and P7 MP'; the first two characters representing position number, for example P1 M and P1 MP are for position 1.

TABLES FOR FIGS. 9A & 9B
LENS SYSTEM OPTICAL PRESCRIPTION

| Surface | Radius | Thickness | Glass Index | Glass Dispersion |
|---|---|---|---|---|
| OBJECT | Infinity   | Variable |         |      |
| S1     | Infinity   | 50.000   |         |      |
| S2     | −621.758   | 5.169    | 1.69350 | 53.2 |
| S3     | 457.301    | Variable |         |      |
| S4     | −2452.883  | 4.799    | 1.80518 | 25.4 |
| S5     | 599.599    | Variable |         |      |
| S6     | 911.220    | 25.082   | 1.45599 | 90.3 |
| S7     | −497.020   | 0.100    |         |      |
| S8     | −2000.000  | 0.000    |         |      |
| S9     | 1000.000   | 0.000    |         |      |
| S10    | 2062.549   | 12.736   | 1.49699 | 81.6 |
| S11    | −1165.481  | Variable |         |      |
| S12    | 963.440    | 19.740   | 1.49699 | 81.6 |
| S13    | −560.694   | 0.200    |         |      |
| S14    | 382.994    | 19.312   | 1.49699 | 81.6 |
| S15    | −17187.180 | 0.200    |         |      |
| S16    | 191.959    | 26.185   | 1.43875 | 95.0 |
| S17    | 702.850    | 0.000    |         |      |
| S18    | 324.818    | Variable |         |      |
| S19    | 130.133    | 3.120    | 1.77249 | 49.6 |
| S20*   | 40.551     | 15.089   |         |      |
| S21    | 87.300     | 2.500    | 1.77249 | 49.6 |
| S22    | 70.260     | 14.709   |         |      |
| S23    | −76.831    | 2.730    | 1.77249 | 49.6 |
| S24    | 108.868    | 11.313   | 1.84666 | 23.8 |
| S25    | −166.114   | Variable |         |      |
| S26    | 2466.515   | 12.326   | 1.49699 | 81.6 |
| S27    | −72.273    | 0.200    |         |      |
| S28    | 114.639    | 17.864   | 1.49699 | 81.6 |
| S29    | −80.007    | 3.100    | 1.80099 | 35.0 |
| S30    | −402.245   | 0.200    |         |      |
| S31    | 56.927     | 6.364    | 1.48749 | 70.2 |
| S32    | 83.100     | Variable |         |      |
| STOP   | Infinity   | 6.855    |         |      |

-continued

TABLES FOR FIGS. 9A & 9B
LENS SYSTEM OPTICAL PRESCRIPTION

| | | | | |
|---|---|---|---|---|
| S34* | −32.543 | 2.000 | 1.60311 | 60.7 |
| S35 | −178.894 | 11.407 | | |
| S36 | −41.737 | 3.274 | 1.84666 | 23.8 |
| S37 | −32.963 | 0.200 | | |
| S38 | 49.510 | 12.747 | 1.49699 | 81.6 |
| S39 | −39.721 | 2.400 | 1.80099 | 35.0 |
| S40 | −53.729 | 0.200 | | |
| S41 | −163.422 | 1.850 | 1.80439 | 39.6 |
| S42 | 26.111 | 9.221 | 1.49699 | 81.6 |
| S43 | −156.748 | 58.646 | | |
| S44 | 44.245 | 2.533 | 1.80439 | 39.6 |
| S45 | 1686.200 | 39.233 | | |
| S46 | −21.116 | 6.938 | 1.77249 | 49.6 |
| S47 | −21.969 | 14.095 | | |
| S48 | 92.954 | 2.220 | 1.60300 | 65.5 |
| S49 | −59.449 | 0.200 | | |
| S50 | 20.331 | 2.228 | 1.62229 | 53.2 |
| S51 | 47.914 | Variable | | |
| S52 | −116.378 | 0.950 | 1.83480 | 42.7 |
| S53 | 34.369 | 3.756 | | |
| S54 | −16.771 | 0.950 | 1.81600 | 46.6 |
| S55 | −36.990 | 1.142 | | |
| S56 | −21.552 | 17.886 | 1.78469 | 26.3 |
| S57 | −26.412 | Variable | | |
| S58 | −293.612 | 4.856 | 1.60311 | 60.7 |
| S59 | −78.391 | 0.200 | | |
| S60 | 272.204 | 5.642 | 1.49699 | 81.6 |
| S61 | −126.344 | 0.200 | | |
| S62 | 124.541 | 7.681 | 1.49699 | 81.6 |
| S63 | −102.092 | 2.500 | 1.80518 | 25.4 |
| S64 | −874.268 | 0.200 | | |
| S65 | 400.000 | 0.000 | | |
| S66 | 38.596 | 8.430 | 1.45599 | 90.3 |
| S67 | 211.910 | 6.207 | | |
| S68 | Infinity | 0.500 | | |
| S69 | 123.725 | 2.000 | 1.81600 | 46.6 |
| S70 | 39.478 | 7.176 | | |
| S71 | −84.356 | 2.000 | 1.74099 | 52.7 |
| S72 | 36.196 | 18.326 | 1.84666 | 23.8 |
| S73 | 210.724 | 0.984 | | |
| S74 | Infinity | 7.645 | | |
| S75 | 105.952 | 3.999 | 1.49699 | 81.6 |
| S76 | −91.250 | 0.200 | | |
| S77 | 46.317 | 5.948 | 1.60300 | 65.5 |
| S78 | −69.543 | 1.500 | 1.84666 | 23.8 |
| S79 | 166.511 | 22.000 | | |
| S80 | Infinity | 13.200 | 1.51633 | 64.1 |
| S81 | Infinity | 2.000 | | |
| S82 | Infinity | 33.000 | 1.60859 | 46.4 |
| S83 | Infinity | 0.000 | | |
| S84 | Infinity | 0.000 | | |
| IMAGE | Infinity | | | |

Note:
Maximum image diameter = 11.0 mm
*Surface profiles os aspheric surfaces S20 amd S34 are governed by the following conventional equation:

$$Z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

where:
CURV = 1/(Radius of Surface)
Y = Aperture height, measured perpendicular to optical axis
K, A, B, C, D = Coefficients
Z = Position of surface profile for a given Y value, as measured along the optical axis from the pole (i.e. axial vertex) of the surface.

| The coefficients for the surface S20 are: | |
|---|---|
| K = | −0.3254663 |
| A = | −3.65160e−007 |
| B = | −1.14704e−010 |
| C = | −5.60564e−014 |

-continued

TABLES FOR FIGS. 9A & 9B
LENS SYSTEM OPTICAL PRESCRIPTION

| | |
|---|---|
| D = | −5.86283e−018 |

The coefficients for the surface S34 are:

| | |
|---|---|
| K = | 0.348034 |
| A = | 1.350560e−006 |
| B = | 2.453070e−009 |
| C = | −2.820340e−012 |
| D = | 4.745430e−015 |

VARIABLE THICKNESS POSITIONS AND DATA

| | P1 | P2 | P3 | P4 | P5 | P6 |
|---|---|---|---|---|---|---|
| EFL | 7.278 | 7.278 | 7.278 | 8.817 | 12.199 | 18.641 |
| F/No. | 1.749 | 1.749 | 1.749 | 1.749 | 1.749 | 1.749 |
| SO | Infinity | 5322.600 | 2499.900 | Infinity | Infinity | Infinity |
| S3 | 17.233 | 50.424 | 82.285 | 17.233 | 17.233 | 17.233 |
| S5 | 3.856 | 8.913 | 13.211 | 3.856 | 3.856 | 3.856 |
| S11 | 74.605 | 36.357 | 0.200 | 74.605 | 74.605 | 74.605 |
| S18 | 0.200 | 0.200 | 0.200 | 26.070 | 64.733 | 106.272 |
| S25 | 300.191 | 300.191 | 300.191 | 272.377 | 230.274 | 183.410 |
| S32 | 1.334 | 1.334 | 1.334 | 3.266 | 6.708 | 12.035 |
| S51 | 1.647 | 1.647 | 1.647 | 1.647 | 1.647 | 1.647 |
| S57 | 80.778 | 80.778 | 80.778 | 80.778 | 80.778 | 80.778 |

VARIABLE THICKNESS POSITIONS AND DATA

| | P7 | P8 | P9 | P10 | P11 | P12 |
|---|---|---|---|---|---|---|
| EFL | 32.734 | 60.449 | 94.190 | 123.985 | 206.250 | 284.791 |
| F/No. | 1.749 | 1.749 | 1.890 | 2.020 | 2.160 | 2.700 |
| SO | Infinity | Infinity | Infinity | Infinity | Infinity | Infinity |
| S3 | 17.233 | 17.233 | 17.233 | 17.233 | 17.233 | 17.233 |
| S5 | 3.856 | 3.856 | 3.856 | 3.856 | 3.856 | 3.856 |
| S11 | 74.605 | 74.605 | 74.605 | 74.605 | 74.605 | 74.605 |
| S18 | 148.849 | 183.007 | 201.036 | 209.783 | 216.511 | 215.851 |
| S25 | 132.062 | 85.948 | 57.616 | 42.322 | 21.856 | 15.570 |
| S32 | 20.806 | 32.763 | 43.065 | 49.609 | 63.170 | 70.310 |
| S51 | 1.647 | 1.647 | 2.130 | 3.050 | 8.806 | 15.438 |
| S57 | 80.778 | 80.778 | 80.294 | 79.375 | 73.618 | 66.987 |

VARIABLE THICKNESS POSITIONS AND DATA

| | P13 | P14 | P15 | P16 | P17 |
|---|---|---|---|---|---|
| EFL | 717.193 | 2092.160 | 2092.160 | 2092.160 | 2092.160 |
| F/No. | 5.200 | 13.750 | 13.750 | 13.750 | 17.490 |
| SO | Infinity | Infinity | 8708.000 | 4050.000 | 2499.900 |
| S3 | 17.233 | 17.233 | 37.759 | 59.403 | 82.285 |
| S5 | 3.856 | 3.856 | 7.178 | 10.305 | 13.211 |
| S11 | 74.605 | 74.605 | 50.757 | 25.988 | 0.200 |
| S18 | 211.275 | 208.261 | 208.261 | 208.261 | 208.261 |
| S25 | 5.736 | 0.200 | 0.200 | 0.200 | 0.200 |
| S32 | 84.680 | 93.262 | 93.262 | 93.262 | 93.262 |
| S51 | 39.946 | 82.225 | 82.225 | 82.225 | 82.225 |
| S57 | 42.480 | 0.200 | 0.200 | 0.200 | 0.200 |

Surface Groups — Focal Lengths

| Surface Groups | Focal Lengths |
|---|---|
| S2–S3 | −379.209 |
| S4–S5 | −597.975 |
| S6–S11 | 484.131 |
| S12–S18 | 229.394 |
| S2–S18 | 262.190 |
| S19–S25 | −49.050 |
| S26–S32 | 79.931 |
| S33–S51 | 41.254 |
| S52–S57 | −26.810 |
| S58–S79 | 70.920 |

Surface Group Magnifications

| Surfaces | P1 M' | P1 MP' | P2 M' | P2 MP' | P3 M' | P3 MP' | P4 M' | P4 MP' |
|---|---|---|---|---|---|---|---|---|
| S2–S3 | 0.000 | 1.732 | 0.066 | 1.710 | 0.129 | 1.696 | 0.000 | 1.971 |
| S4–S5 | 0.599 | 1.754 | 0.594 | 1.563 | 0.59 | 1.425 | 0.599 | 2.388 |

TABLES FOR FIGS. 9A & 9B
LENS SYSTEM OPTICAL PRESCRIPTION

-continued

| | | | | | | | | |
|---|---|---|---|---|---|---|---|---|
| S6–S11 | 2.150 | 0.529 | 2.229 | 0.608 | 2.304 | 0.682 | 2.150 | 0.374 |
| S12–S18 | −0.537 | 0.642 | −0.537 | 0.642 | −0.537 | 0.642 | −0.537 | 0.53 |
| S2–S18 | 0.000 | 1.030 | −0.047 | 1.043 | −0.094 | 1.058 | 0.000 | 0.934 |
| S19–S25 | −0.185 | 8.447 | −0.185 | 8.447 | −0.185 | 8.447 | −0.206 | 7.952 |
| S26–S32 | −0.252 | 0.756 | −0.252 | 0.756 | −0.252 | 0.756 | −0.252 | 0.731 |
| S33–S51 | −1.446 | −0.378 | −1.446 | −0.378 | −1.446 | −0.378 | −1.442 | −0.378 |
| S52–S57 | −0.673 | 6.392 | −0.673 | 6.392 | −0.673 | 6.392 | −0.676 | 6.392 |
| S58–S79 | −0.611 | 0.966 | −0.611 | 0.966 | −0.611 | 0.966 | −0.611 | 0.966 |

| Surfaces | P5 M' | P5 MP' | P6 M' | P6 MP' | P37 M' | P7 MP' | P8 M' | P8 MP' |
|---|---|---|---|---|---|---|---|---|
| S2–S3 | 0.000 | 2.695 | 0.000 | 6.440 | 0.000 | −4.655 | 0.000 | −1.279 |
| S4–S5 | 0.599 | −24.64 | 0.599 | −0.414 | 0.599 | 0.216 | 0.599 | 0.403 |
| S6–S11 | 2.150 | −0.033 | 2.150 | −1.271 | 2.150 | −127.8 | 2.150 | 4.484 |
| S12–S18 | −0.537 | 0.365 | −0.537 | 0.187 | −0.537 | 0.004 | −0.537 | −0.147 |
| S2–S18 | 0.000 | 0.788 | 0.000 | 0.633 | 0.000 | 0.473 | 0.000 | 0.341 |
| S19–S25 | −0.245 | 7.233 | −0.31 | 6.531 | −0.424 | 6.046 | −0.601 | 6.421 |
| S26–S32 | −0.319 | 0.688 | −0.386 | 0.622 | −0.496 | 0.512 | −0.646 | 0.362 |
| S33–S51 | −1.445 | −0.378 | −1.448 | −0.378 | −1.448 | −0.378 | −1.449 | −0.378 |
| S52–S57 | −0.673 | 6.392 | −0.671 | 6.392 | −0.671 | 6.392 | −0.67 | 6.392 |
| S58–S79 | −0.611 | 0.966 | −0.612 | 0.966 | −0.612 | 0.966 | −0.612 | 0.966 |

| Surfaces | P9 M' | P9 MP' | P10 M' | P10MP' | P11 M' | P11MP' | P12 M' | P12MP' |
|---|---|---|---|---|---|---|---|---|
| S2–S3 | 0.000 | −0.736 | 0.000 | −0.549 | 0.000 | −0.387 | 0.000 | −0.365 |
| S4–S5 | 0.599 | 0.468 | 0.599 | 0.496 | 0.599 | 0.522 | 0.599 | 0.526 |
| S6–S11 | 2.150 | 3.296 | 2.150 | 2.964 | 2.150 | 2.701 | 2.150 | 2.668 |
| S12–S18 | −0.537 | −0.234 | −0.537 | −0.279 | −0.537 | −0.330 | −0.537 | −0.338 |
| S2–S18 | 0.000 | 0.265 | 0.000 | 0.225 | 0.000 | 0.180 | 0.000 | 0.173 |
| S19–S25 | −0.771 | 8.327 | −0.894 | 11.79 | −0.983 | −18.95 | −1.004 | −14.68 |
| S26–S32 | −0.770 | 0.233 | −0.846 | 0.152 | −1.064 | −0.084 | −1.092 | −0.107 |
| S33–S51 | −1.431 | −0.378 | −1.406 | −0.378 | −1.344 | −0.378 | −1.359 | −0.378 |
| S52–S57 | −0.692 | 5.731 | −0.728 | 4.790 | −0.916 | 2.531 | −1.194 | 1.491 |
| S58–S79 | −0.611 | 1.263 | −0.611 | 2.227 | −0.611 | −2.992 | −0.610 | −1.604 |

| Surfaces | P13M' | P13MP' | P14M' | P14MP' | P15M' | P15MP' | P16M' | P16MP' |
|---|---|---|---|---|---|---|---|---|
| S2–S3 | 0.000 | −0.351 | 0.000 | −0.348 | 0.041 | −0.294 | 0.085 | −0.24 |
| S4–S5 | 0.599 | 0.529 | 0.599 | 0.529 | 0.596 | 0.529 | 0.593 | 0.529 |
| S6–S11 | 2.150 | 2.646 | 2.150 | 2.642 | 2.199 | 2.691 | 2.250 | 2.742 |
| S12–S18 | −0.537 | −0.344 | −0.537 | −0.345 | −0.537 | −0.345 | −0.537 | −0.345 |
| S2–S18 | 0.000 | 0.169 | 0.000 | 0.168 | −0.029 | 0.145 | −0.061 | 0.12 |
| S19–S25 | −0.919 | −5.386 | −0.870 | −3.955 | −0.869 | −3.955 | −0.869 | −3.955 |
| S26–S32 | −1.351 | −0.287 | −1.561 | −0.395 | −1.561 | −0.395 | −1.561 | −0.395 |
| S33–S51 | −1.719 | −0.378 | −2.606 | −0.378 | −2.61 | −0.378 | −2.612 | −0.378 |
| S52–S57 | −2.093 | 0.631 | −3.758 | 0.316 | −3.685 | 0.316 | −3.626 | 0.316 |
| S58–S79 | −0.613 | −1.659 | −0.600 | −7.955 | −0.610 | −7.955 | −0.619 | −7.955 |

| Surfaces | P17M' | P17MP' |
|---|---|---|
| S2–S3 | 0.129 | −0.183 |
| S4–S5 | 0.590 | 0.528 |
| S6–S11 | 2.304 | 2.795 |
| S12–S18 | −0.537 | −0.345 |
| S2–S18 | −0.094 | 0.093 |
| S19–S25 | −0.869 | −3.955 |
| S26–S32 | −1.561 | −0.395 |
| S33–S51 | −2.612 | −0.378 |
| S52–S57 | −3.629 | 0.316 |
| S58–S79 | −0.618 | −7.955 |

Where, P1 M' is lens group magnification of lens group which equals (entrance marginal ray angle)/(exit marginal ray angle) and, P1 MP' is lens group magnification which equals entrance principal ray angle/exit principal ray angle and so on, upto P7 M' and P7 MP'; the first two characters representing position number, for example P1 M and P1 MP are for position 1. The group of elements defined by surfaces 69 through 73 is translated in a direction perpendicular to the optical axis to compensation for image vibration In the lens system optical prescriptions provided above for each of the four embodiments, each surface of a lens element identified in the left hand column ("Surface"), the radius of that surface in the second column ("Radius"), the thickness on the optical axis between that surface and the next surface, whether glass or air, in the third column ("Thickness"), the refractive indices of the glass lens elements set forth in the fourth column ("Glass Index"), and the dispersion values for the lens elements ("Glass Dispersion") set forth in the fifth column. The surface numbers in the first column "Surface" represent the surfaces numbered from left-to-right in the FIGS. in the conventional manner, namely from object space to image space.

In the left hand or "Surface" column of each lens system optical prescription provided above, the object to be imaged (e.g., photographed) is identified as "OBJECT", the adjustable iris or stop is identified as "STOP", and the final image is identified as "IMAGE". The adjustable spaces between lens elements, such as on either side of movable zoom groups, are identified as "Variable" in the third or Thickness column of the lens system optical prescription. The EFL, Radius and Thickness dimensions are given in millimeters with the Thickness being the distance after that surface on the optical axis. When two surfaces of adjacent elements have the same radius and are coincident, as in a doublet or triplet, only one surface is identified in the first or "Surf" column.

For each of the four embodiments, Aspheric Coefficients for each of the aspheric surfaces are provided following the table of optical prescriptions.

In addition, for each of the four embodiments, tables of the variable thickness positions for various surfaces in each lens system optical prescription are provided which identify positions in the format "Px" for various surfaces (corresponding to entries in the Surface column of the optical prescription tables). The effective focal length (EFL) and the "f" number (F/No.) are also provided for each position.

Now each of the four embodiments of FIGS. 6A–9B will be described briefly to identify some of their differences. The embodiment of FIGS. 6A and 6B has an effective focal length range of about 7.25 mm to 900 mm, which provides a zoom ratio of about 125:1, while using three movable zoom lens groups, namely, Zoom 1, Zoom 2, and Zoom 3, with a focus lens group Focus at the object space end of the lens. The Zoom 3 group actually is comprised of two groups of elements that have a small amount of movement between surfaces S47 and S48 (compare FIGS. 6A and 6B). The embodiment of FIGS. 7A and 7B has an effective focal length range of about 7.27 mm to 2088 mm, which provides a zoom ratio of about 287:1, with four movable zoom lens groups (Zoom 1, 2, 3 and 4) and a focus lens group. The embodiment of FIGS. 8A and 8B has an effective focal length range of about 7.27 mm to 2095 mm, which also provides a zoom range of about 287:1, with four moving zoom lens groups and a focus lens group, which is very similar to the performance of the lens embodiment of FIGS. 7A and 7B. Similarly, the embodiment of FIGS. 9A and 9B has an effective focal length range of about 7.27 mm to 2092 mm, which also provides a zoom ratio of about 287:1, but uses only three moving zoom lens groups. Each of these four embodiments includes plural aspheric surfaces with the embodiments of the FIGS. 8A–8B and 9A–9B having only two such surfaces while the embodiment of FIGS. 7A–7B includes eight such surfaces, as indicated in the lens system optical prescriptions. The embodiment of FIGS. 9A and 9B also includes optical image stabilization lens elements near the camera end of the lens system similar to those included in the embodiment of FIGS. 10–62, which will be described below.

Figure 62:
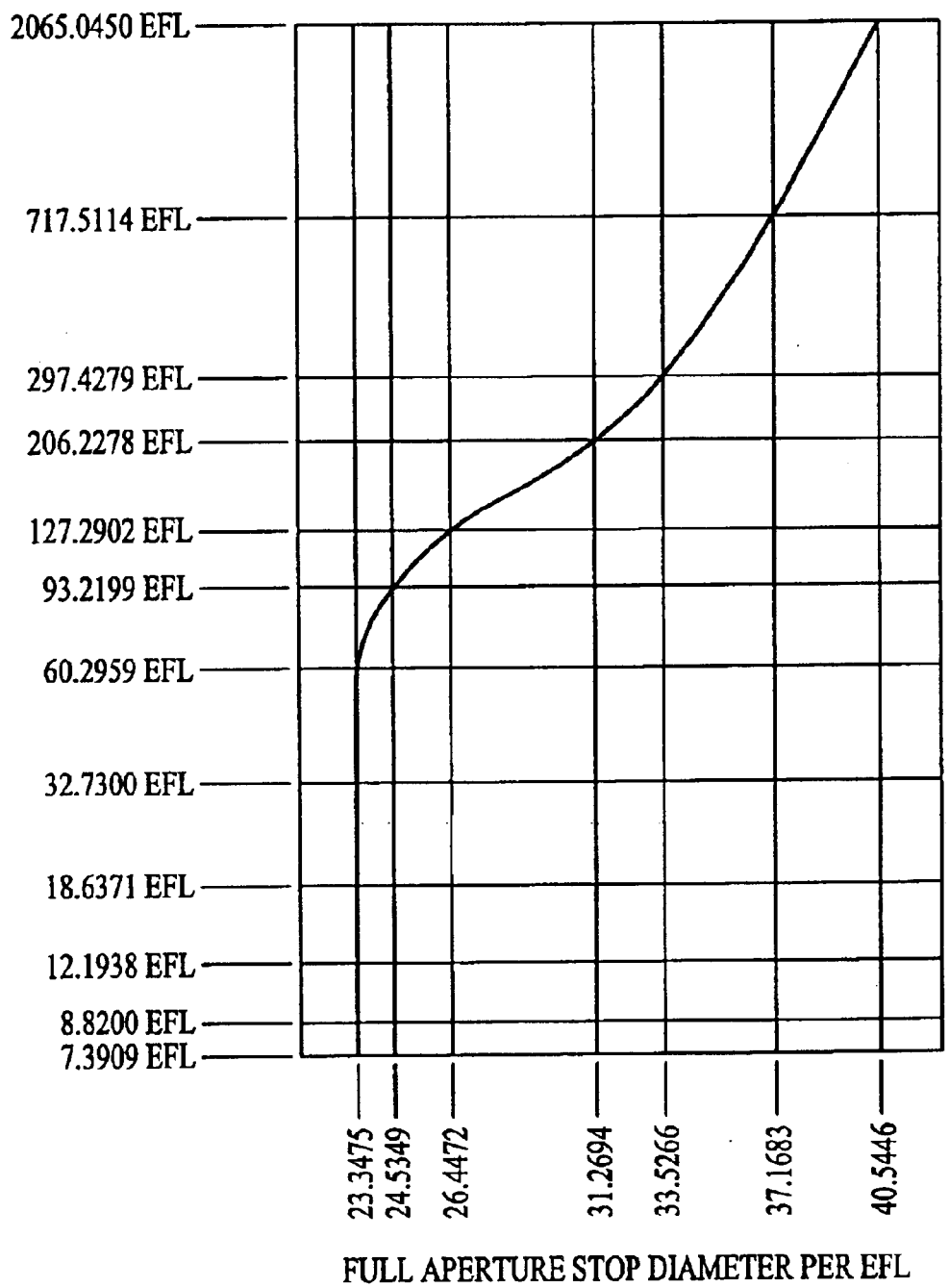

Detailed Description of the Embodiment of FIGS. 10–62. As noted above in the section entitled "Brief Description of the Drawings," FIGS. 10–62 all relate to a single embodiment of the present invention that is directly and immediately applicable to the broadcast television market, although other markets are also available and various other embodiments and modifications of the invention may be more applicable to other markets. This embodiment of the compound zoom lens system of this invention has a zoom range of approximately 7 mm to 2100 mm in focal length, thereby providing a zoom ratio of about 300:1, which is more than three times the zoom ratio presently available in broadcast television zoom lens systems. Referring more particularly to the optical diagram of FIG. 10, the zoom lens system ZL is comprised of a focus lens group FG, a front zoom group FZG and a rear zoom group RZG. For the description of this embodiment, the lens system's stop is used as a divider between the "front" and "rear" of the lens. In terms of the terminology used in the "Description of Various Features of the Invention and the Disclosed Embodiments" set forth above, the focus lens group FG is the focus unit, the front zoom group FZG is the first optical unit, and the rear zoom group RZG includes a pupil imaging unit and an image stabilization unit, as well as the second optical unit.

The focus group FG is comprised of seven lens elements 1–7 with the front lens element 1 being stationary whereby the lens may be sealed at the front by fixing and sealing element 1 to the lens barrel (not shown). Lens element 2 comprises a first focus group FG1 and lens elements 3 and 4 comprise a second focus group FG2, both of which groups are independently movable for achieving the desired focus at each focal length. Elements 5–7 of the focus group FG are stationary.

The front zoom group FZG has a first zoom group ZG1 comprised of lens elements 8–11 and a second zoom group ZG2 comprised of lens elements 12–15, both of which zoom groups are independently movable. An iris or aperture stop STOP is positioned between the second zoom group ZG2 and a first group RG1 that forms the front portion of the rear zoom group RZG.

First group RG1 is comprised of lens elements 16–25, which remain stationary. The intermediate image is formed between lens elements 22 and 23 in the first group RG1. Although all of the lens elements 16–25 of this first group RG1 remain stationary at all times, the intermediate image moves along the optical axis between lens elements 22 and 23 at the longer focal lengths without touching either of those elements during the zooming of the lens system between the maximum and minimum focal lengths. The next lens group of the rear zoom group RZG is a third zoom group ZG3 comprised of lens elements 26–28 that are movable axially. Next within the rear zoom group RZG is a second group RG2 comprised of lens elements 29–33, which are stationary. The next elements in the rear zoom group RZG comprise a stabilization group SG having a radial decentralization group SG1 with lens elements 34–36 and an axially adjustable group SG2 with lens elements 37–39. The three zoom groups ZG1, ZG2 and ZG3 are independently movable along the optical axis for developing the full range of the focal lengths of about 7 mm to 2100 mm. Finally, although they are not part of the zoom lens system per se, FIG. 10 also illustrates two prism blocks 40 and 41 that emulate the conventional three CCD ⅔" detectors of a video camera for completing the optical diagram from object space to the final image.

The first or decentralization stabilization group SG1 is movable radially from the system's optical axis in any direction by about 0.5 mm or more in response to sensed vibrations of the lens to maintain the final image at the image plane in a stabilized location. The sensing of vibrations and the movement of group SG1 may be accomplished by any conventional means such as an accelerometer, a processor and a motor controlled by the processor in a closed loop system on a continuous basis. The second or axial stabilization group SG2 is axially movable for axial adjustment of about 1.25 mm or more in either direction for back focus adjustment. The second stabilization group SG2 may also be moved axially forward a greater amount for extended close focus at short focal lengths of the lens. The light rays between the first stabilization group SG1 and the second stabilization group SG2, i.e. between lens elements 36 and 37, are substantially collimated whereby the movements of those two groups for accomplishing stabilization, extending the close focus and adjusting the back focus do not cause any significant deterioration of the final image.

The decentralization stabilization group SG1 may also be used for creating special effects by causing the lens group SG1 to move radially in a shaking pattern to thereby simulate the shaking caused, for example, by an earthquake, a moving vehicle or explosions in a war movie. Such special effects can also be produced by moving the lens group SG2 axially in an oscillatory fashion, which slightly defocuses the picture. Radial movement of SG1 can also be combined with axial movement of SG2 to create a different special effect.

The complete lens design of the zoom lens system ZL for the embodiment of FIGS. 10–62 is set forth below in the tables generally entitled "Tables for FIGS. 10 thru 62." The Lens System Optical Prescription table is similar to the foregoing lens prescriptions for the zoom lenses of FIGS. 6A–9B. A more detailed explanation of the tables is provided following the tables.

TABLES FOR FIGS. 10 thru 62
LENS SYSTEM OPTICAL PRESCRIPTION

| Surface | Radius | Thickness | Glass Name | Manufacturer | Semi Aperture |
|---|---|---|---|---|---|
| OBJECT | Infinity | Variable | | | |
| S1 | Infinity | 50.000 | | | 142.85 |
| S2 | −553.385 | 5.200 | SLAL13 | OHARA | 111.77 |
| S3 | 436.730 | Variable | | | 103.81 |
| S4 | −1545.910 | 4.900 | STIH6 | OHARA | 102.97 |
| S5 | 682.341 | Variable | | | 101.63 |
| S6 | 1644.762 | 19.482 | SFPL52 | OHARA | 101.59 |
| S7 | −467.261 | 0.730 | | | 101.38 |
| S8 | −2000.000 | 0.000 | | | 99.83 |
| S9 | 4000.000 | 0.000 | | | 99.22 |
| S10 | 1463.863 | 12.601 | SFPL51 | OHARA | 98.87 |
| S11 | −1094.948 | Variable | | | 98.22 |
| S12 | 1092.461 | 20.386 | SFPL51 | OHARA | 100.60 |
| S13 | −480.155 | 0.730 | | | 101.05 |
| S14 | 362.425 | 21.232 | SFPL51 | OHARA | 101.85 |
| S15 | −14624.000 | 0.730 | | | 101.37 |
| S16 | 181.063 | 24.150 | SFPL53 | OHARA | 97.84 |
| S17 | 477.885 | 0.000 | | | 96.42 |
| S18 | 324.818 | Variable | | | 95.12 |
| S19 | 208.678 | 3.120 | SLAH66 | OHARA | 38.27 |
| S20* | 40.147 | 6.111 | | | 32.19 |
| S21 | 67.136 | 3.150 | SLAH59 | OHARA | 32.03 |
| S22 | 56.870 | 14.527 | | | 30.64 |
| S23 | −98.690 | 2.730 | SLAH66 | OHARA | 30.54 |
| S24 | 90.992 | 12.506 | STIH53 | OHARA | 33.74 |
| S25 | −174.619 | Variable | | | 34.43 |
| S26 | 764.771 | 14.926 | SFPL52 | OHARA | 36.34 |
| S27 | −66.842 | 0.400 | | | 36.91 |
| S28 | 133.738 | 17.704 | SFPL51 | OHARA | 36.84 |
| S29 | −69.988 | 3.100 | SLAM66 | OHARA | 36.62 |
| S30 | −1580.221 | 0.400 | | | 36.97 |
| S31 | 65.214 | 9.613 | SNSL36 | OHARA | 37.33 |
| S32 | 129.561 | Variable | | | 36.67 |
| STOP | Infinity | 8.811 | | | 20.27 |
| S34* | −36.392 | 2.044 | SBSM14 | OHARA | 20.44 |
| S35 | −425.016 | 6.131 | | | 21.70 |
| S36 | −43.308 | 5.233 | STIH53 | OHARA | 21.88 |
| S37 | −33.861 | 0.200 | | | 22.78 |
| S38 | 47.203 | 13.980 | SFPL51 | OHARA | 22.84 |
| S39 | −41.565 | 2.400 | SLAM66 | OHARA | 22.59 |
| S40 | −56.845 | 0.200 | | | 22.47 |
| S41 | −109.533 | 1.950 | SLAH63 | OHARA | 21.13 |
| S42 | 31.532 | 10.159 | SFPL51 | OHARA | 19.56 |
| S43 | −173.403 | 45.721 | | | 19.51 |
| S44 | 47.891 | 4.513 | SLAH53 | OHARA | 15.23 |
| S45 | −2514.287 | 41.843 | | | 14.84 |

-continued

| | TABLES FOR FIGS. 10 thru 62 LENS SYSTEM OPTICAL PRESCRIPTION | | | | |
|---|---|---|---|---|---|
| S46 | −23.807 | 9.483 | SLAH59 | OHARA | 8.45 |
| S47 | −24.610 | 12.719 | | | 9.87 |
| S48 | 61.223 | 3.114 | SFPL51 | OHARA | 8.86 |
| S49 | −45.071 | 0.150 | | | 8.71 |
| S50 | 24.918 | 3.242 | SBSM9 | OHARA | 8.83 |
| S51 | −516.606 | Variable | | | 8.67 |
| S52 | −72.073 | 1.059 | SLAL54 | OHARA | 7.15 |
| S53 | 23.513 | 2.783 | | | 6.65 |
| S54 | −18.951 | 0.900 | SLAH59 | OHARA | 6.54 |
| S55 | −57.174 | 1.347 | | | 6.84 |
| S56 | −21.150 | 21.292 | SLAH60 | OHARA | 6.98 |
| S57 | −31.181 | Variable | | | 12.67 |
| S58 | −138.459 | 4.401 | SBAL22 | OHARA | 23.12 |
| S59 | −75.648 | 0.300 | | | 23.54 |
| S60 | 606.713 | 5.842 | SFPL51 | OHARA | 23.89 |
| S61 | −96.488 | 0.300 | | | 23.97 |
| S62 | 113.288 | 7.382 | SFPL51 | OHARA | 23.55 |
| S63 | −97.742 | 2.500 | STIH6 | OHARA | 23.30 |
| S64 | −366.723 | 0.300 | | | 23.05 |
| S65 | 400.000 | 0.000 | | | 22.80 |
| S66 | 38.760 | 8.585 | SFPL52 | OHARA | 21.88 |
| S67 | 269.438 | 5.901 | | | 21.07 |
| S68 | 115.000 | 0.450 | | | 18.30 |
| S69 | 94.072 | 1.770 | SLAL54 | OHARA | 18.00 |
| S70 | 35.982 | 7.000 | | | 16.65 |
| S71 | −90.502 | 2.010 | SLAL8 | OHARA | 16.35 |
| S72 | 29.972 | 6.150 | STIH53 | OHARA | 16.01 |
| S73 | 82.308 | 2.725 | | | 15.75 |
| S74 | 79.000 | 9.670 | | | 15.78 |
| S75 | 76.232 | 6.100 | SPHM52 | OHARA | 15.87 |
| S76 | −75.003 | 0.761 | | | 15.66 |
| S77 | 45.420 | 7.170 | SFSL5 | OHARA | 14.38 |
| S78 | −45.317 | 1.500 | STIH53 | OHARA | 13.58 |
| S79 | 348.342 | 18.544 | | | 12.98 |
| S80 | Infinity | 13.200 | SBSL7 | OHARA | 10.30 |
| S81 | Infinity | 2.000 | | | 9.00 |
| S82 | Infinity | 33.000 | BAF52 | SCHOTT | 8.70 |
| S83 | Infinity | 0.000 | | | 5.69 |
| S84 | Infinity | 0.000 | | | |
| IMAGE | Infinity | 0.000 | | | |

Note:
Maximum image diameter = 11.0 mm
*Surface profiles os aspheric surfaces S20 amd S34 are governed by the following conventional equation:

$$Z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

where:
CURV = 1/(Radius of Surface)
Y = Aperture height, measured perpendicular to optical axis
K, A, B, C, D = Coefficients
Z = Position of surface profile for a given Y value, as measured along the optical axis from the pole (i.e. axial vertex) of the surface.

| The coefficients for the surface S20 are: | |
|---|---|
| K = | −0.3564030 |
| A = | −8.06827e−07 |
| B = | −2.15109e−10 |
| C = | −6.36649e−14 |
| D = | −3.89379e−18 |

| The coefficients for the surface S34 are: | |
|---|---|
| K = | 0.4304790 |
| A = | 9.57697e−07 |
| B = | 1.31318e−09 |
| C = | −1.45592e−12 |
| D = | 3.19536e−15 |

| VARIABLE THICKNESS POSITIONS AND DATA | | | | | | |
|---|---|---|---|---|---|---|
| P1 | P2 | P3 | P4 | P5 | P6 | P7 |

-continued

TABLES FOR FIGS. 10 thru 62
LENS SYSTEM OPTICAL PRESCRIPTION

| | | | | | | | |
|---|---|---|---|---|---|---|---|
| EFL | 7.391 | 8.820 | 12.231 | 19.219 | 32.730 | 64.634 | −93.220 |
| F/No. | 1.949 | 1.949 | 1.949 | 1.949 | 1.949 | 1.949 | 2.010 |
| S0 | Infinity | Infinity | 5322.630 | 2499.896 | Infinity | 5322.630 | Infinity |
| S3 | 19.882 | 19.882 | 49.699 | 78.333 | 19.882 | 49.699 | 19.882 |
| S5 | 5.690 | 5.690 | 10.880 | 15.384 | 5.690 | 10.879 | 5.690 |
| S11 | 71.522 | 71.522 | 36.516 | 3.376 | 71.522 | 36.516 | 71.522 |
| S18 | 1.350 | 26.428 | 67.051 | 110.745 | 155.094 | 189.151 | 203.856 |
| S25 | 319.660 | 292.522 | 247.857 | 197.854 | 142.790 | 92.653 | 65.474 |
| S32 | 9.625 | 11.684 | 15.727 | 22.036 | 32.751 | 48.830 | 61.304 |
| S51 | 1.498 | 1.498 | 1.498 | 1.498 | 1.498 | 1.498 | 2.823 |
| S57 | 63.257 | 63.257 | 63.257 | 63.257 | 63.257 | 63.257 | 61.933 |

VARIABLE THICKNESS POSITIONS AND DATA

| | P8 | P9 | P10 | P11 | P12 | P13 | P14 |
|---|---|---|---|---|---|---|---|
| EFL | 145.184 | 206.228 | 490.401 | 717.511 | 2065.045 | −3694.934 | −920.968 |
| F/No. | 2.090 | 2.360 | 2.840 | 5.600 | 13.064 | 13.064 | 13.064 |
| S0 | 5322.630 | Infinity | 5322.630 | Infinity | Infinity | 8708.002 | 4050.000 |
| S3 | 49.699 | 19.882 | 49.699 | 19.882 | 19.882 | 38.428 | 57.882 |
| S5 | 10.879 | 5.690 | 10.879 | 5.690 | 5.690 | 9.057 | 12.294 |
| S11 | 36.516 | 71.522 | 36.516 | 71.522 | 71.522 | 49.608 | 26.917 |
| S18 | 210.392 | 215.814 | 218.877 | 223.339 | 224.980 | 224.980 | 224.980 |
| S25 | 50.046 | 33.074 | 24.338 | 10.235 | 1.719 | 1.719 | 1.719 |
| S32 | 70.197 | 81.746 | 87.419 | 97.063 | 103.934 | 103.934 | 103.934 |
| S51 | 4.711 | 9.572 | 14.559 | 31.080 | 63.536 | 63.536 | 63.536 |
| S57 | 60.044 | 55.183 | 50.196 | 33.675 | 1.220 | 1.220 | 1.220 |

VARIABLE THICKNESS POSITIONS AND DATA

| | P15 | P16 | P17 | P18 | P19 | P20 |
|---|---|---|---|---|---|---|
| EFL | −509.031 | −1739.084 | −387.928 | 7.227 | 114.357 | 377.554 |
| F/No. | 16.750 | 5.600 | 5.600 | 1.949 | 2.010 | 2.360 |
| S0 | 2499.896 | 5322.630 | 2499.896 | 2499.896 | 2499.896 | 2499.896 |
| S3 | 78.333 | 49.699 | 78.333 | 78.333 | 78.333 | 78.333 |
| S5 | 15.384 | 10.879 | 15.384 | 15.384 | 15.384 | 15.384 |
| S11 | 3.376 | 36.516 | 3.376 | 3.376 | 3.376 | 3.376 |
| S18 | 224.980 | 223.339 | 223.339 | 1.350 | 203.856 | 215.814 |
| S25 | 1.719 | 10.235 | 10.235 | 319.660 | 65.474 | 33.074 |
| S32 | 103.934 | 97.063 | 97.063 | 9.625 | 61.304 | 81.746 |
| S51 | 63.536 | 31.080 | 31.080 | 1.498 | 2.823 | 9.572 |
| S57 | 1.220 | 33.675 | 33.675 | 63.257 | 61.933 | 55.183 |

| Surface Groups | Focal Lengths |
|---|---|
| S2–S3 | −349.648 |
| S4–S5 | −581.962 |
| S6–S7 | 798.201 |
| S10–S11 | 1258.758 |
| S12–S13 | 672.072 |
| S14–S15 | 709.848 |
| S16–S17 | 646.676 |
| S19–S20 | −64.565 |
| S21–S22 | −526.211 |
| S23–S25 | −554.999 |
| S26–S27 | 135.208 |
| S28–S30 | 113230.702 |
| S31–S32 | 240.348 |
| S34–S35 | −65.863 |
| S36–S37 | 144.623 |
| S38–S40 | 60.255 |
| S41–S43 | −70.987 |
| S44–S45 | 58.010 |
| S46–S47 | 205.873 |
| S48–S49 | 52.593 |
| S50–S51 | 38.634 |
| S52–S53 | −27.000 |
| S54–S55 | −34.933 |
| S56–S57 | −2495.053 |
| S58–S59 | 284.851 |
| S60–S61 | 167.476 |
| S62–S64 | 292.466 |
| S66–S67 | 97.878 |
| S69–S70 | −90.217 |

-continued

TABLES FOR FIGS. 10 thru 62
LENS SYSTEM OPTICAL PRESCRIPTION

| | |
|---|---|
| S71–S73 | −72.295 |
| S75–S76 | 61.902 |
| S77–S79 | 1261.227 |
| S80–S81 | Infinity |
| S82–S83 | Infinity |

The Lens System Optical Prescription table comprises the "Listing" for the lens specification and numerically lists each lens "SURFACE" in the left-hand column, but also includes dummy surfaces used in the design such as dummy surfaces S1, S8, S9, S18, S65, S74 and S84. The second column "Radius" lists the radius of the respective surfaces with a negative radius indicating that the center of curvature is to the left. The third column "Thickness" lists the thickness of the lens element or space from that surface to the next surface on the optical axis. The fourth column "Glass Name" lists the type of glass and the fifth column "Manufacturer" lists the manufacturer of each glass material. The fifth column "Semi Aperture" provides a measurement of half the aperture diameter for each lens element.

In the left-hand column the legend "OBJECT" means the object to be imaged (e.g., photographed), the legend "STOP" means the iris or stop, and the legend "IMAGE" means the final image. Each of the surfaces is identified by a numeral preceded by "S" to distinguish the surfaces from the numerals that identify the lens elements set forth on the subsequent pages comprising the 39 glass lens elements described above with respect to FIG. 10 and prisms 40 and 41 of the detector.

It should be noted that each of the thickness dimensions set forth in the third column of the table listing the surfaces is the element thickness or air space along the optical axis for the zoom lens system ZL set to the shortest focal lens (7.39 mm EFL) and focused at infinity. The air spaces adjacent the moving lens groups obviously will change in "thickness" for other focal lengths and focus distances.

For each aspheric surface, Aspheric Coefficients are provided following the table of optical prescriptions.

FIGS. 11–30 illustrate 20 representative positions for the zoom lens system of FIG. 10. These 20 positions are listed in the following Table of Lens Positions:

TABLE OF LENS POSITIONS

| Paraxial EFL | | Focus Distance (mm) To Object* | | | | |
|---|---|---|---|---|---|---|
| (mm) @ Infinity Focus | "F" No. | INF. | 8758 | 5372 | 4100 | 2550 |
| 7.3909 | 1.95 | 1 | | | | 18 |
| 8.8200 | 1.95 | 2 | | | | |
| 12.1938 | 1.95 | | | 3 | | |
| 18.6371 | 1.95 | | | | 4 | |
| 32.7300 | 1.95 | 5 | | | | |
| 60.2959 | 1.95 | | | 6 | | |
| 93.2199 | 2.01 | 7 | | | | 19 |
| 127.2902 | 2.09 | | | 8 | | |
| 206.2278 | 2.36 | 9 | | | | 20 |
| 297.4279 | 2.84 | | | 10 | | |

-continued

TABLE OF LENS POSITIONS

| Paraxial EFL | | Focus Distance (mm) To Object* | | | | |
|---|---|---|---|---|---|---|
| (mm) @ Infinity Focus | "F" No. | INF. | 8758 | 5372 | 4100 | 2550 |
| 717.5114 | 5.60 | 11 | | 16 | | 17 |
| 2065.0447 | 13.06 | 12 | 13 | | 14 | 15# |

*The Focus Distance is measured to the Object from the first refractive surface of the zoom lens system.
The "F" No. equals 16.75 at this position.

The twenty (20) positions were selected as representative of extreme positions of focal length and focus distance, as well as intermediate positions, for establishing the representative performances of the zoom lens system ZL of FIG. 10. In other words, position 1 is at the minimum paraxial focal length (wide angle) of about 7.4 mm and focused at infinity whereas position 18 is focused at 2550 mm (about eight feet) for the same focal length. Similarly, position 12 represents the longest paraxial focal length of about 2065 mm at infinity focus whereas position 15 represents the focus at 2550 mm at the same paraxial focal length. The paraxial EFL in the first column is at infinity focus. The "f" numbers are at any given focus and at full aperture. The 12 different focal lengths provide representative focal lengths over the full range of the zoom lens system ZL. Also, it should be noted that the actual field of view as a result of distortion and the available physical overtravel of the zoom groups beyond data in the lens system optical prescription set forth below produces an apparent focal length range of substantially 7.0 mm to 2100 mm, i.e. a zoom ratio of about 300:1, with the distortion primarily influencing the reduction in the minimum paraxial EFL and the overtravel primarily influencing the increase in the maximum paraxial EFL. At 2100 mm EFL with focus set at eight feet, the magnification is about 1.33:1.00 (object to image size). The nominal lens design for the embodiment of FIGS. 10–62 as reflected in the lens optical prescription tables for FIGS. 10–62 is given at 77° F. (25° C., 298 K) and standard atmospheric pressure (760 mm Hg).

Figure 11:
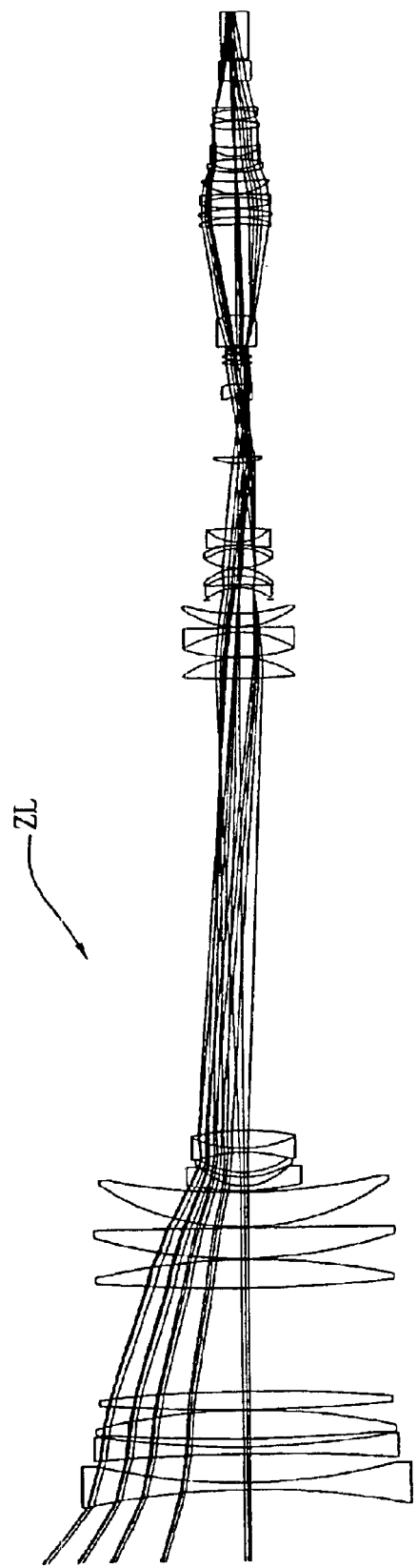
Figure 12:
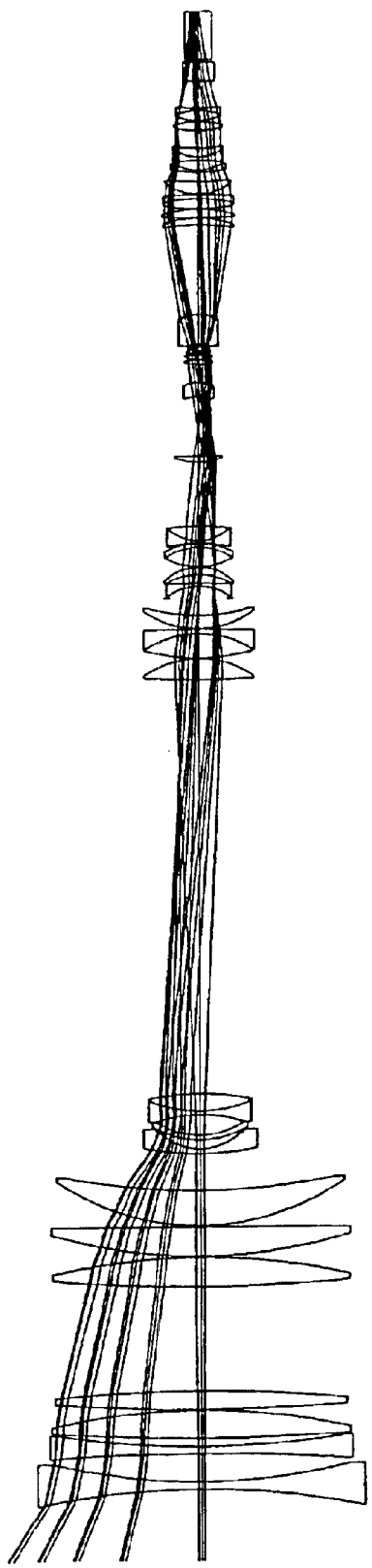
Figure 13:
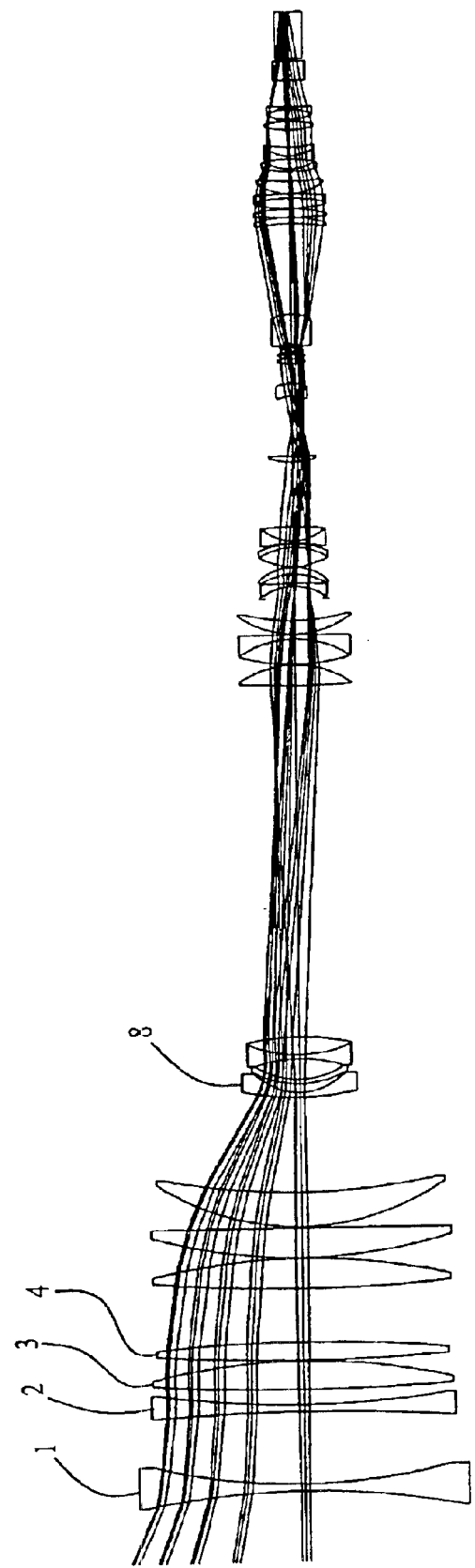
Figure 14:
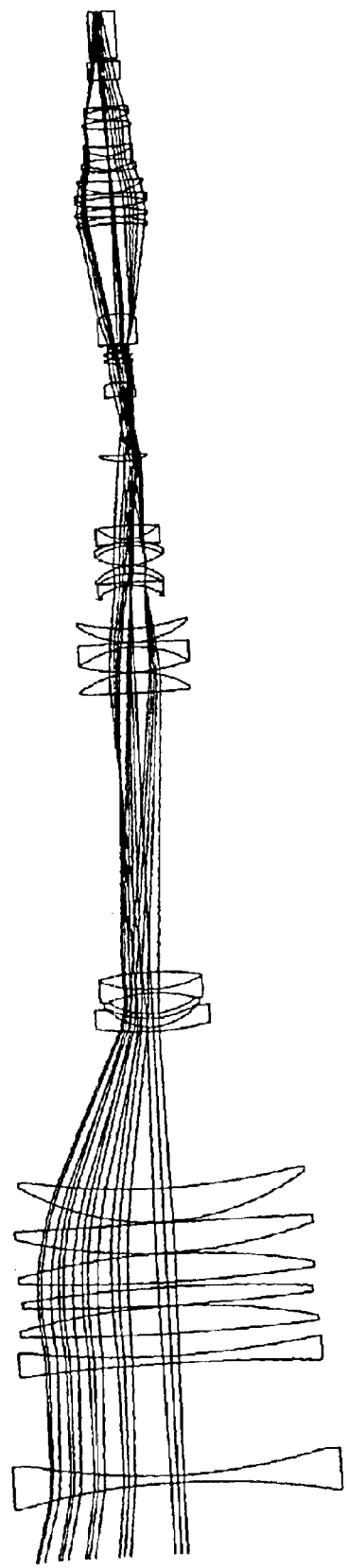
Figure 15:
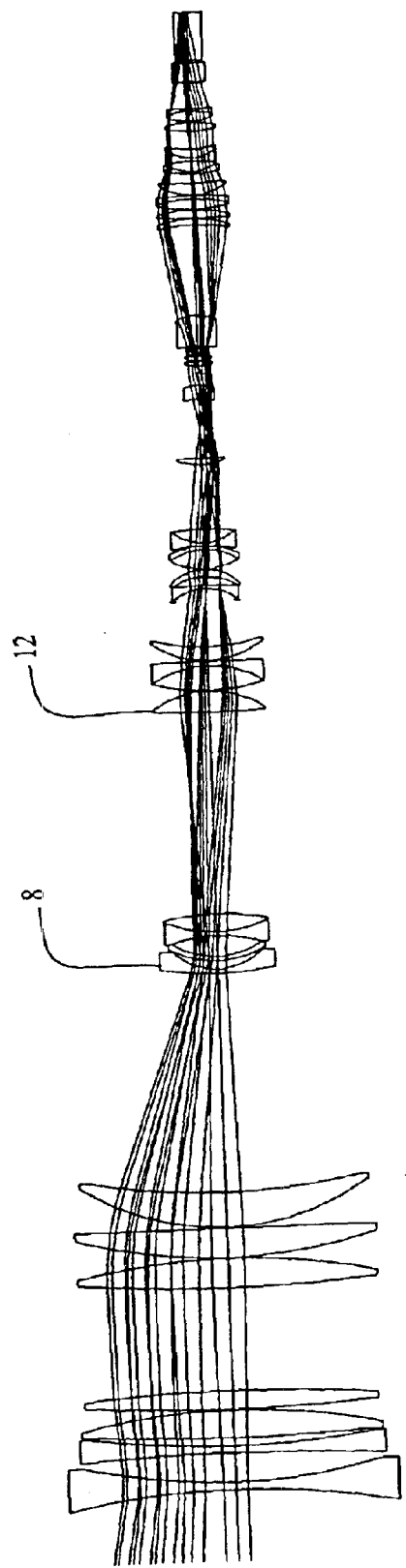
Figure 16:
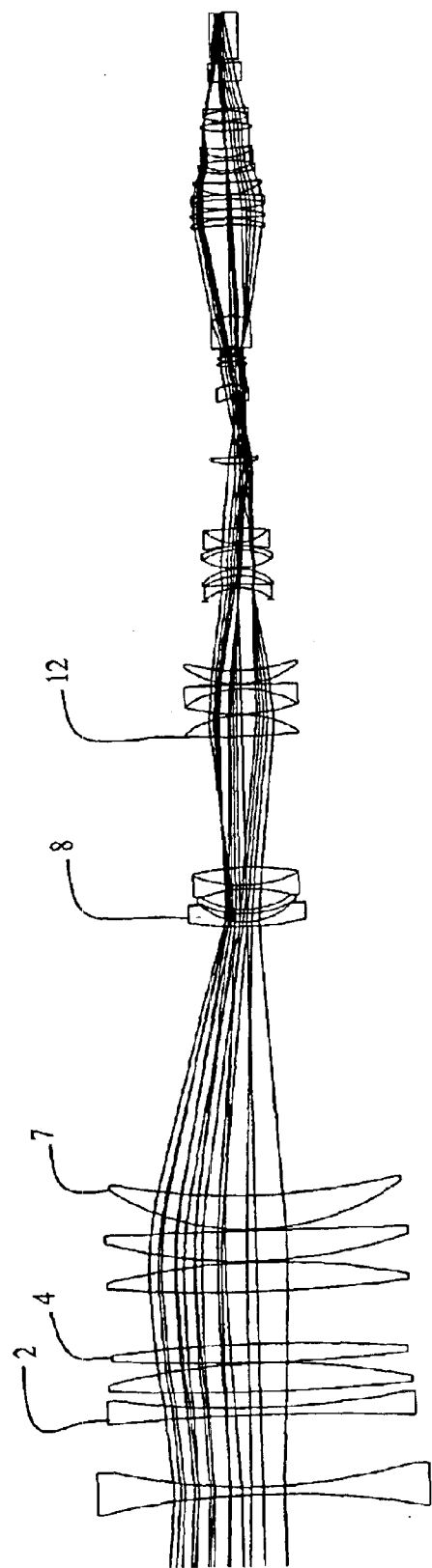
Figure 17:
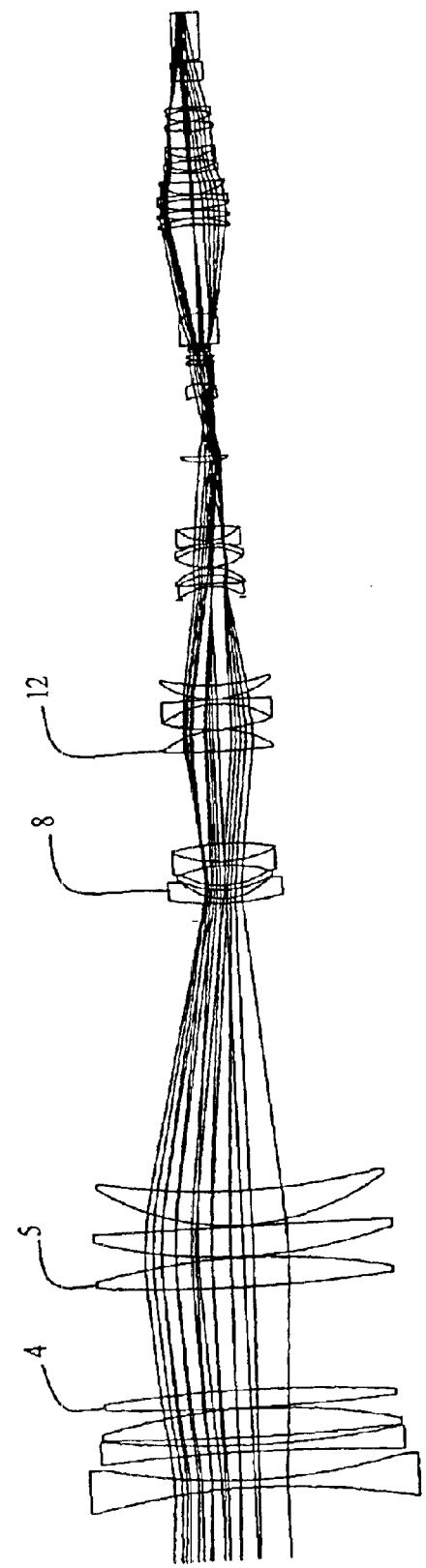
Figure 18:
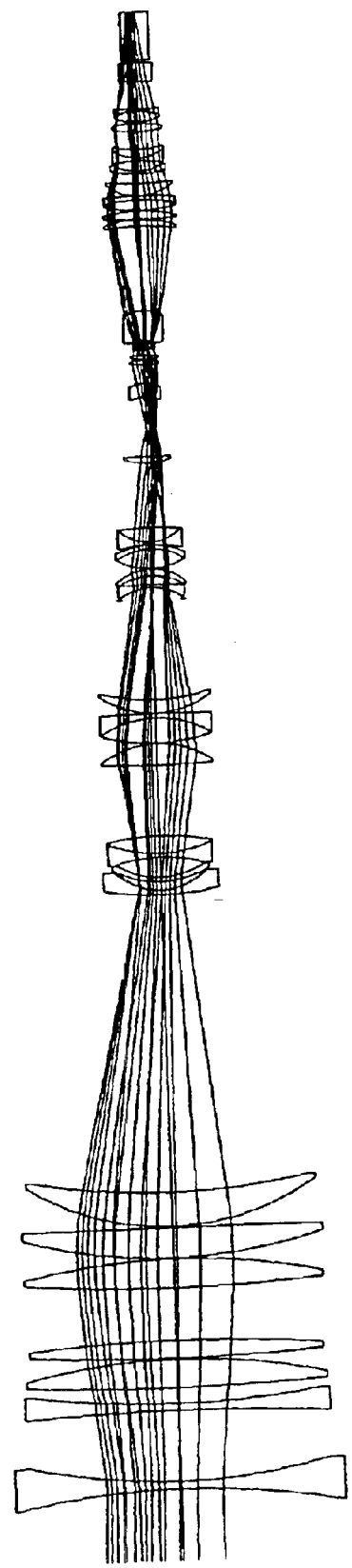
Figure 19:
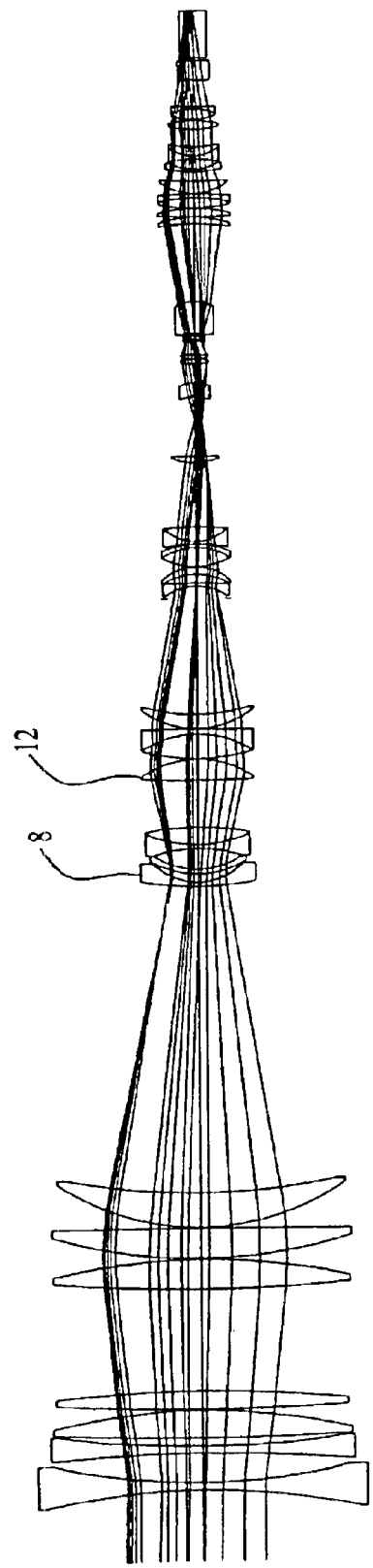
Figure 20:
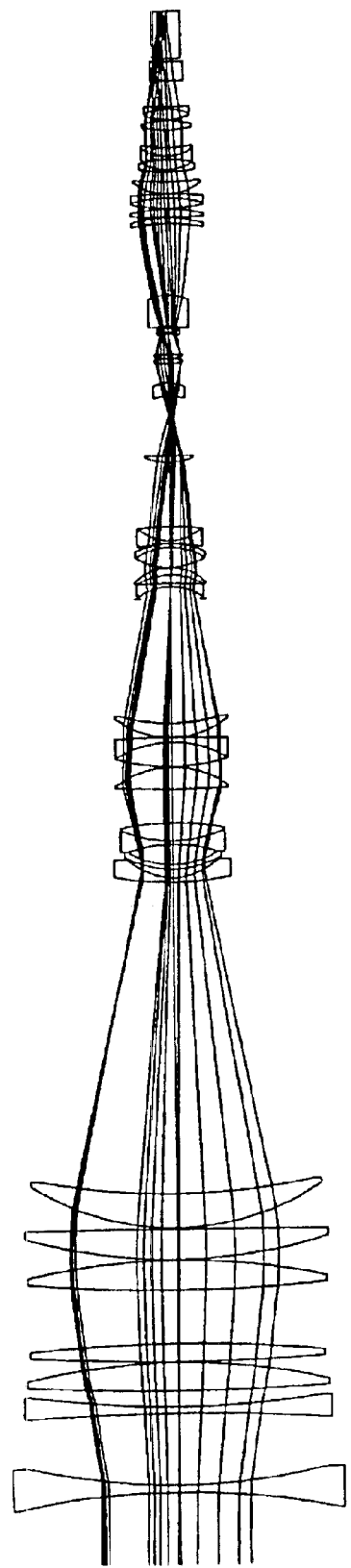
Figure 21:
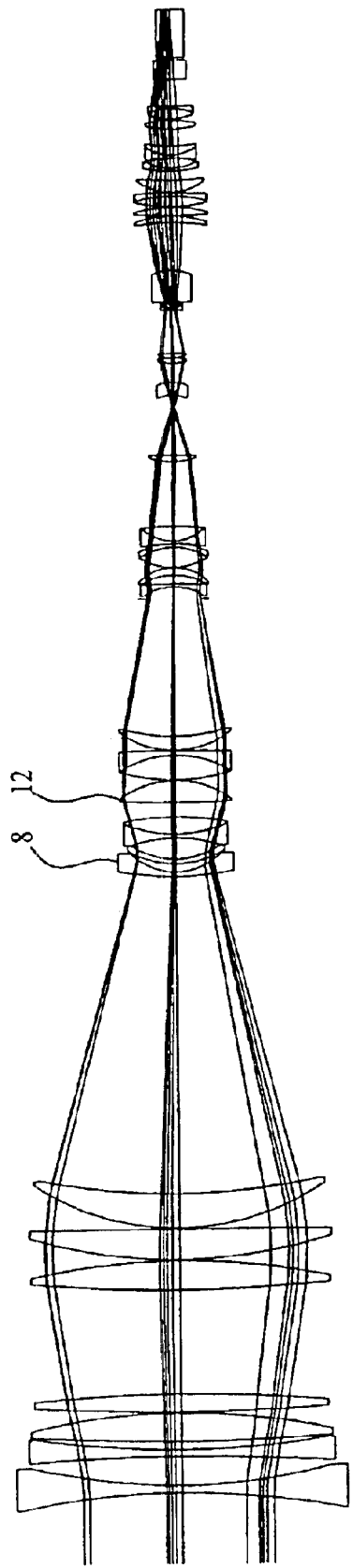
Figure 22:
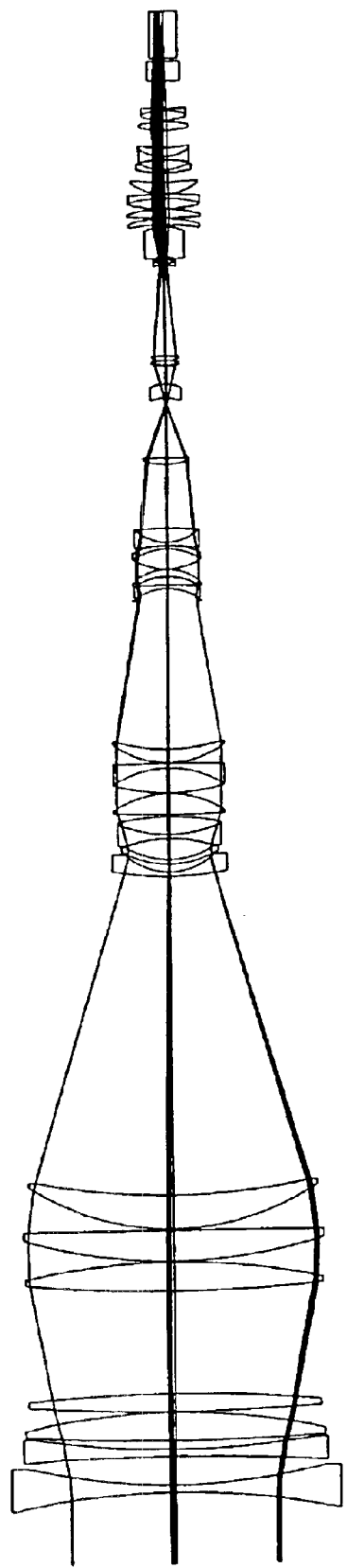
Figure 23:
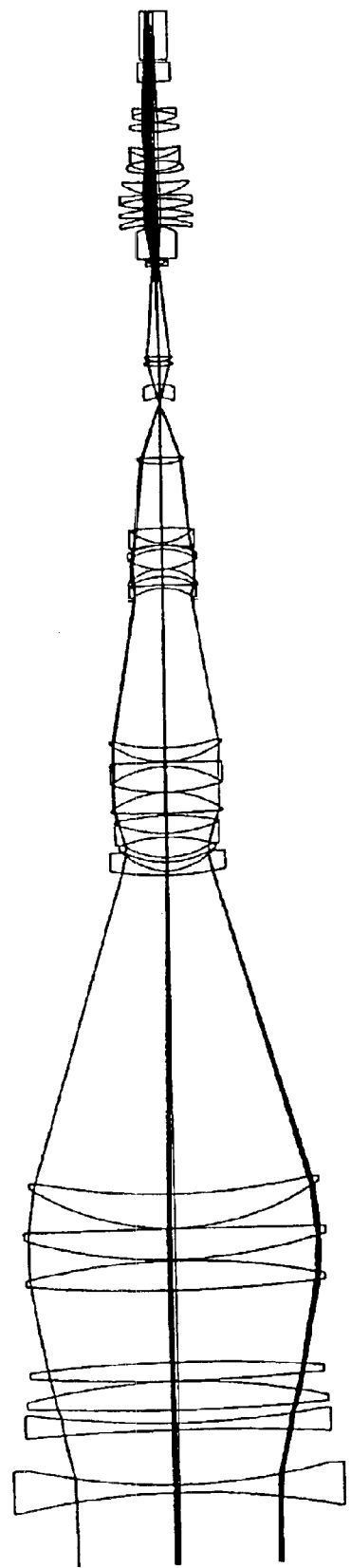
Figure 24:
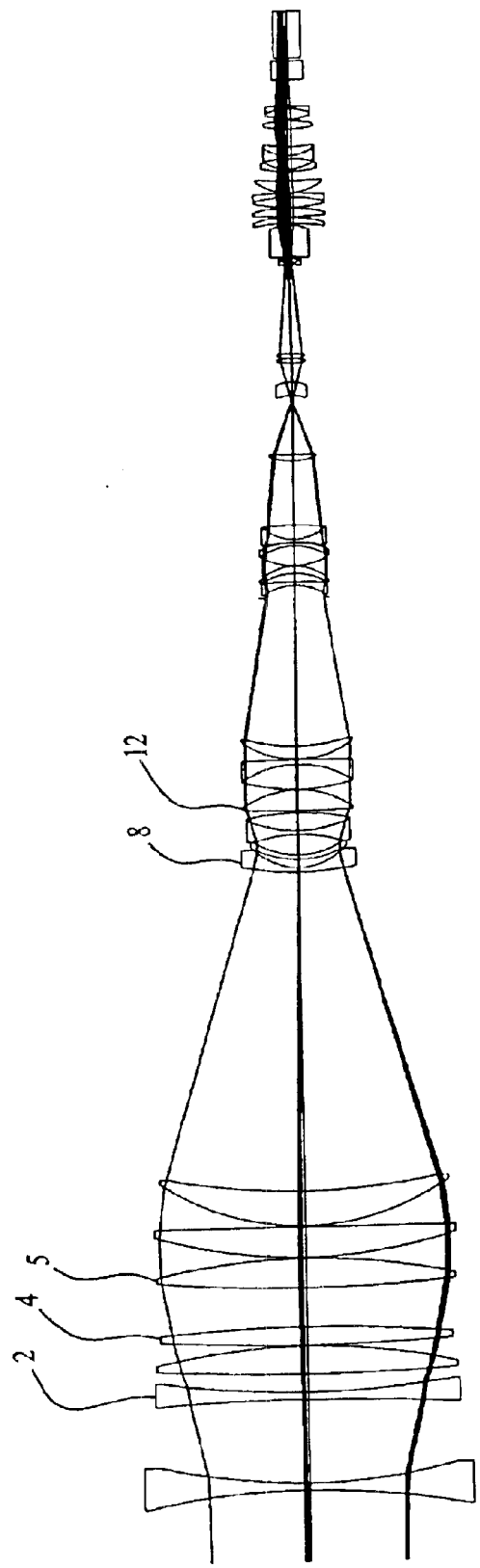
Figure 25:
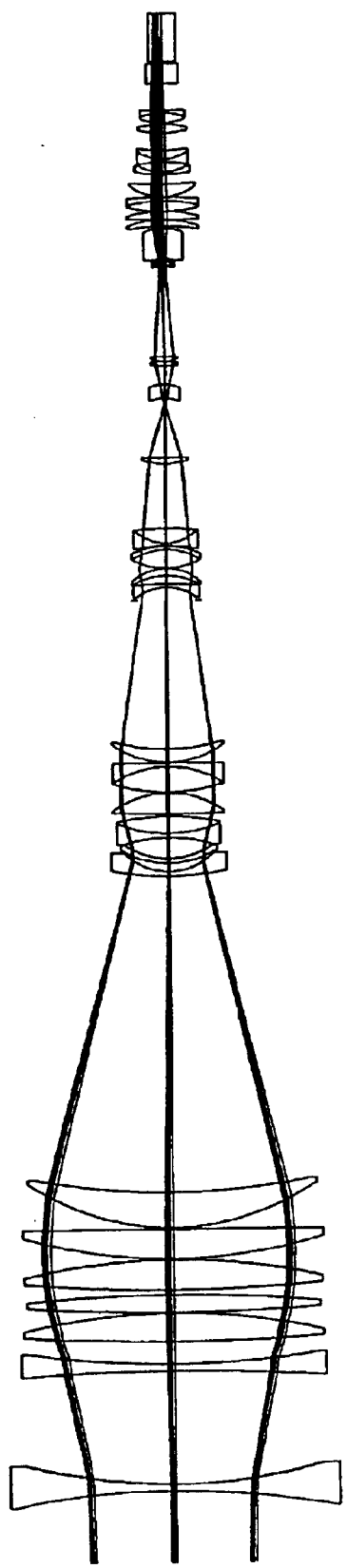
Figure 26:
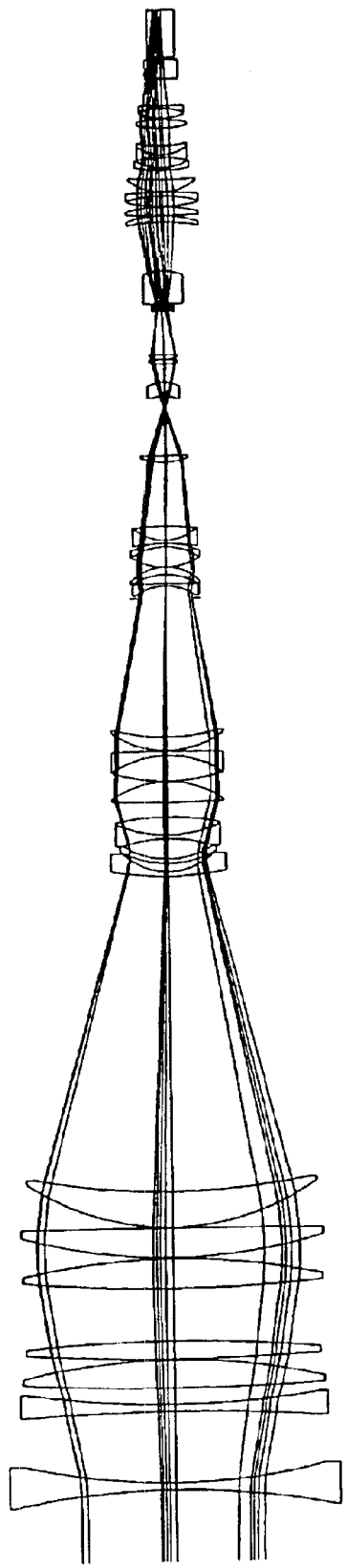
Figure 27:
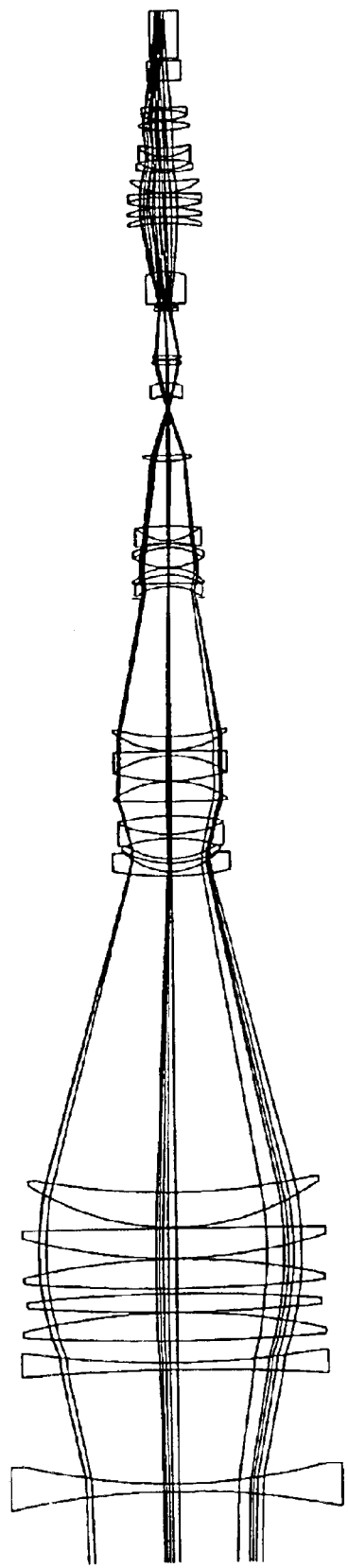
Figure 28:
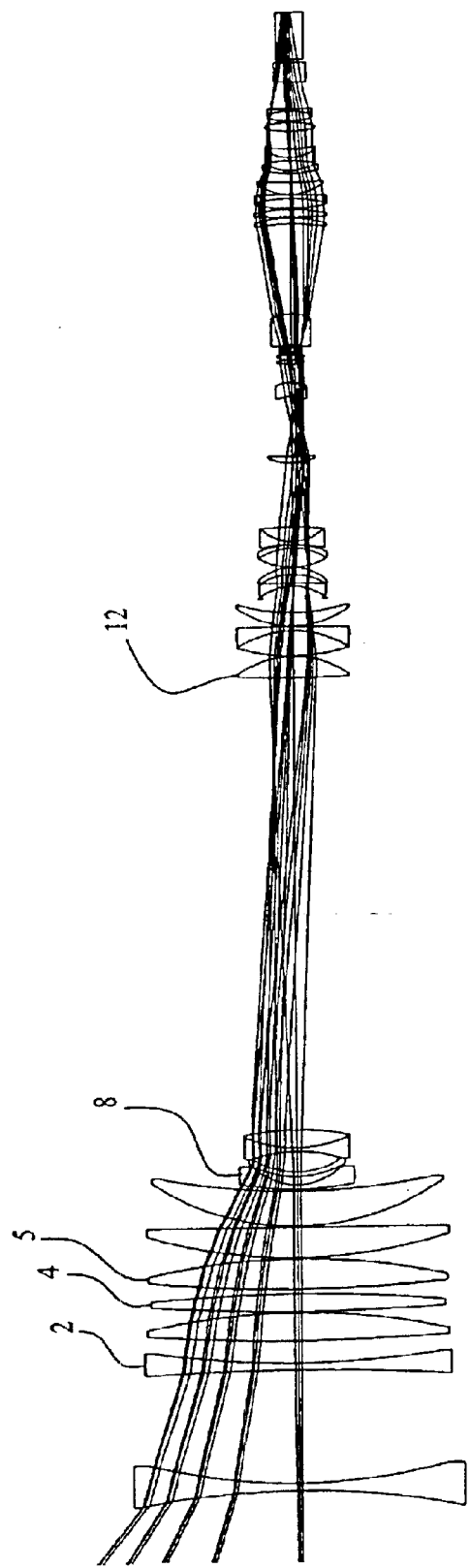
Figure 29:
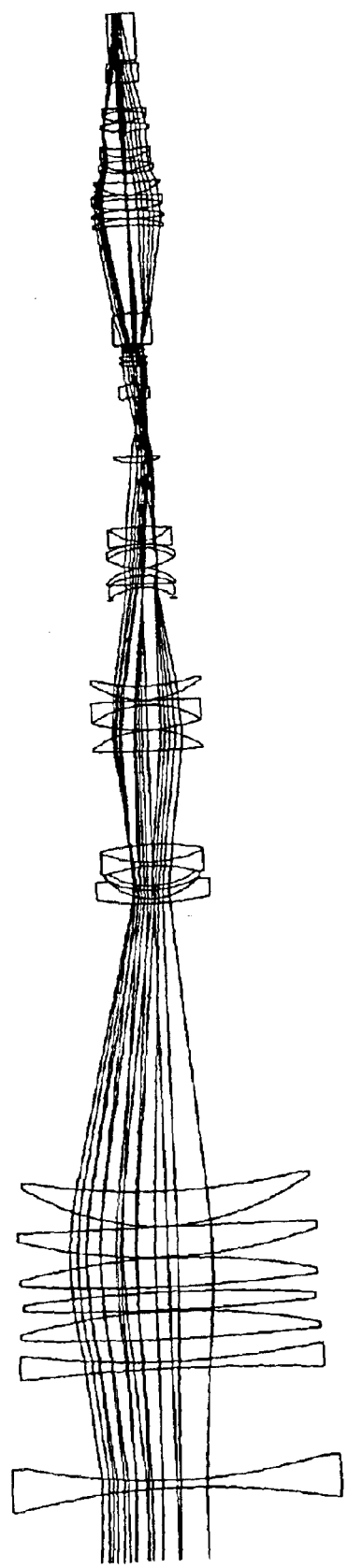
Figure 30:
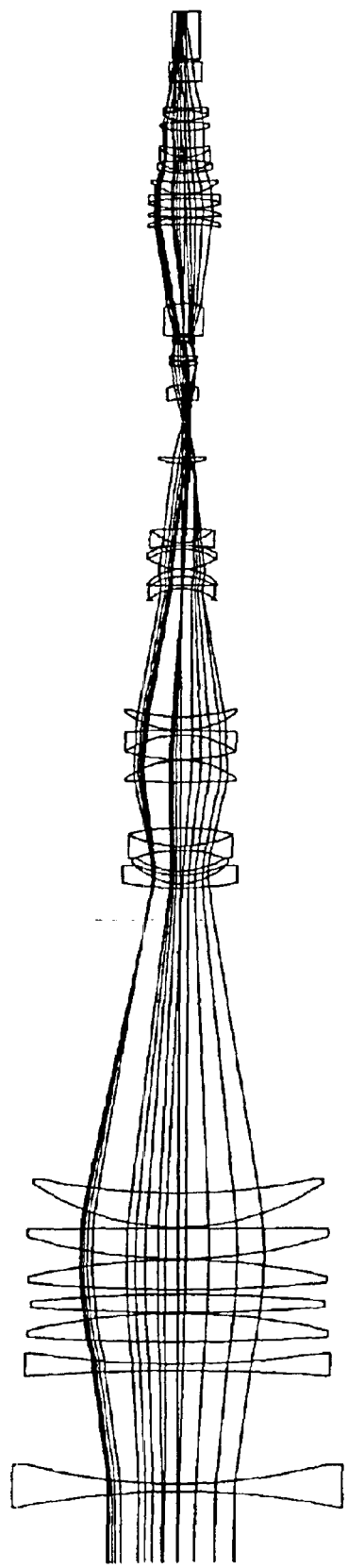
Figure 31:
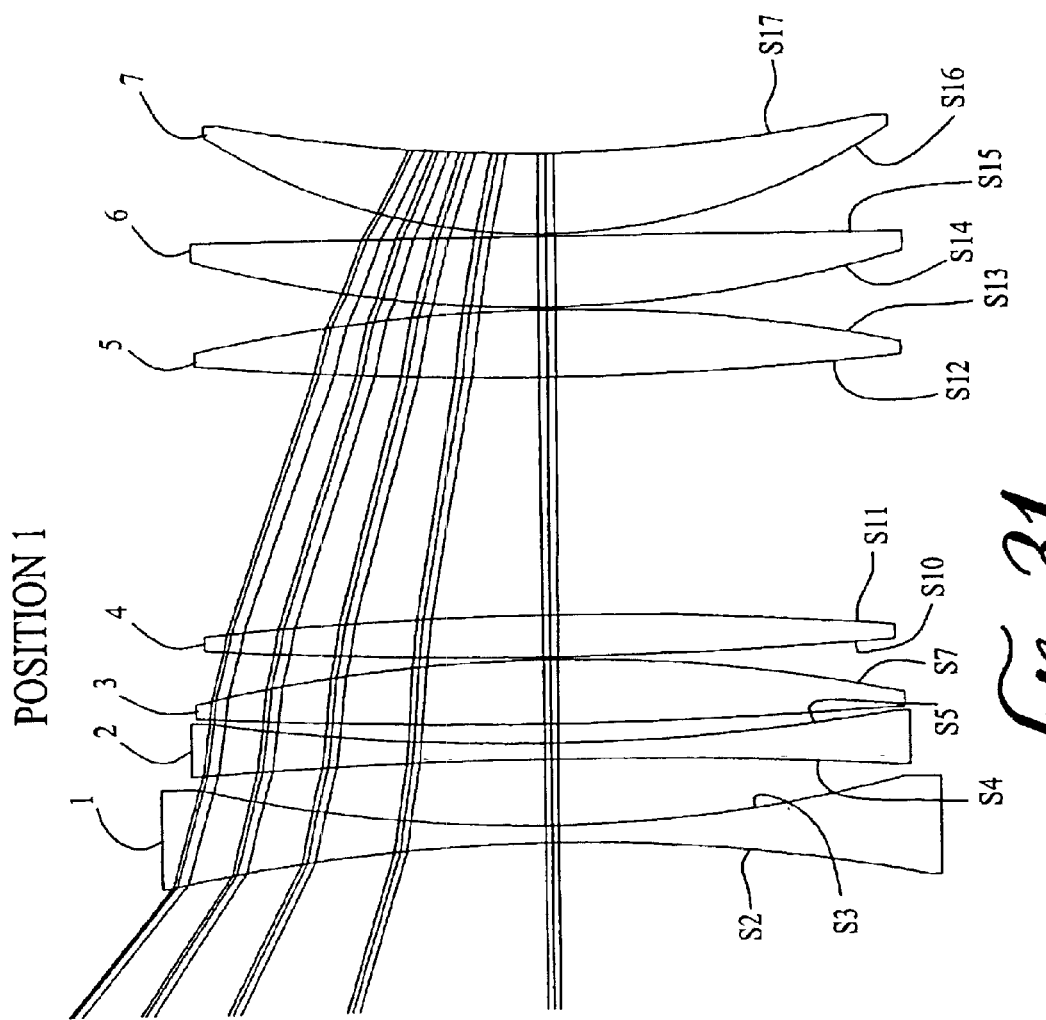

Referring now to FIGS. 11–30, the twenty positions 1–20 set forth in the foregoing lens system optical prescription and the preceding TABLE OF LENS POSITIONS are shown in that order. For example, FIG. 11 is an optical diagram of the lens elements in Position 1, namely, a paraxial effective focal length (EFL) of 7.391 mm and focused at infinity, wherein the first and second focus groups FG1 and FG2 are closely separated, the first and second zoom groups ZG1 and ZG2 are widely separated, and the third zoom group ZG3 is in its most forward position. On the other hand, FIG. 25 is the optical diagram representing Position 15 with the largest focal length and shortest focus distance, wherein the first and second focus groups FG1 and FG2 are both in their rearmost position, the first and second zoom groups ZG1 and ZG2 are in a closely spaced position but intermediately spaced between adjacent lens groups, and the third zoom group ZG3 is in the rearmost position.

Figure 32:
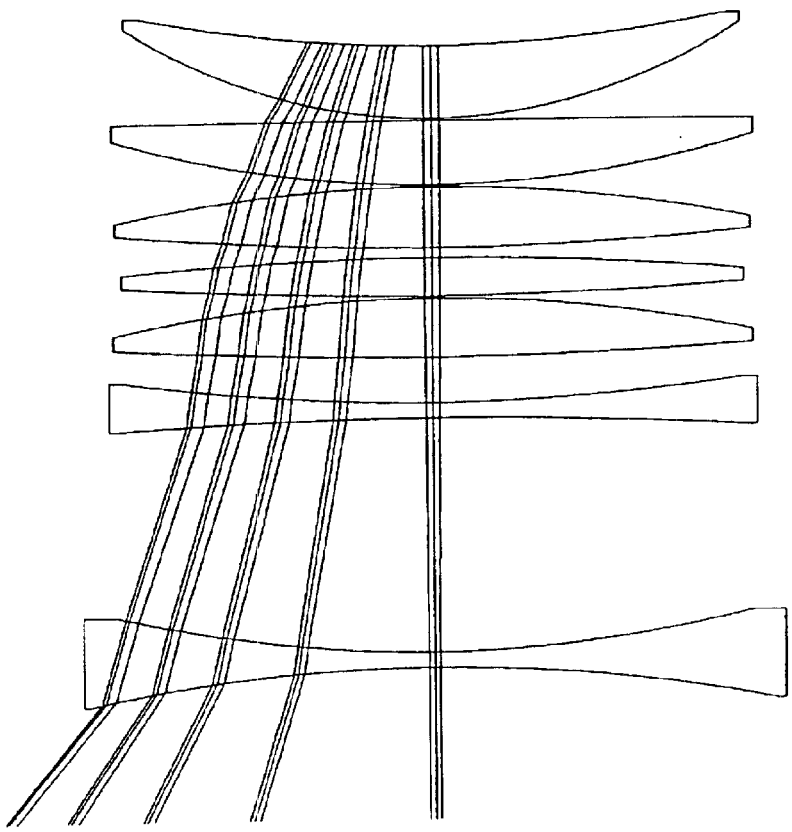
Figure 33:
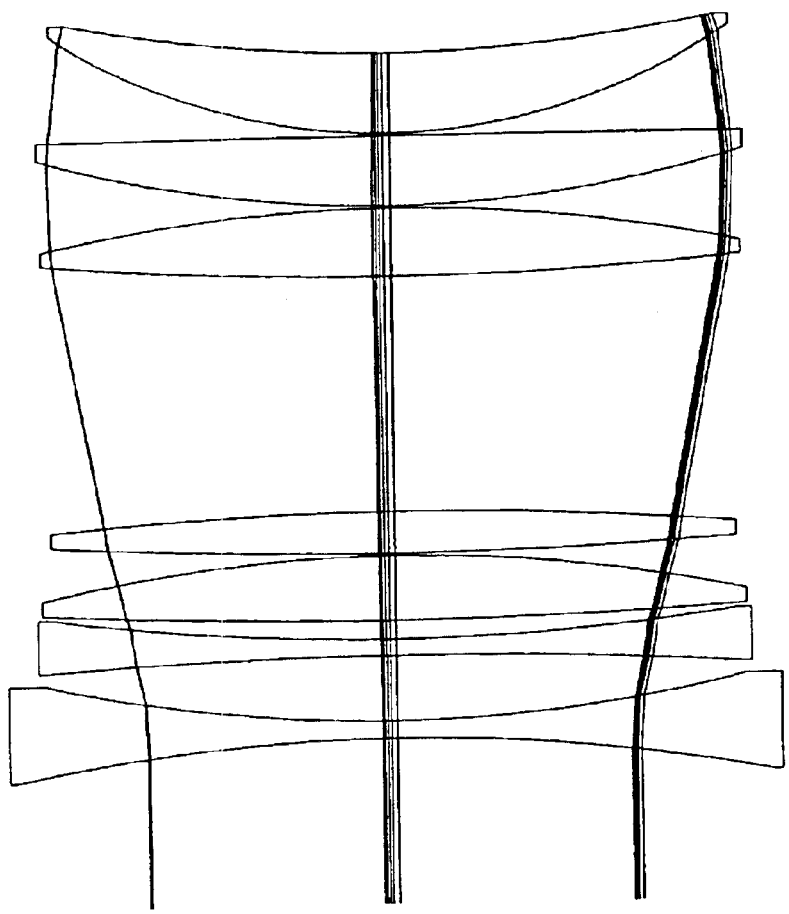
Figure 34:
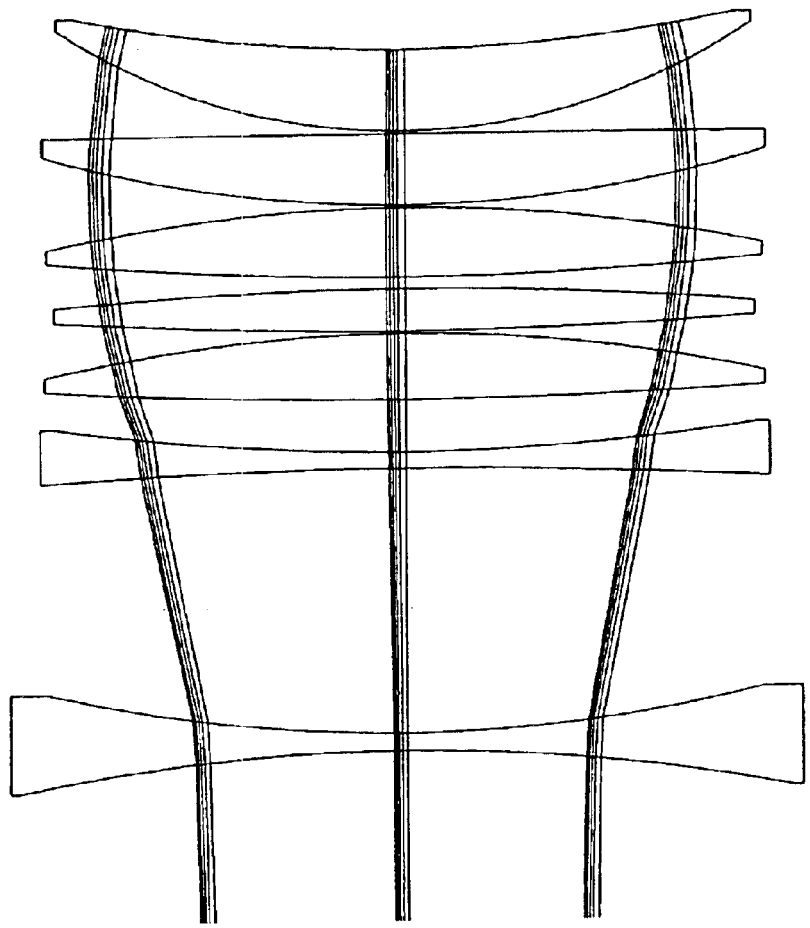

FIGS. 31–34 are enlarged optical diagrams of only the seven focus group FG elements 1–7 and illustrate representative Positions 1, 18, 12 and 15, respectively. It should be noted that while the lens element positions in FIGS. 32 and 34 are the same, representing the focus distance of 2550 mm, the ray tracings are different because of the difference in the paraxial focal lengths from the minimum of about 7.4 mm in FIG. 32 to the maximum of about 2065 mm in FIG. 34.

Figure 35:
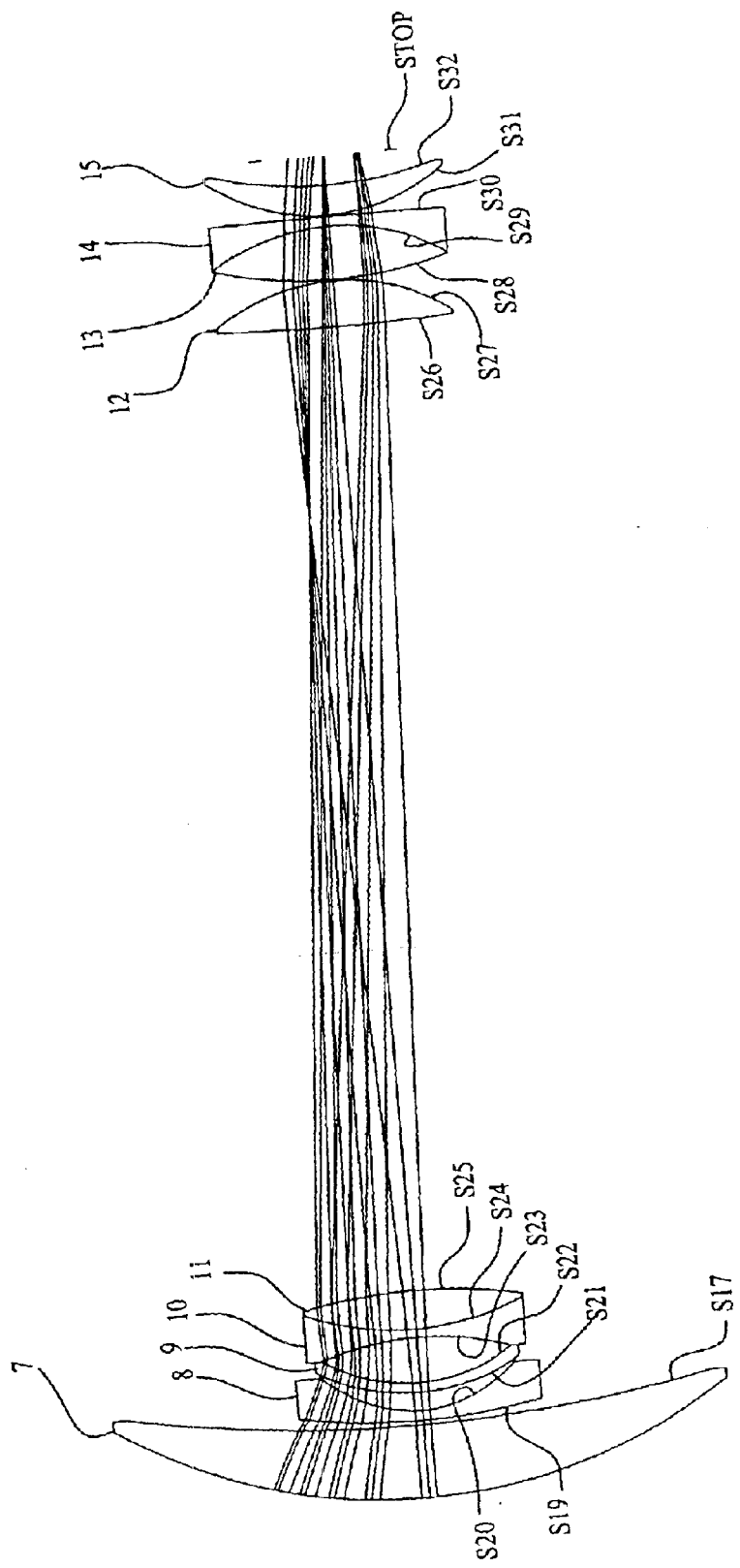
Figure 36:
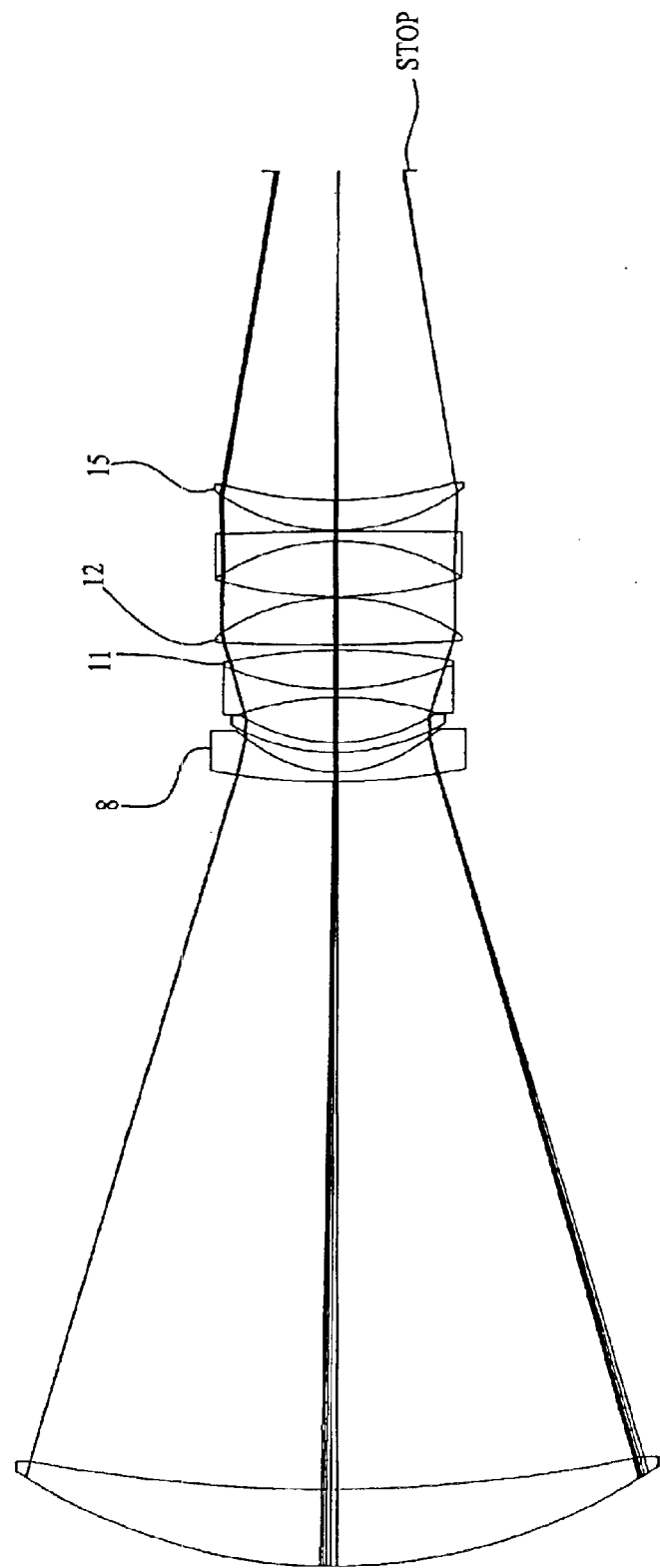
Figure 37:
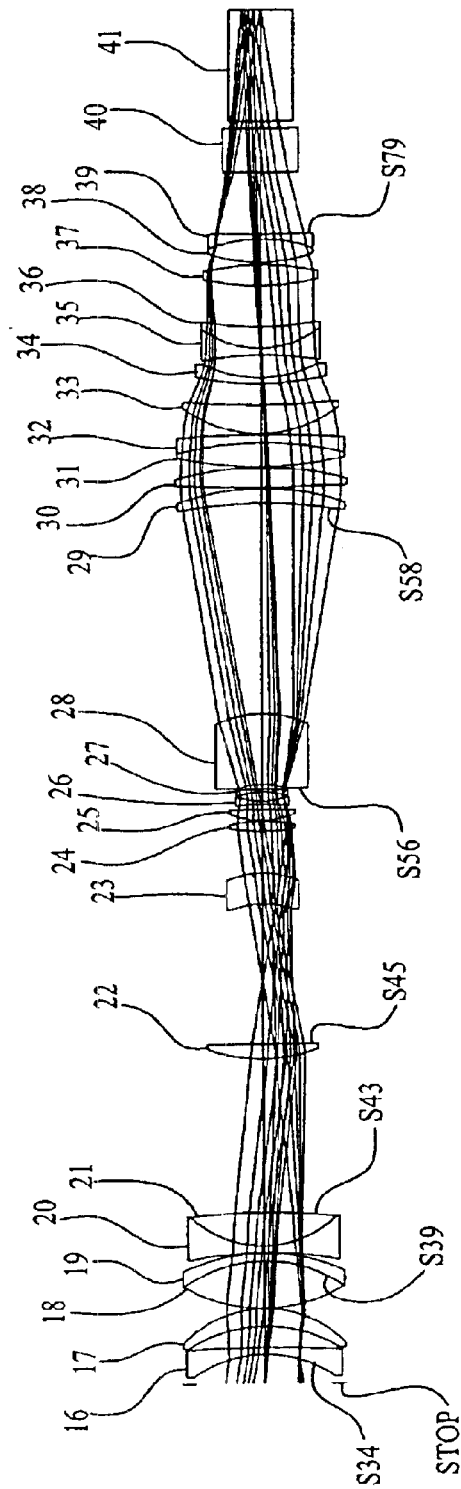
Figure 38:
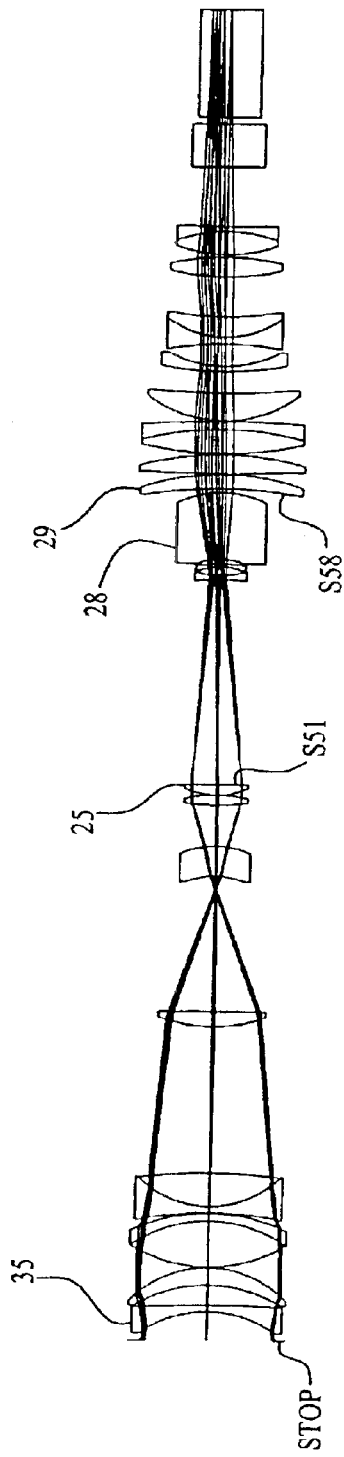
Figure 39:
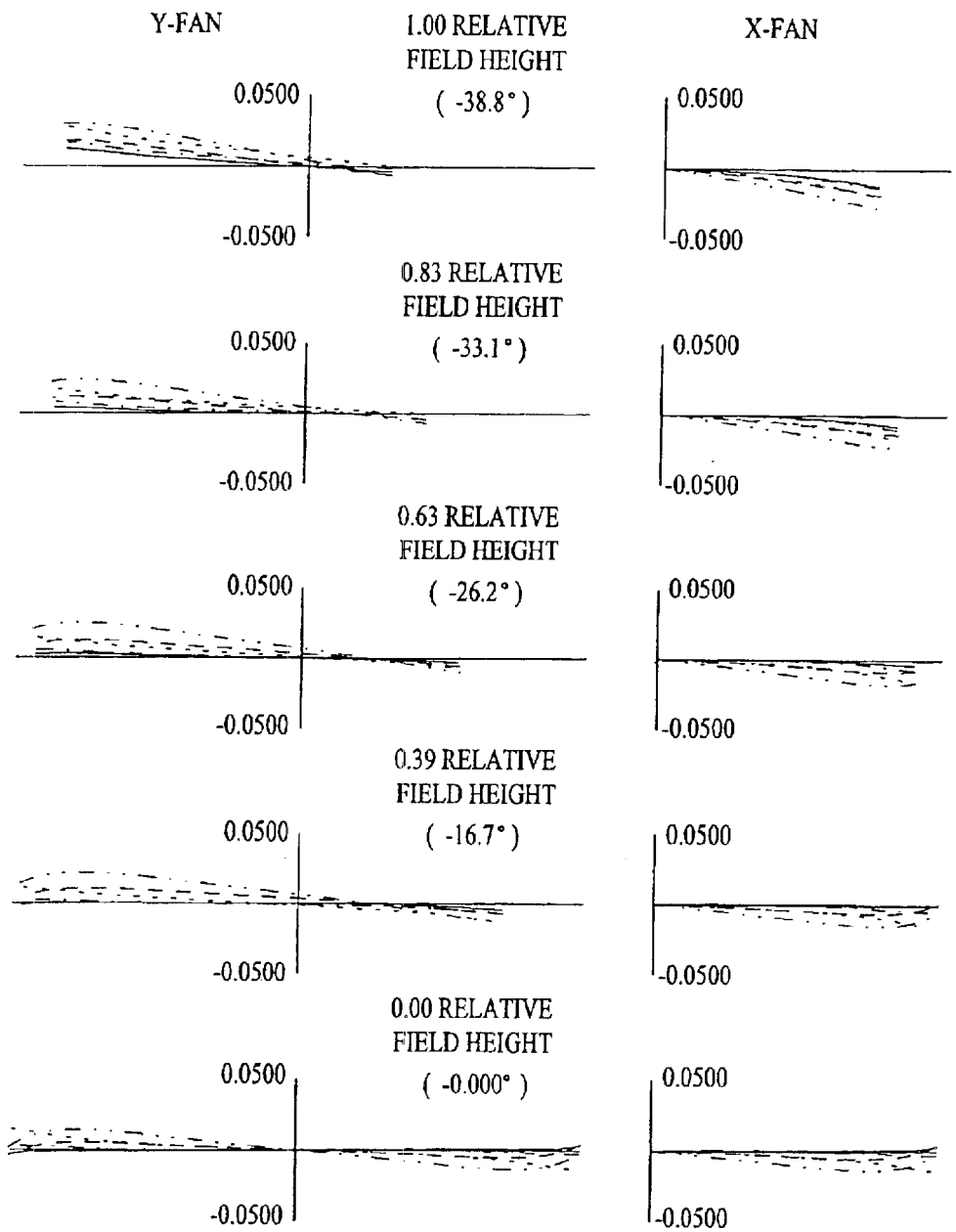
Figure 40:
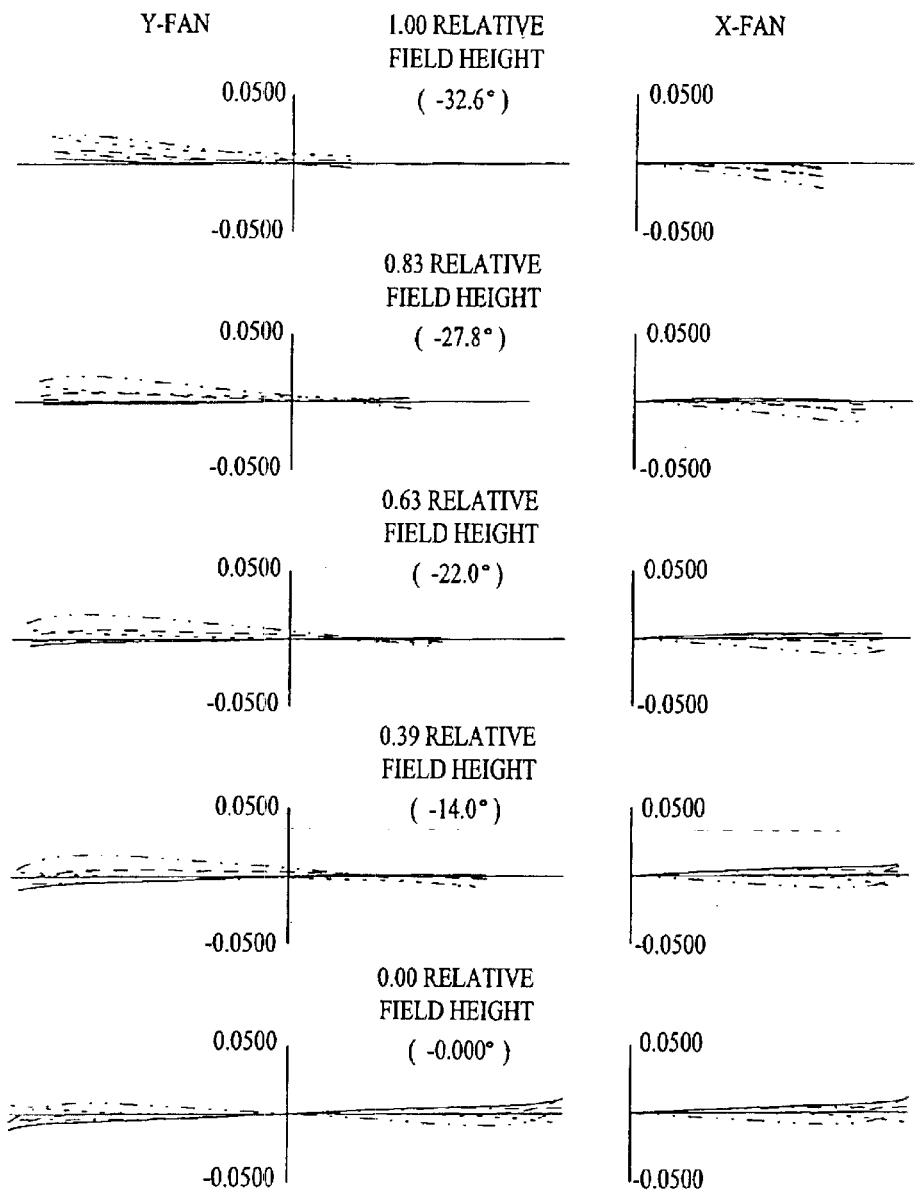
Figure 41:
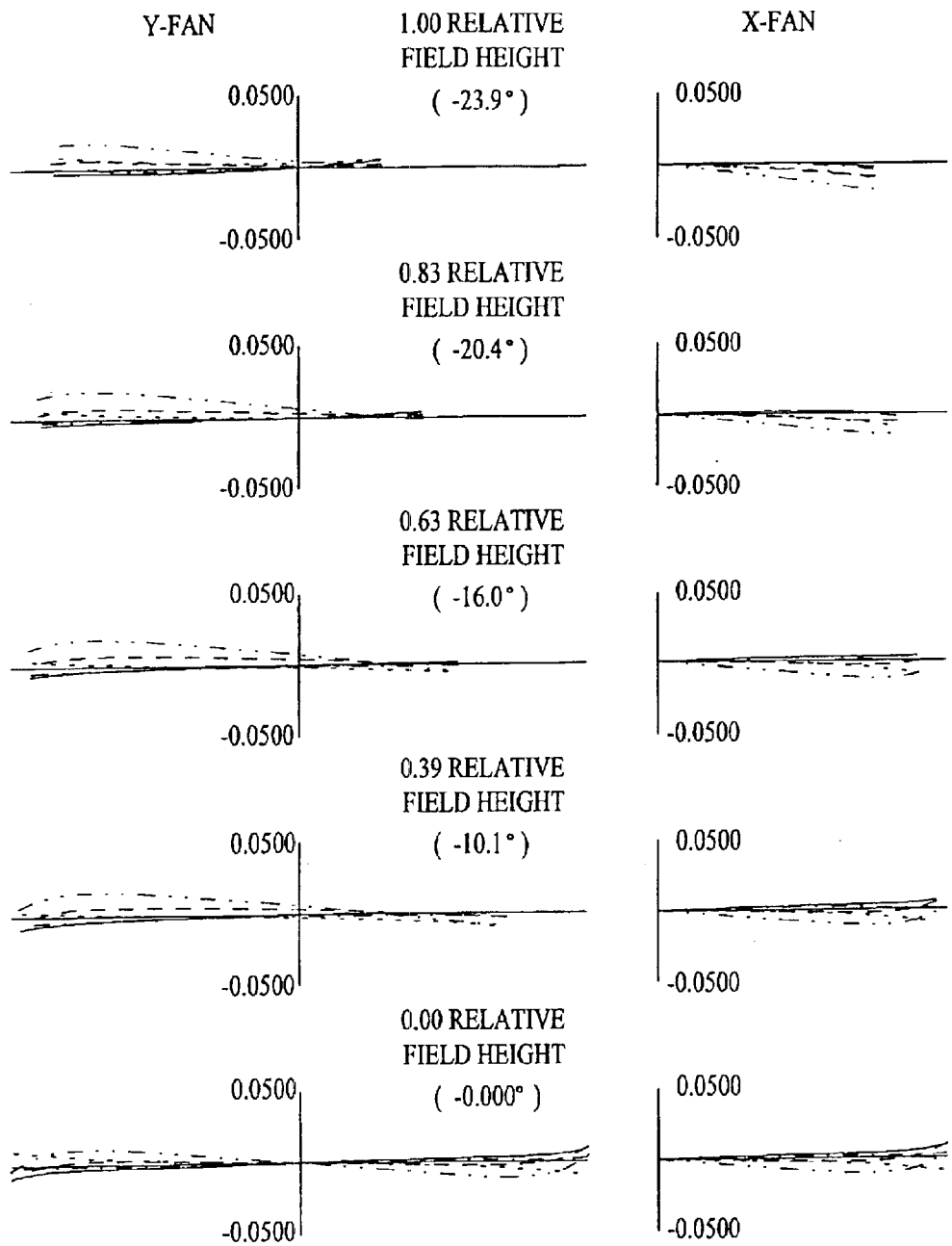
Figure 42:
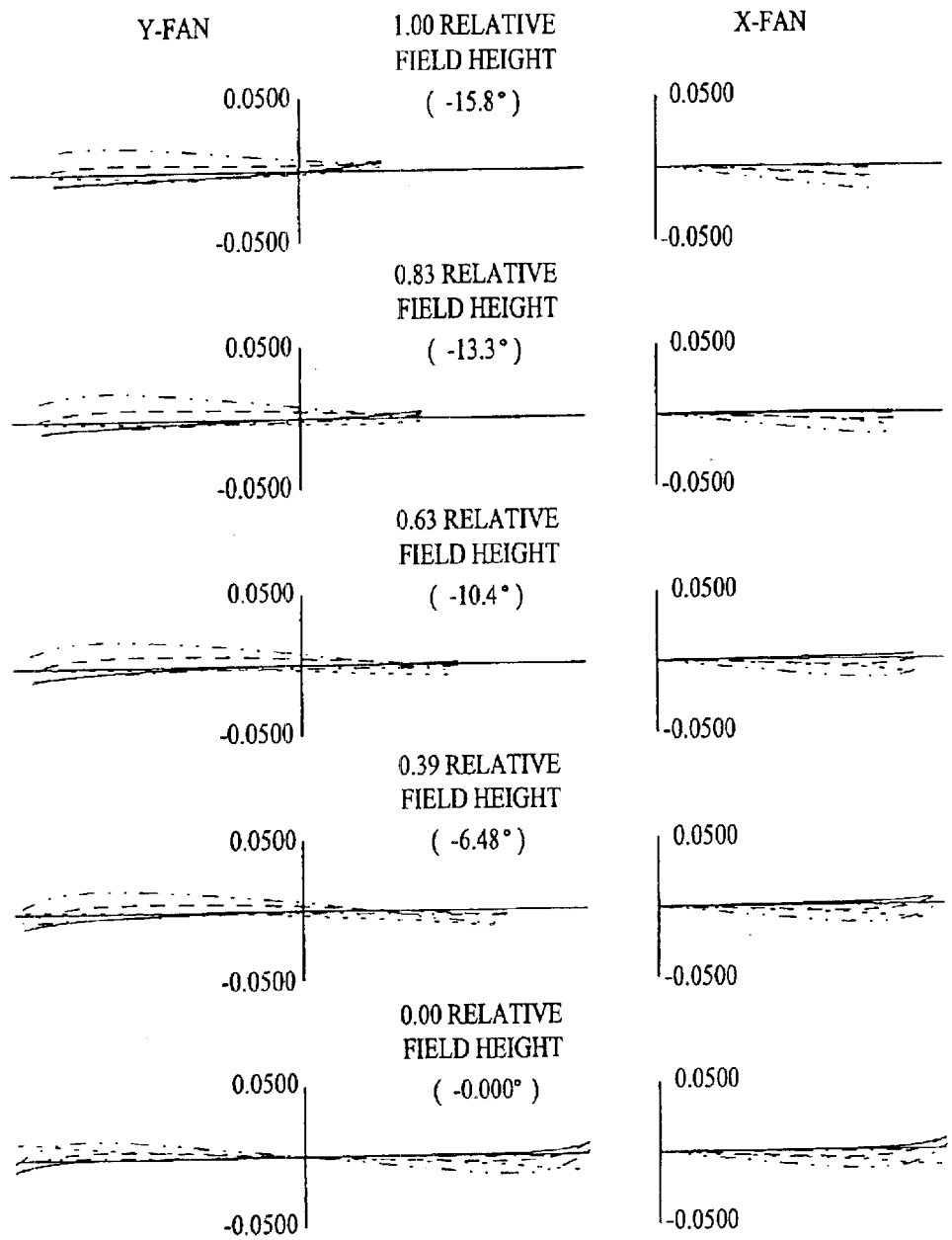
Figure 43:
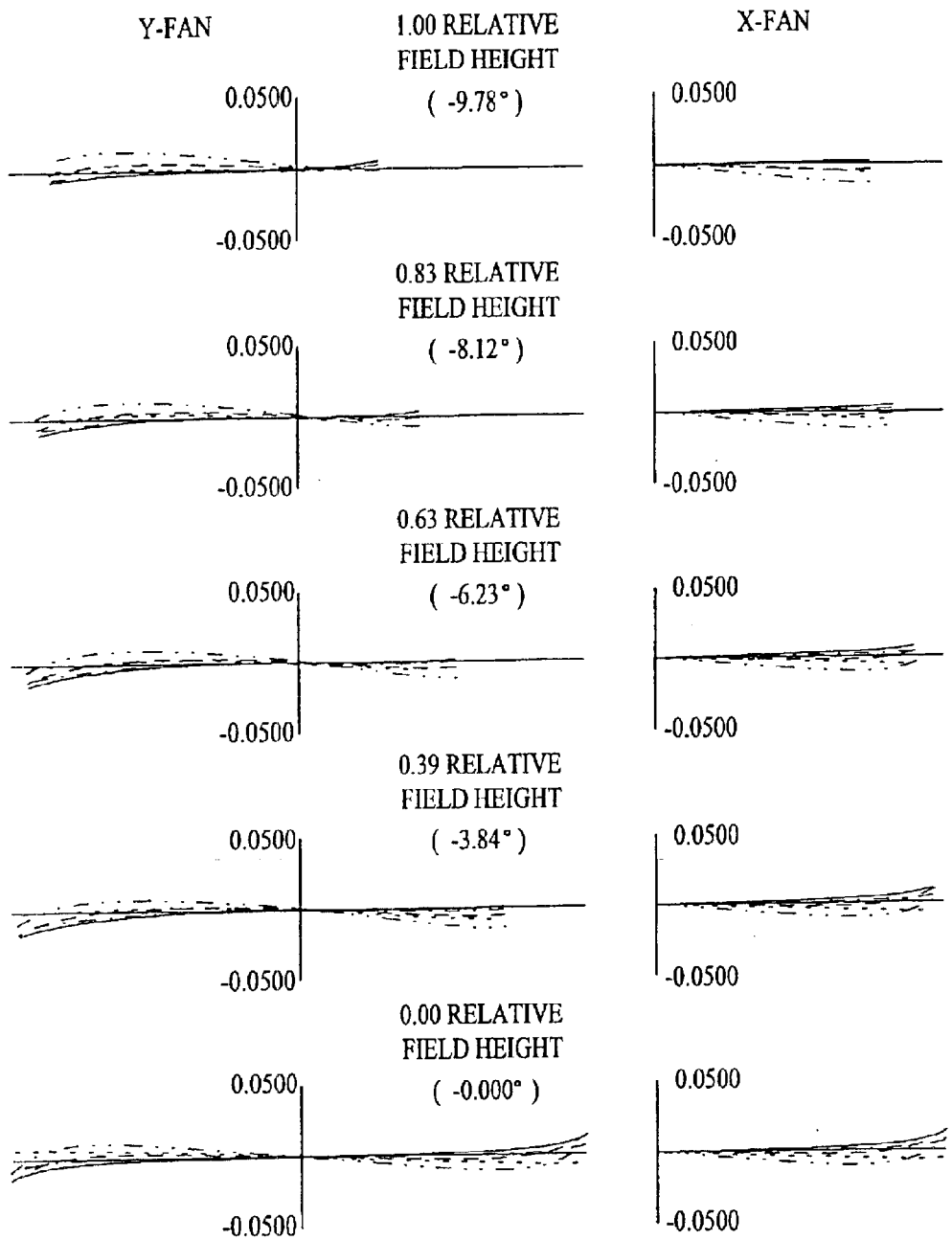
Figure 44:
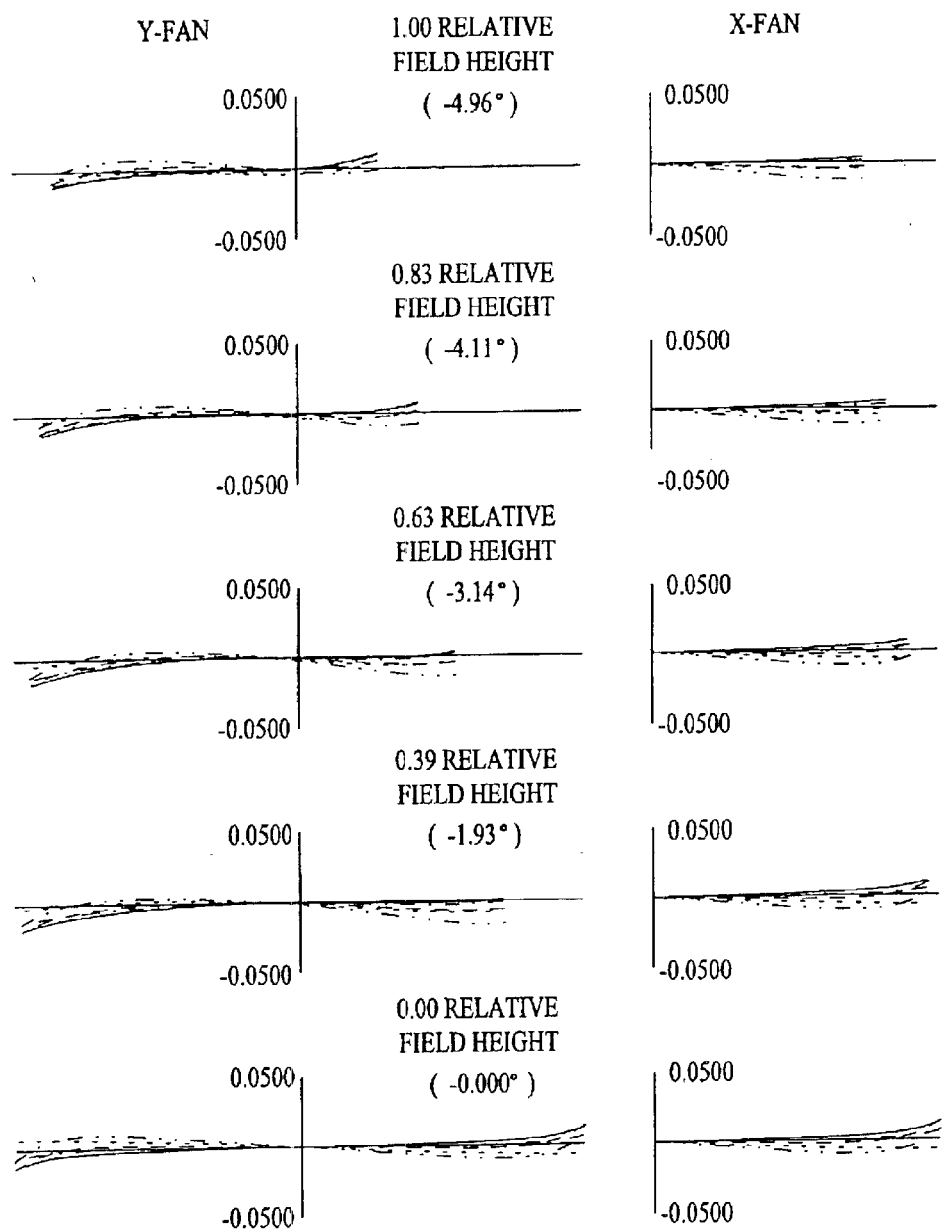
Figure 45:
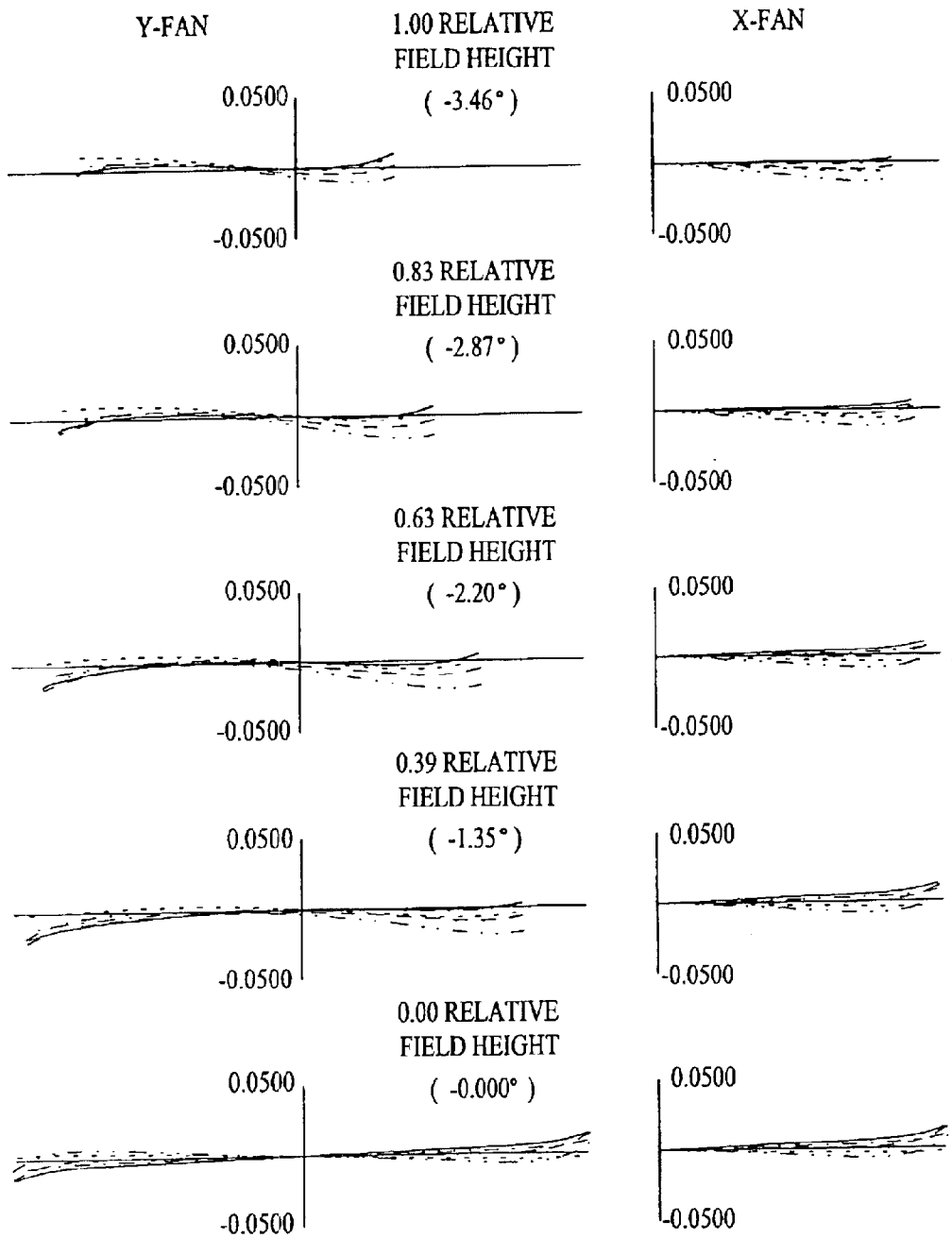
Figure 46:
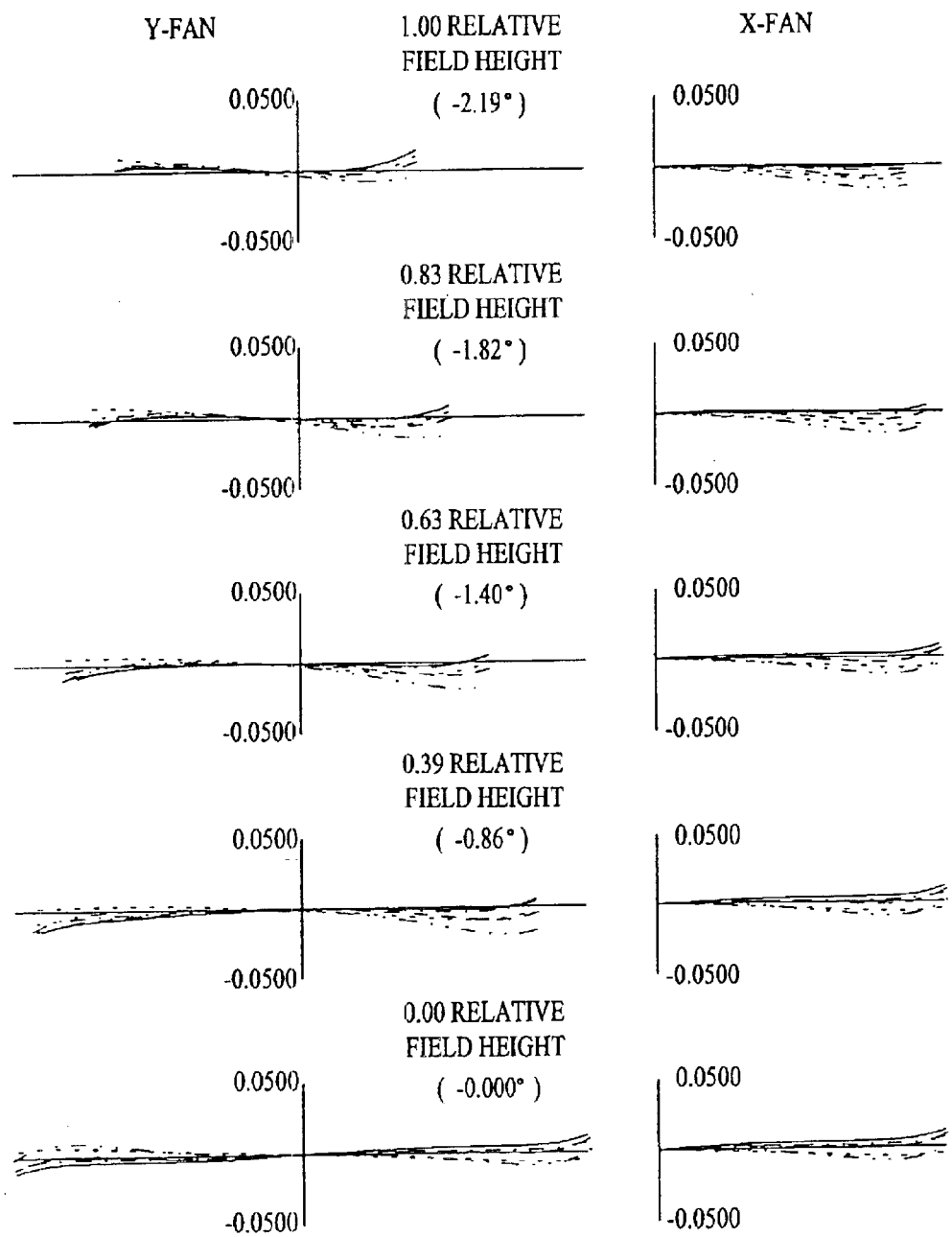
Figure 49:
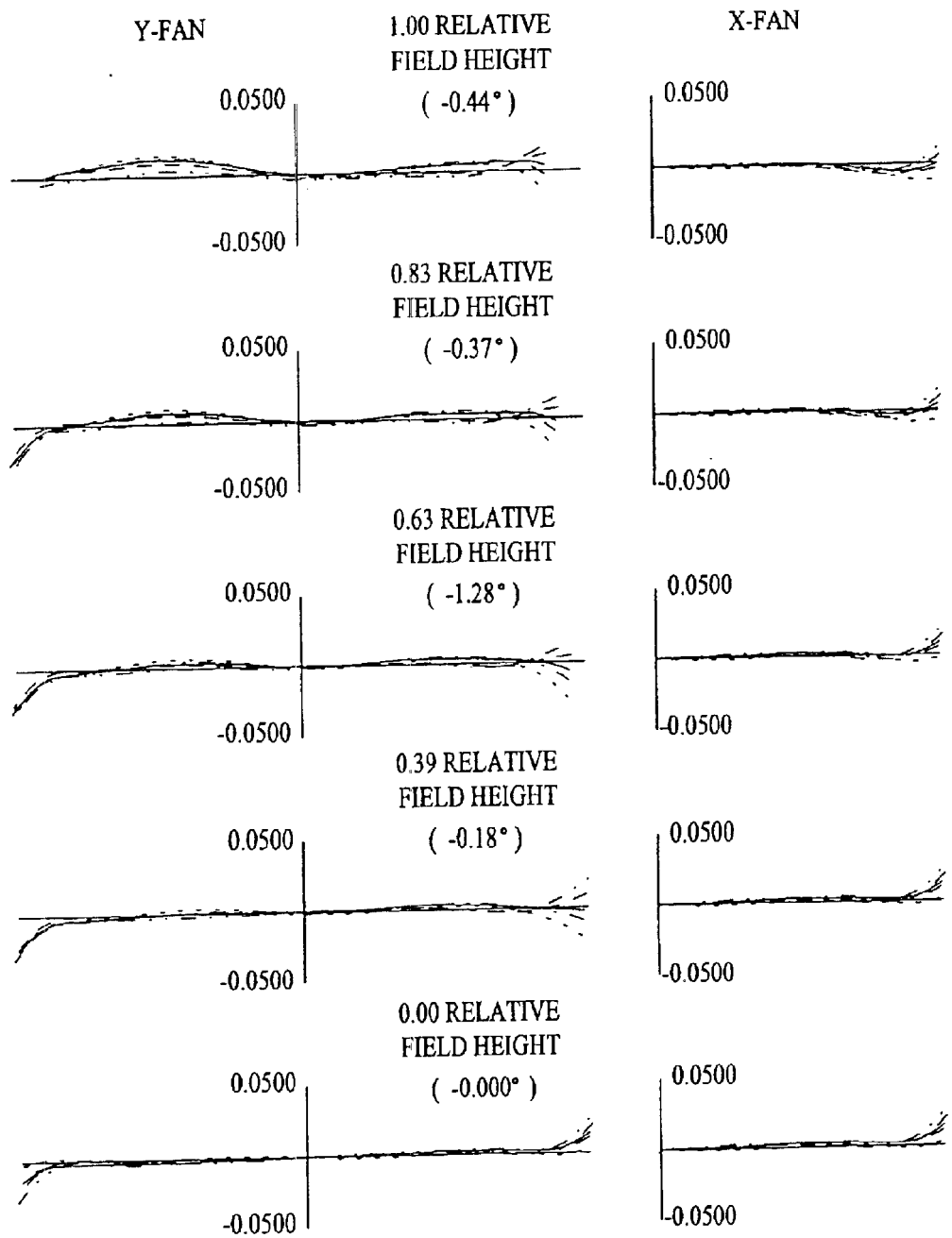

FIGS. 35 and 36 are enlarged optical diagrams illustrating the last lens element 7 of the focus group FG and the first and second zoom groups ZG1 and ZG2 in Positions 1 and 12, respectively, for the minimum and maximum paraxial focal lengths, respectively. Similarly, FIGS. 37 and 38 represent the rear zoom group RZG with the third zoom group ZG3 in the forwardmost and rearmost Positions 1 and 12 representing the minimum and maximum paraxial focal length positions, all respectively.

Figure 50:
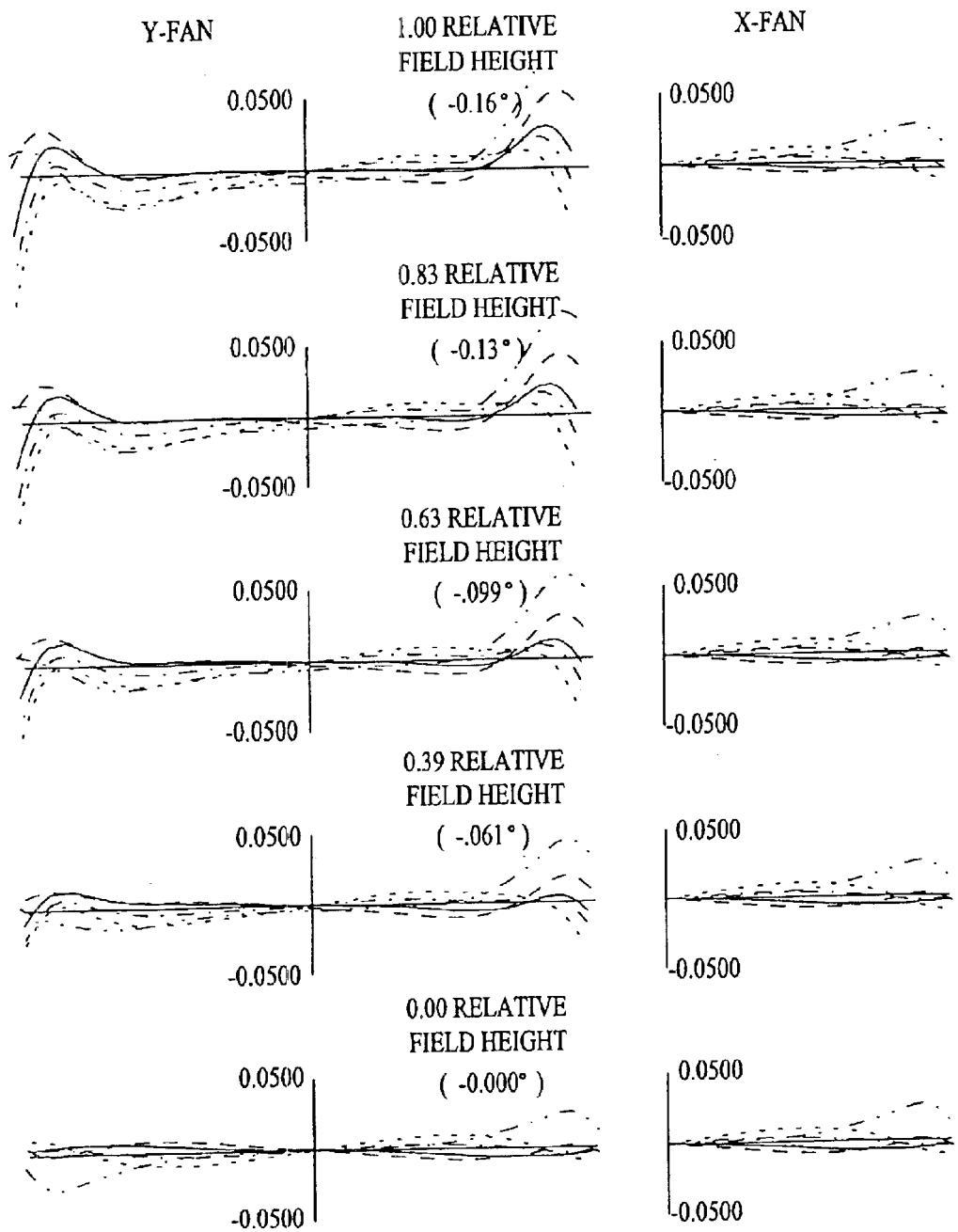
Figure 51:
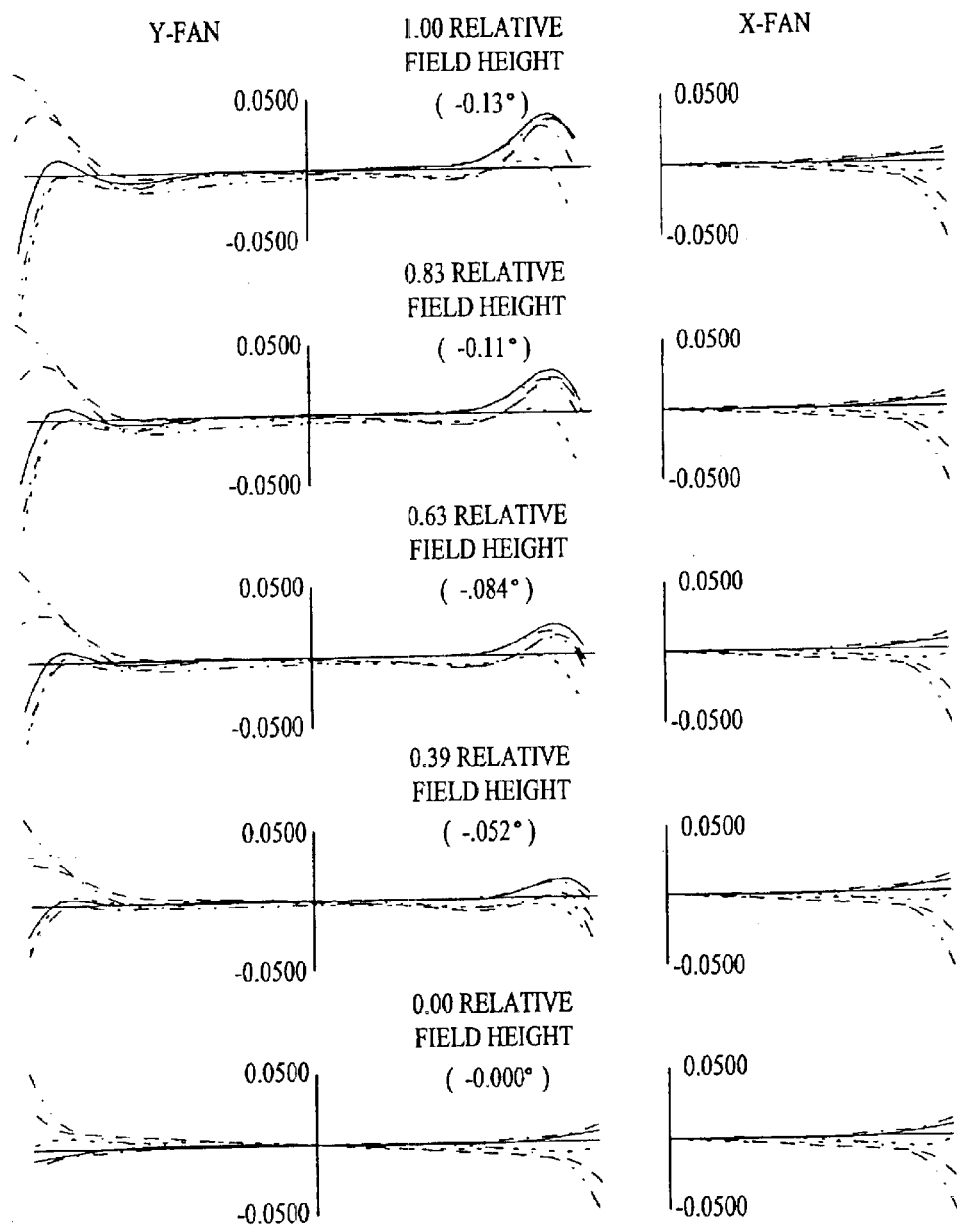
Figure 52:
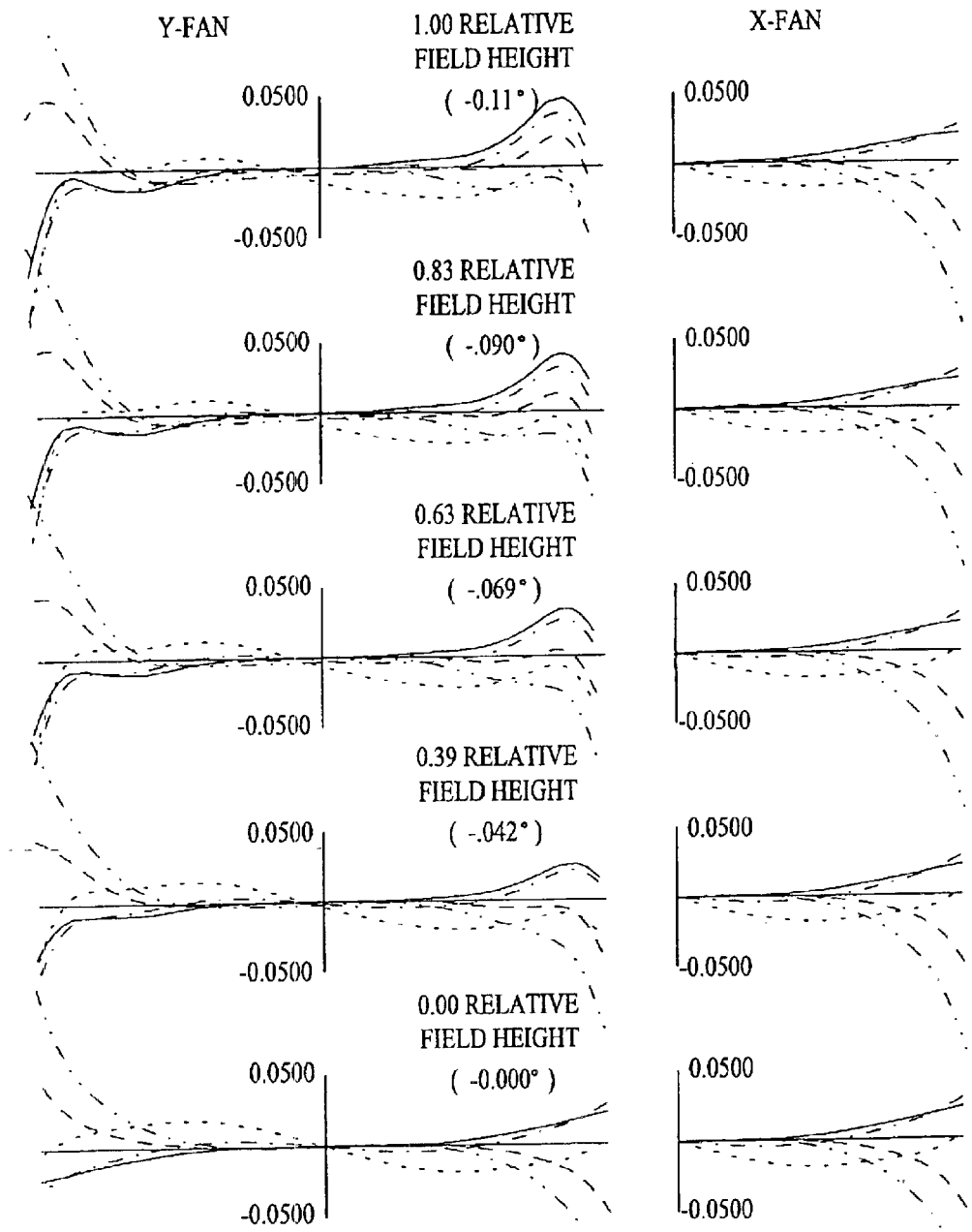
Figure 53:
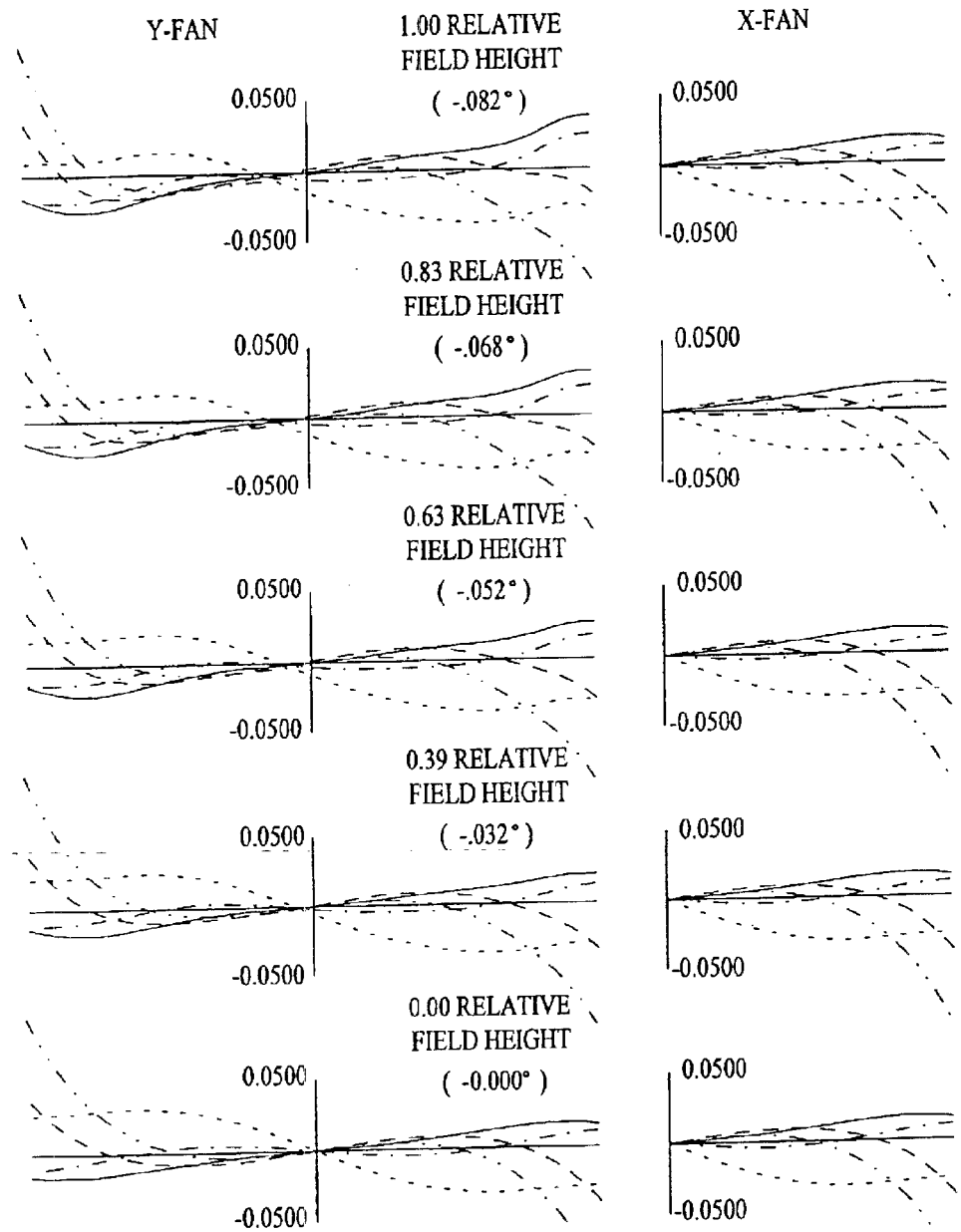
Figure 54:
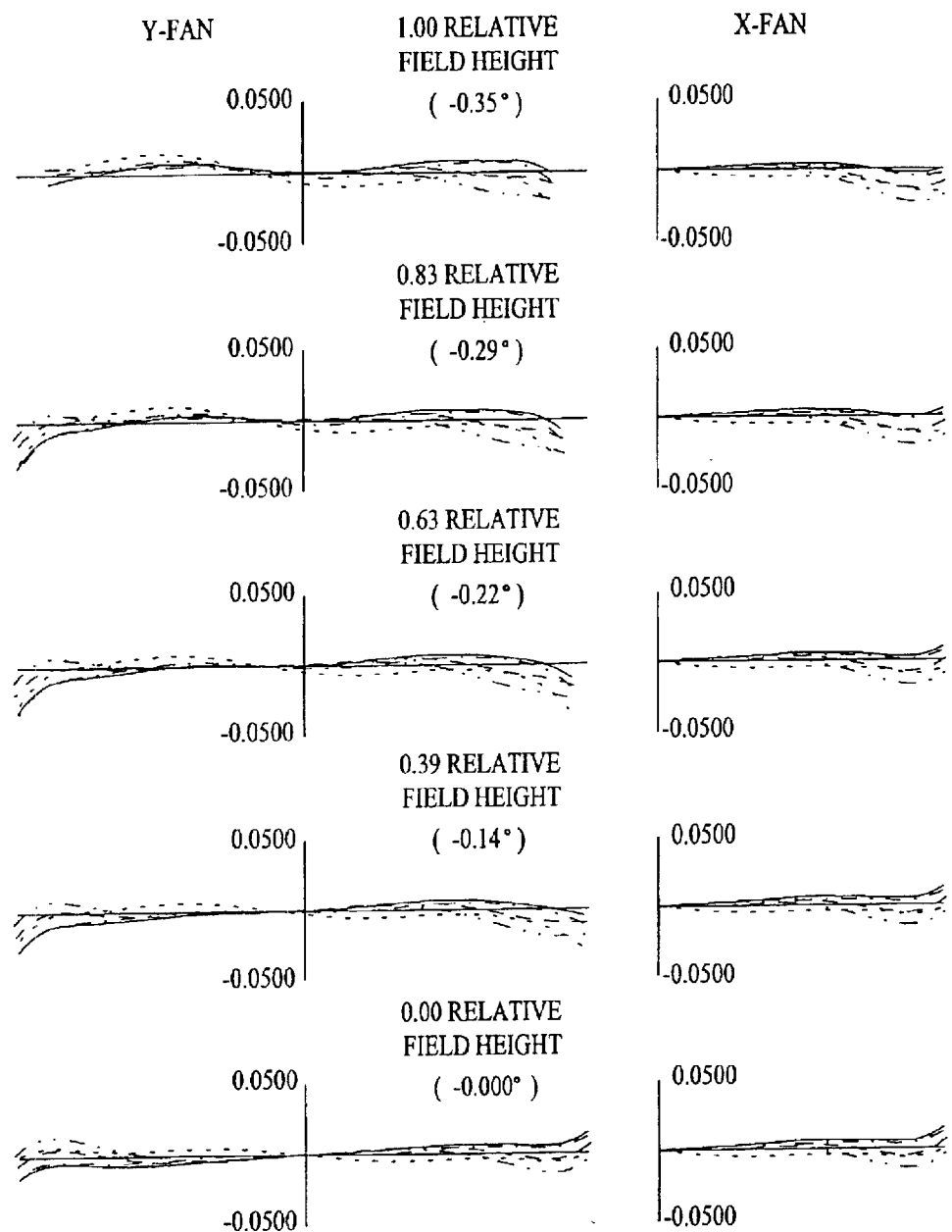
Figure 55:
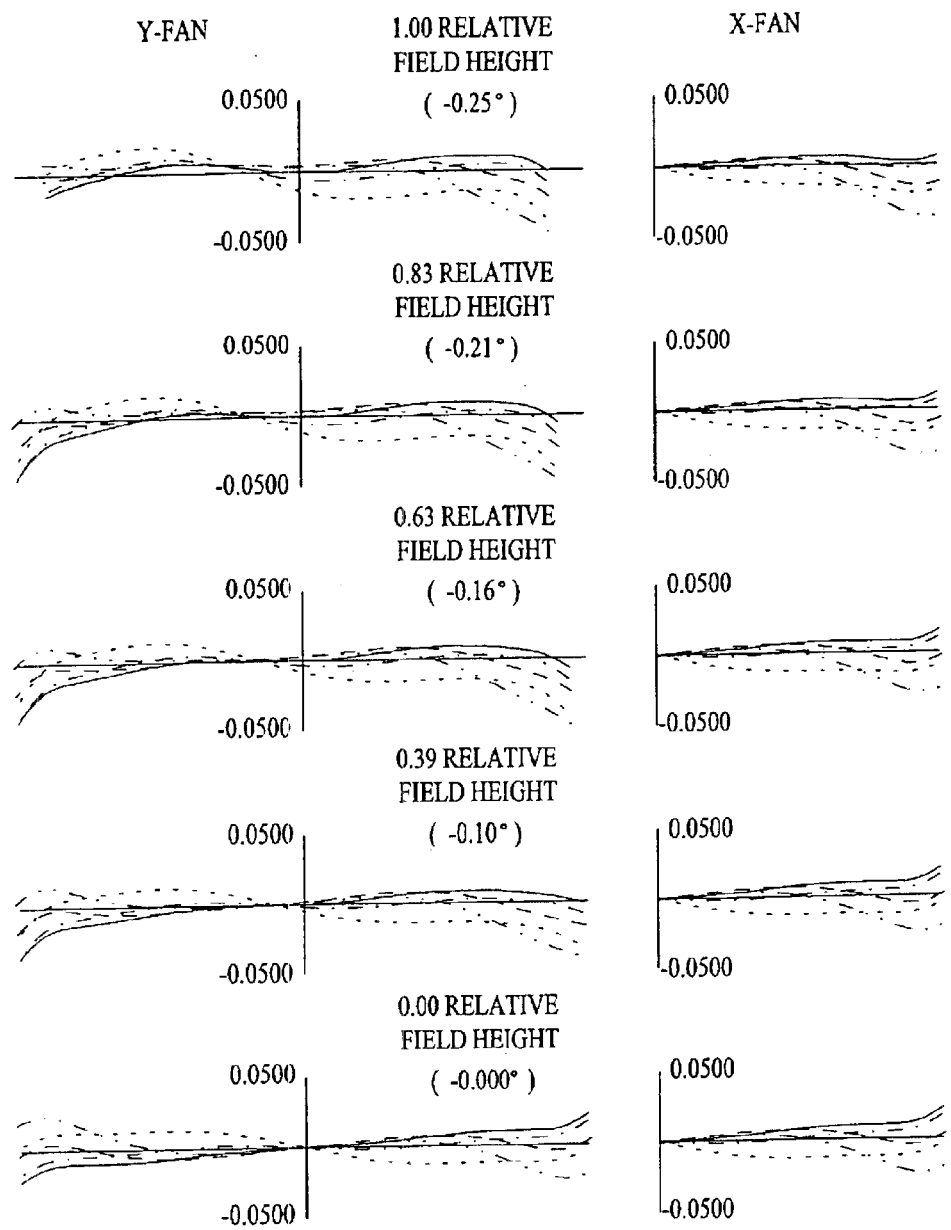
Figure 56:
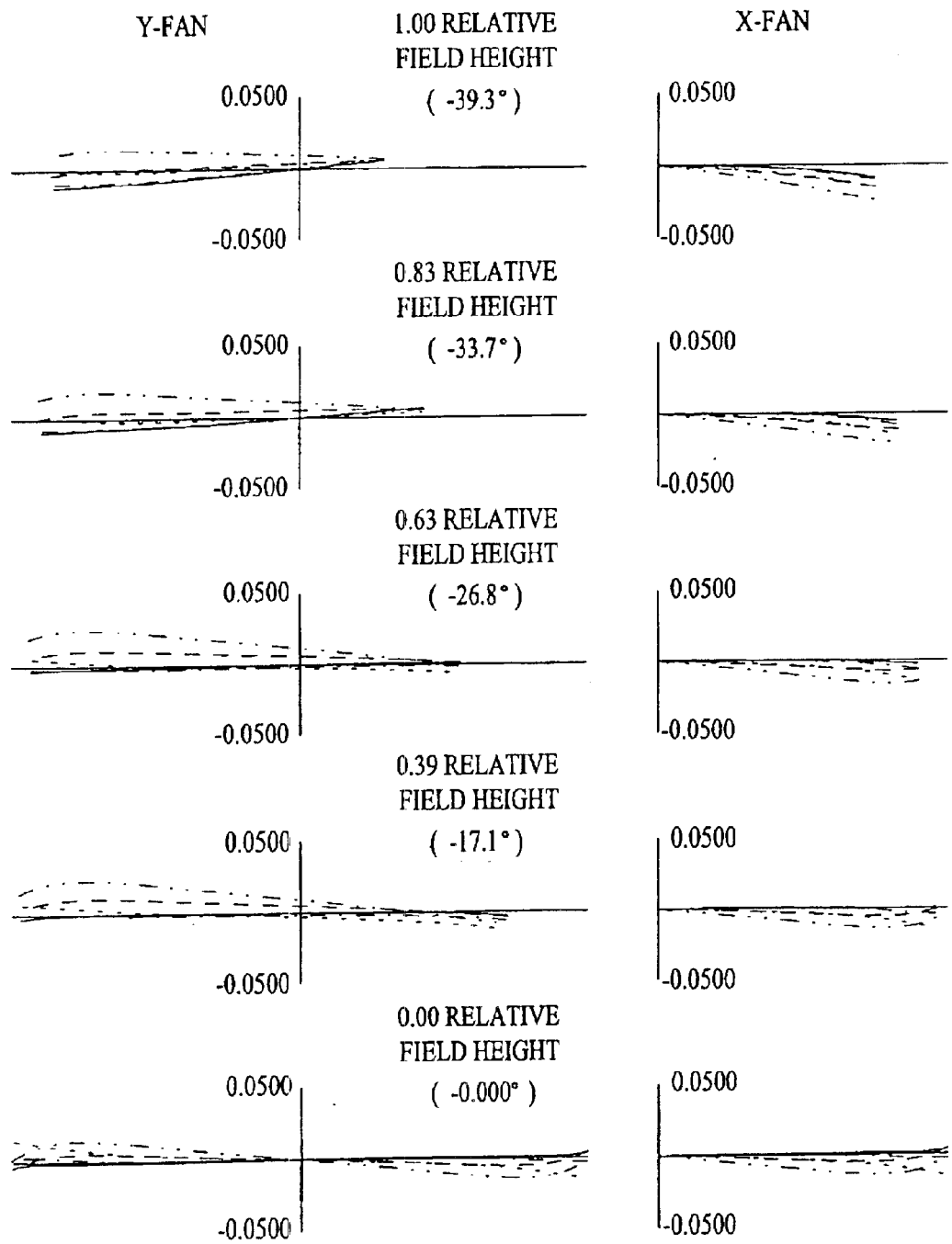
Figure 57:
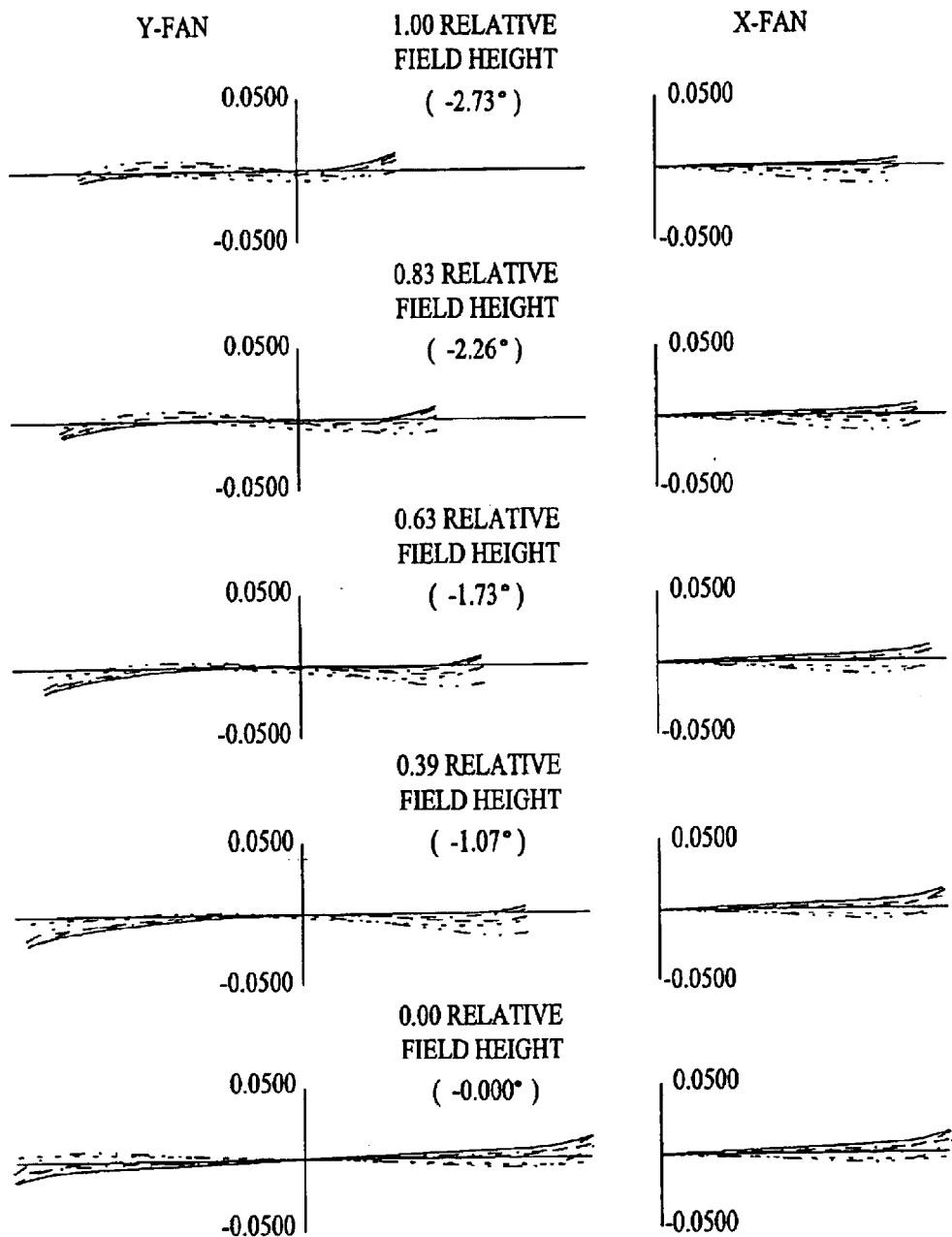
Figure 58:
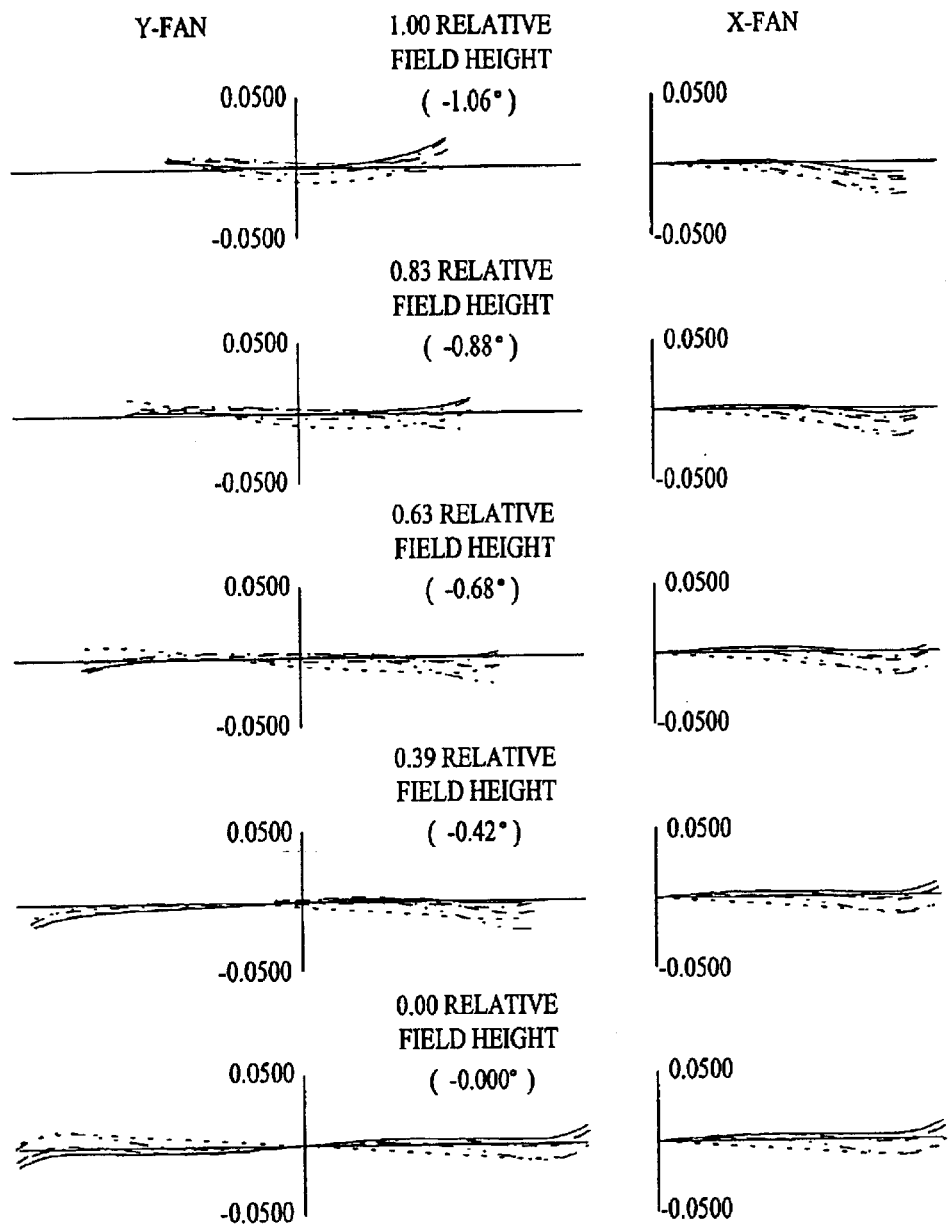

Referring now to FIGS. 39–58, the ray aberration graphs for Positions 1–20, respectively, are shown in a conventional manner by five separate graphs with the maximum field height at the top and zero field height at the bottom and for five wavelengths, as listed thereon. As will readily appear to those skilled in the art, these performance curves establish that in all 20 positions the zoom lens system performs exceptionally well for current broadcast television NTSC quality and exceptionally well for HDTV broadcast television quality. While FIG. 50 representing Position 12, illustrates wide variations in the ray aberrations at this focal length and focused at infinity, the performance is satisfactory because the modulation transfer function is close to the diffraction limit. Similarly, FIGS. 52 and 53, representing Positions 14 and 15, respectively, illustrate widely varying ray aberrations but are still acceptable relative to diffraction limits for these close focus and long focal length positions.

Figure 59:
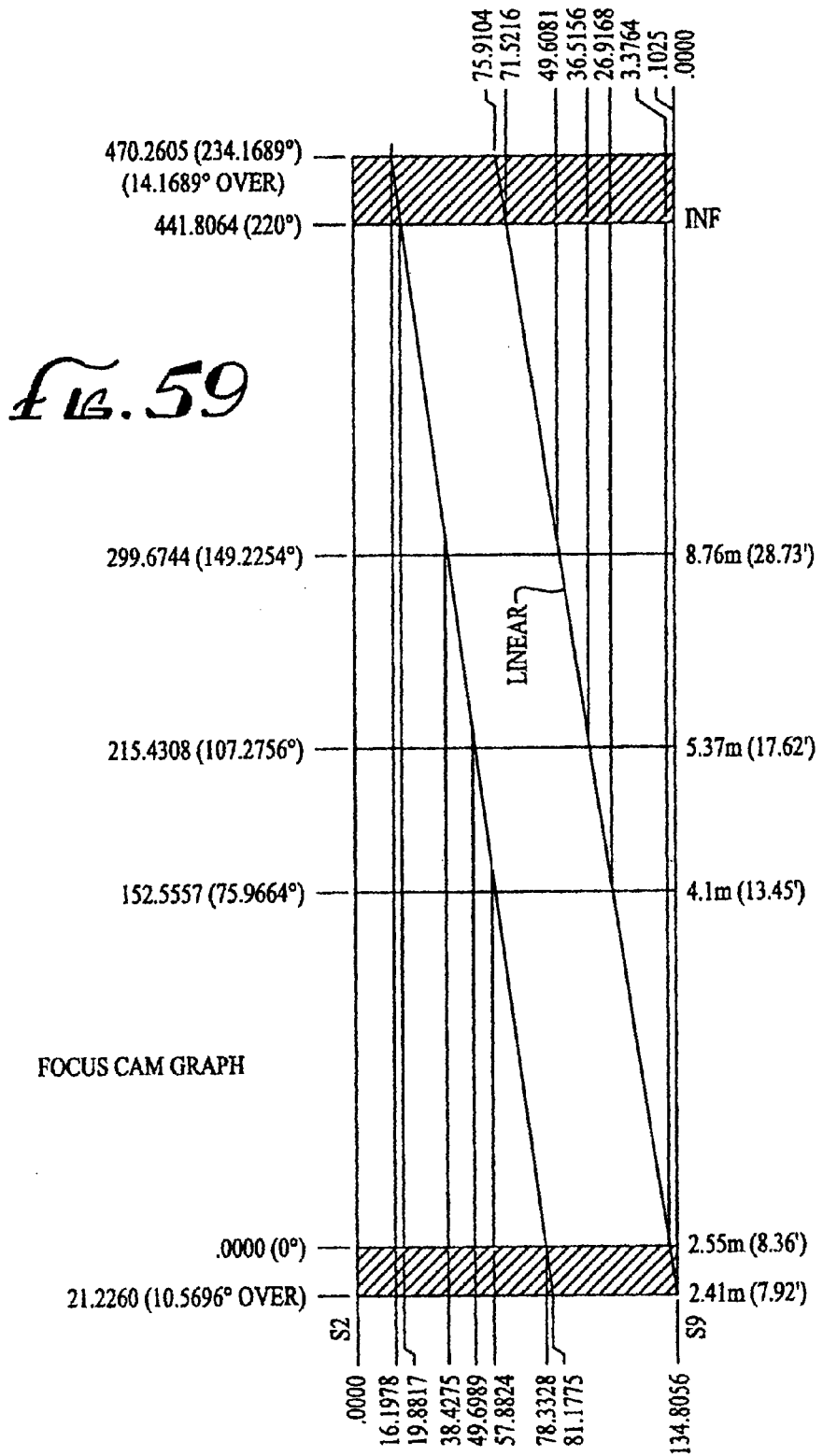
Figure 60:
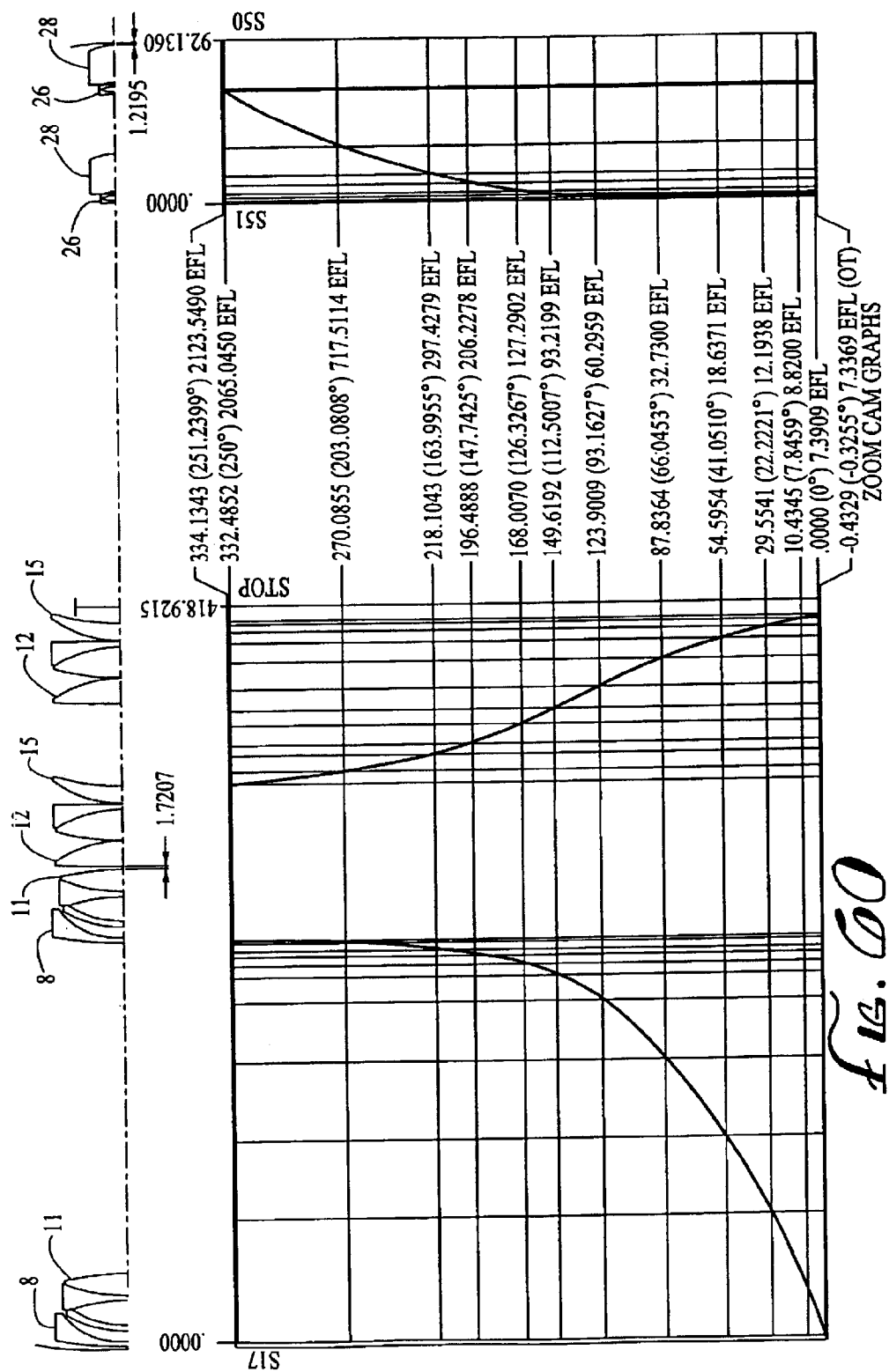
Figure 61:
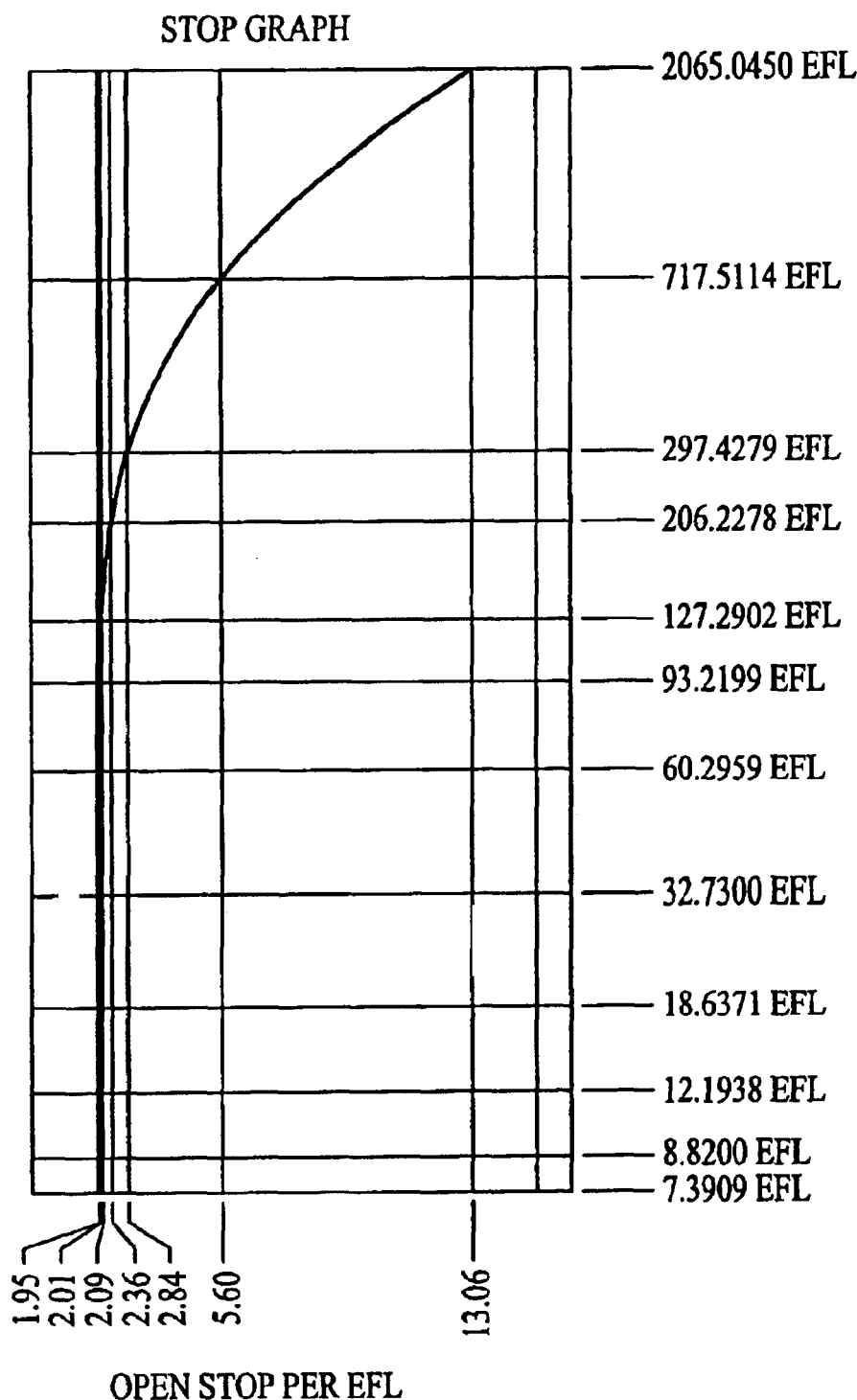

Referring now to FIG. 59, the cam graph for the first and second focus groups FG1 and FG2 are shown (left and right, respectively) for the full range of focus travel thereof from infinity to close focus, with object space being to the left. The first and second focus groups FG1 and FG2 move separately and not at precisely the same rate, even though the solid cam lines in FIG. 59 look nearly parallel. The crosshatched portions at the top and bottom of FIG. 59 allow for temperature changes, manufacturing tolerances and fabrication adjustments. Similarly, FIG. 60 illustrates the cam graphs for the three zoom groups ZG1, ZG2 and ZG3 from left to right, respectively, and it is readily apparent that all three zoom groups move independently, although coordinated to achieve the desired focal lengths continuously over the entire range. FIG. 61 is a graph of the "f" number of the open stop relative to the paraxial effective focal length. Similarly, FIG. 62 is a graph of the full aperture full stop diameter relative to the paraxial effective focal length throughout the full range thereof.

Figure 63:
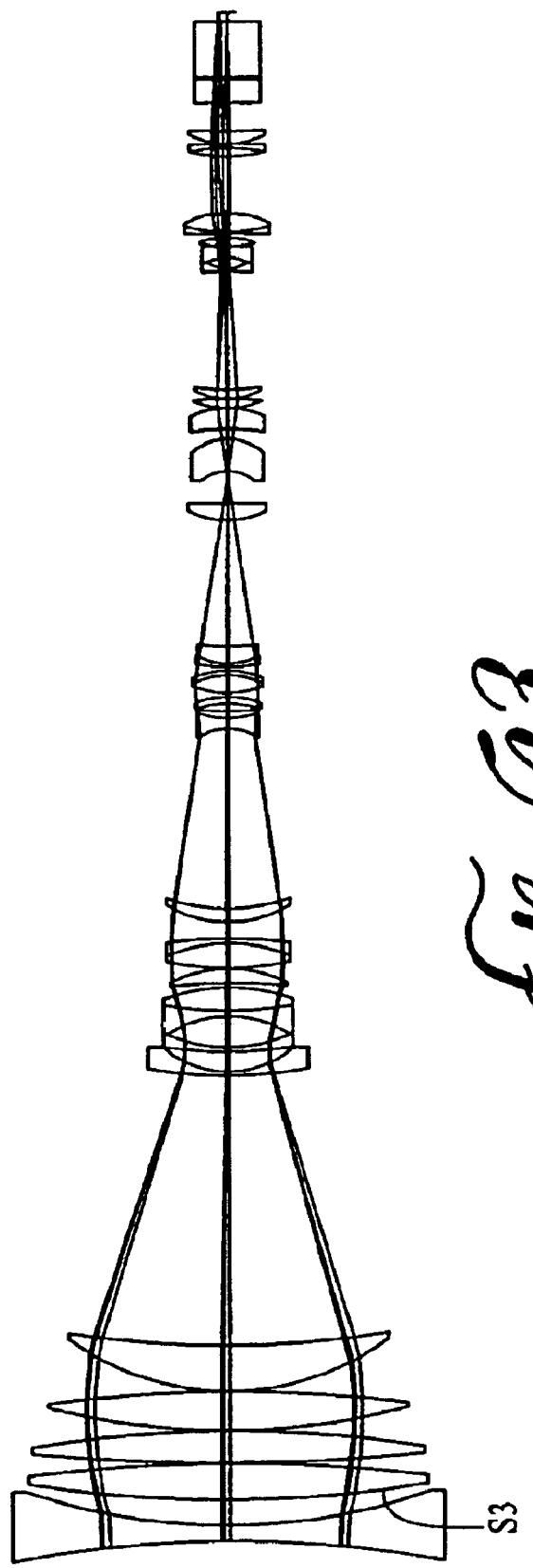
FIGS. 63 and 64 are an optical diagram and ray aberration graphs, respectively, for another embodiment of the zoom lens system of this invention incorporating a binary (diffractive) surface.
Figure 64:
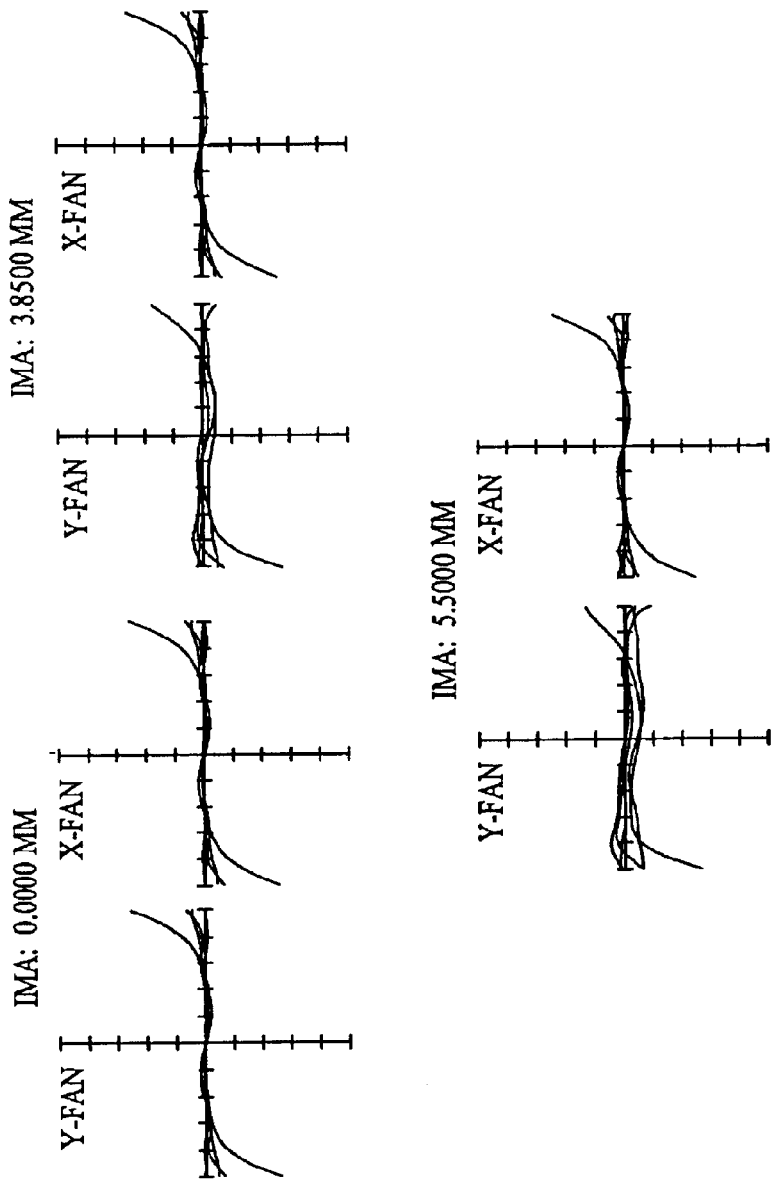

Detailed Description of Other Embodiments. FIGS. 63 and 64 illustrate an example of another embodiment of the present invention. This embodiment of the zoom lens system is very similar to the embodiment of FIGS. 8A and 8B, except that a binary (diffractive) surface is provided. Specifically, a binary surface is provided on the front surface (surface No. 3 in the prescription) of the second lens element. The lens system optical prescription is set forth below in the tables generally entitled "Tables for FIGS. 63 and 64." A more detailed explanation of the tables is provided following the tables.

TABLES FOR FIGS. 63 and 64
LENS SYSTEM OPTICAL PRESCRIPTION

| Surface | Radius | Thickness | Glass Name |
|---|---|---|---|
| OBJECT | Infinity | Infinity | |
| S1 | −731.222 | 10.000 | LASF32 |
| S2 | 390.798 | 15.991 | |
| S3# | 827.075 | 22.500 | BK7 |
| S4 | −1021.418 | 0.100 | |
| S5 | 1257.463 | 19.600 | BK7 |
| S6 | −780.160 | 0.100 | |
| S7 | 436.979 | 24.300 | BK7 |
| S8 | −835.454 | 0.100 | |
| S9 | 170.301 | 28.500 | BK7 |
| S10 | 655.827 | Variable | |
| S11 | 278.083 | 2.650 | S-LAH66 |
| S12* | 60.022 | 12.668 | |
| S13 | 277.706 | 2.900 | S-LAH66 |
| S14 | 98.325 | 19.233 | |
| S15 | −70.105 | 3.050 | S-LAH66 |
| S16 | 234.965 | 14.100 | S-TIH53 |
| S17 | −127.001 | Variable | |
| S18 | −404.763 | 9.200 | S-FPL51 |
| S19 | −80.933 | 0.126 | |
| S20 | 157.360 | 15.650 | S-FPL51 |
| S21 | −99.532 | 2.750 | S-LAM66 |
| S22 | −284.625 | 10.687 | |
| S23 | 76.300 | 7.900 | S-FPL51 |
| S24 | 118.669 | Variable | |
| STOP | Infinity | 6.800 | |
| S26* | −34.999 | 6.500 | BAF4 |
| S27 | 54.435 | 0.106 | |
| S28 | 55.347 | 4.050 | S-TIH4 |
| S29 | 158.504 | 4.934 | |

-continued

TABLES FOR FIGS. 63 and 64
LENS SYSTEM OPTICAL PRESCRIPTION

| | | | |
|---|---:|---:|---|
| S30 | −64.093 | 5.050 | S-TIH6 |
| S31 | −39.812 | 2.240 | |
| S32 | 56.945 | 10.900 | S-FPL52 |
| S33 | −43.914 | 2.150 | S-LAM66 |
| S34 | −61.923 | 2.158 | |
| S35 | 106.356 | 2.100 | S-LAM66 |
| S36 | 30.350 | 11.600 | S-FPL51 |
| S37 | 151.277 | 78.890 | |
| S38 | 57.056 | 9.670 | SF6 |
| S39 | −603.641 | 20.924 | |
| S40 | −22.693 | 19.750 | S-LAM66 |
| S41 | −34.224 | 5.803 | |
| S42 | −129.563 | 12.646 | S-FPL51 |
| S43 | −52.914 | 0.152 | |
| S44 | 59.828 | 5.419 | S-FPL51 |
| S45 | −209.080 | 0.100 | |
| S46 | 37.693 | 6.143 | S-LAL61 |
| S47 | 177.702 | Variable | |
| S48 | −106.846 | 1.600 | S-LAH55 |
| S49 | 21.576 | 6.448 | |
| S50 | −27.697 | 6.650 | S-LAM66 |
| S51 | 7367.260 | 0.829 | |
| S52 | 129.249 | 5.126 | S-TIH53 |
| S53 | −46.358 | Variable | |
| S54 | 538.505 | 1.500 | S-LAM66 |
| S55 | 95.344 | 11.395 | S-PHM53 |
| S56 | −60.650 | Variable | |
| S57 | 87.009 | 5.185 | S-FSL5 |
| S58 | −165.647 | 1.434 | |
| S59 | −85.357 | 1.500 | S-TIH6 |
| S60 | −1236.715 | 0.100 | |
| S61 | 50.067 | 7.563 | S-LAL14 |
| S62 | 539.692 | 18.000 | |
| S63 | Infinity | 13.537 | S-BSL7 |
| S64 | Infinity | 2.051 | |
| S65 | Infinity | 33.841 | BAF52 |
| S66 | Infinity | Variable | |
| IMAGE | Infinity | | |

Note:
Maximum image diameter = 11.0 mm
*Surface profiles of aspheric surfaces S12 and S26 are governed
by the following conventional equation:

$$Z = \frac{(CURV)Y^2}{1 + (1 - (1+K)(CURV)^2 Y^2)^{1/2}} + (A)Y^4 + (B)Y^6 + (C)Y^8 + (D)Y^{10}$$

where:
CURV = 1/(Radius of Surface)
Y = Aperture height, measured perpendicular to optical axis
K, A, B, C, D = Coefficients
Z = Position of surface profile for a given Y value, as measured along the optical axis
from the pole (i.e. axial vertex) of the surface.

The coefficients for the surface S12 are:

| | |
|---|---:|
| K = | 0.01925737 |
| A = | −1.3531387e−007 |
| B = | −1.5274225e−011 |
| C = | −2.0209982e−014 |
| D = | 5.4753514e−018 |

The coefficients for the surface S26 are:

| | |
|---|---:|
| K = | −0.5574845 |
| A = | −1.0833227e−006 |
| B = | −9.1904879e−011 |
| C = | −1.4775967e−013 |
| D = | 6.5701323e−016 |

Surface profile of binary surface S3 is governed by the following
conventional equation:
Added Phase = $A_1 p^2 + A_2 p^4 + A_3 p^6 + A_4 p^8 + A_5 p^{10}$
where:
$A_1, A_2, A_3, A_4$ and $A_5$ are coefficients and p is the normalized radial coordinate -continued TABLES FOR FIGS. 63 and 64
LENS SYSTEM OPTICAL PRESCRIPTION at the surface. The normalizing factor is set at unity and the p's become simply radial coordinates.

| | | |
|---|---|---|
| A1 = | | −0.14123699 |
| A2 = | | −8.7028052e−007 |
| A3 = | | −1.2255122e−010 |
| A4 = | | 5.9987370e−015 |
| A5 = | | −1.2234791e−019 |

VARIABLE THICKNESS POSITIONS AND DATA

| | P1 | P2 | P3 | P4 | P5 | P6 | P7 |
|---|---|---|---|---|---|---|---|
| EFL | 7.264 | 12.117 | 35.980 | 81.979 | 145.198 | 729.922 | 2100.036 |
| F/No. | 1.450 | 1.450 | 1.450 | 1.450 | 1.450 | 9.400 | 14.100 |
| S10 | 3.154 | 50.878 | 126.861 | 163.460 | 167.963 | 167.403 | 168.654 |
| S17 | 271.009 | 213.056 | 113.646 | 61.255 | 10.607 | 68.828 | 3.277 |
| S24 | 2.350 | 12.345 | 35.982 | 51.876 | 97.922 | 40.276 | 104.616 |
| S47 | 4.632 | 5.482 | 4.658 | 5.264 | 6.015 | 53.226 | 73.878 |
| S53 | 105.364 | 104.868 | 105.482 | 104.798 | 103.775 | 14.725 | 2.050 |
| S56 | 1.550 | 1.550 | 1.550 | 1.550 | 1.550 | 43.752 | 35.462 |
| S66 | 4.969 | 4.799 | 4.853 | 4.815 | 5.202 | 4.818 | 5.114 |

The prescription of binary surface 3 is included following the lens system optical prescription table listed above. The binary surface 3 adds phase to the wavefront. By providing binary surface 3, the second through fifth lens elements 2, 3, 4 and 5 in the focus portion of the lens can be made from relatively inexpensive glass, such as BK7, rather than expensive optical glass having abnormal dispersion characteristics, such as SFPL 51. While it is advantageous to include this binary surface 3 near the front of the lens system where the axial beam diameters are largest, it will readily appear to those skilled in the art that the binary (diffractive) surface may be provided elsewhere and that more than one such surface may be provided. Other methods of aberration correction may also be used advantageously. It should be noted that this embodiment also incorporates two aspheric surfaces 12 and 26.

FIG. 63 shows the zoom lens system with the zoom groups positioned at the longest focal length and the focus group focused at infinity. Similarly, the ray aberration graphs of FIG. 64 are at infinity focus and maximum focal length.

It should be noted that the use of a binary surface in this embodiment is a modification that may be used in any of the embodiments of the invention disclosed herein or future variations of the invention.

Figure 65:
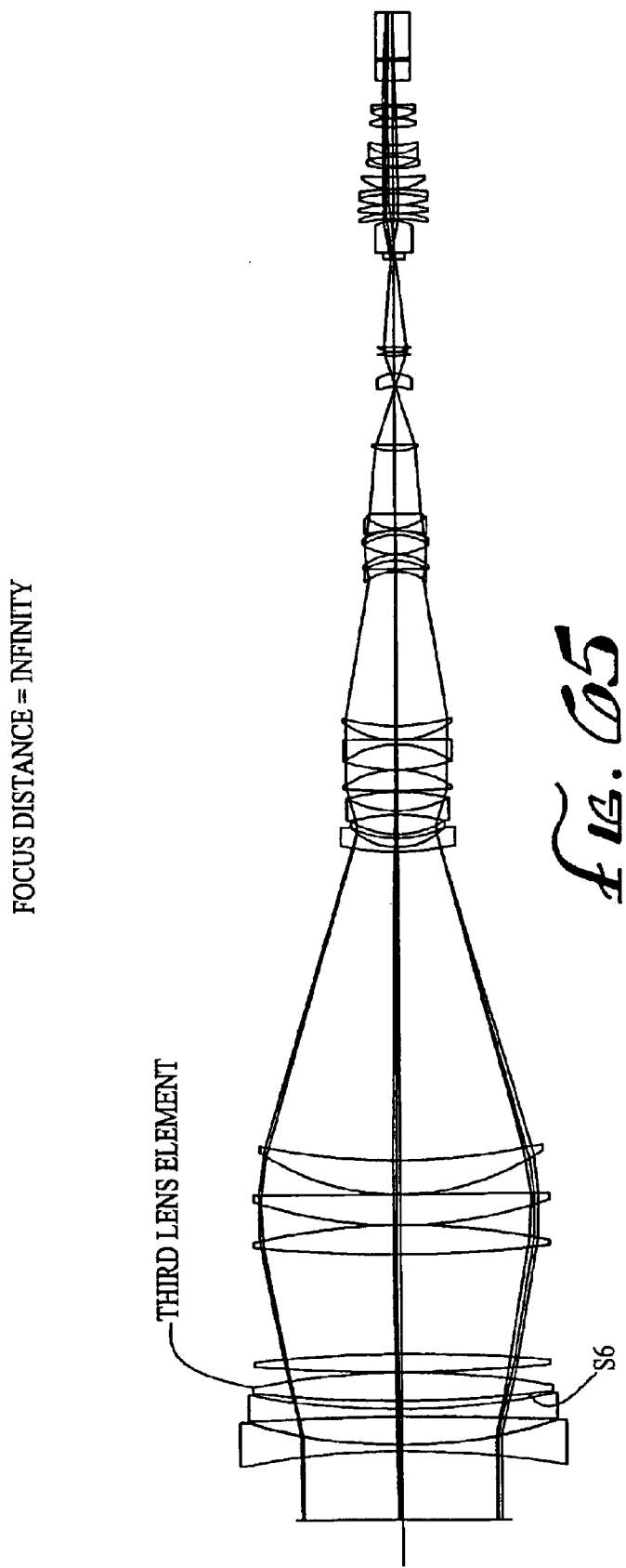
FIGS. 65 and 66 are an optical diagram and ray aberration graphs, respectively, for still another embodiment of the zoom lens system of this invention incorporating a binary (diffractive) surface.
Figure 66:
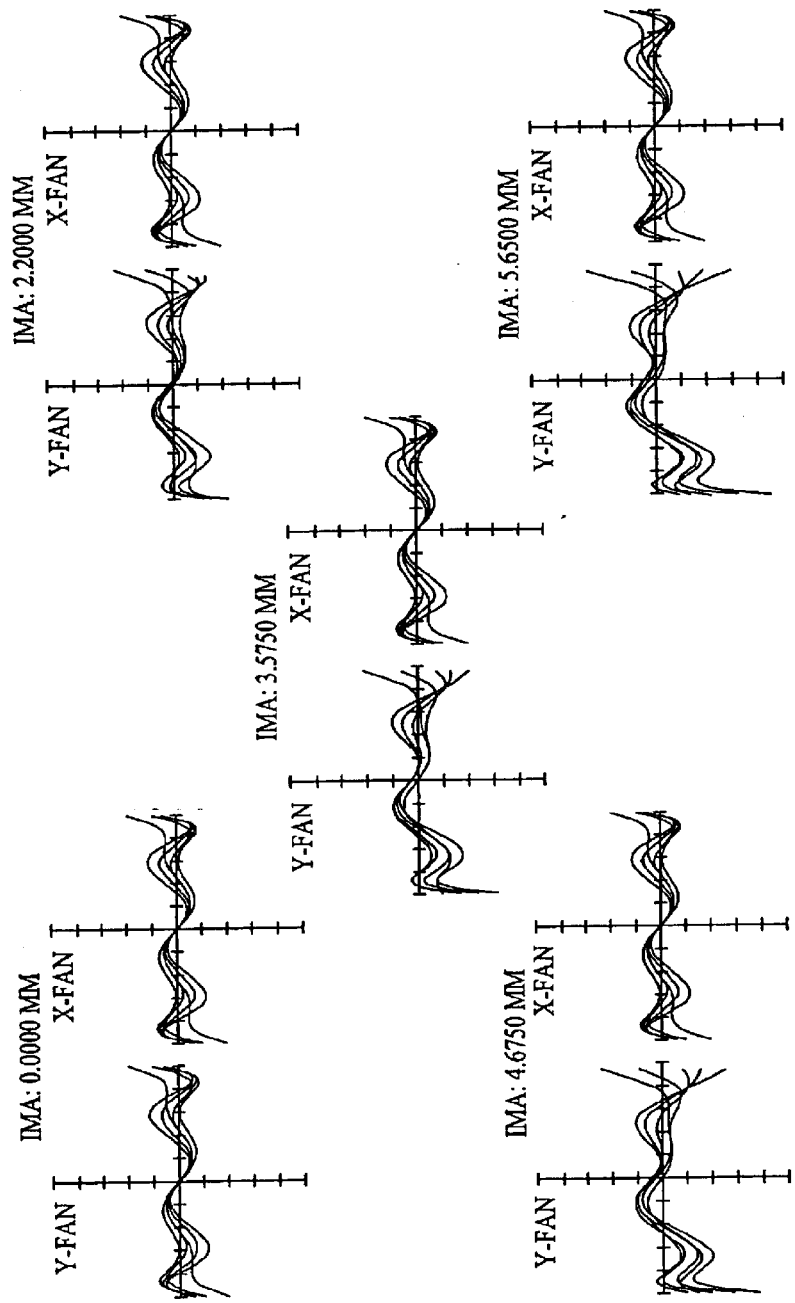
Figure 67:
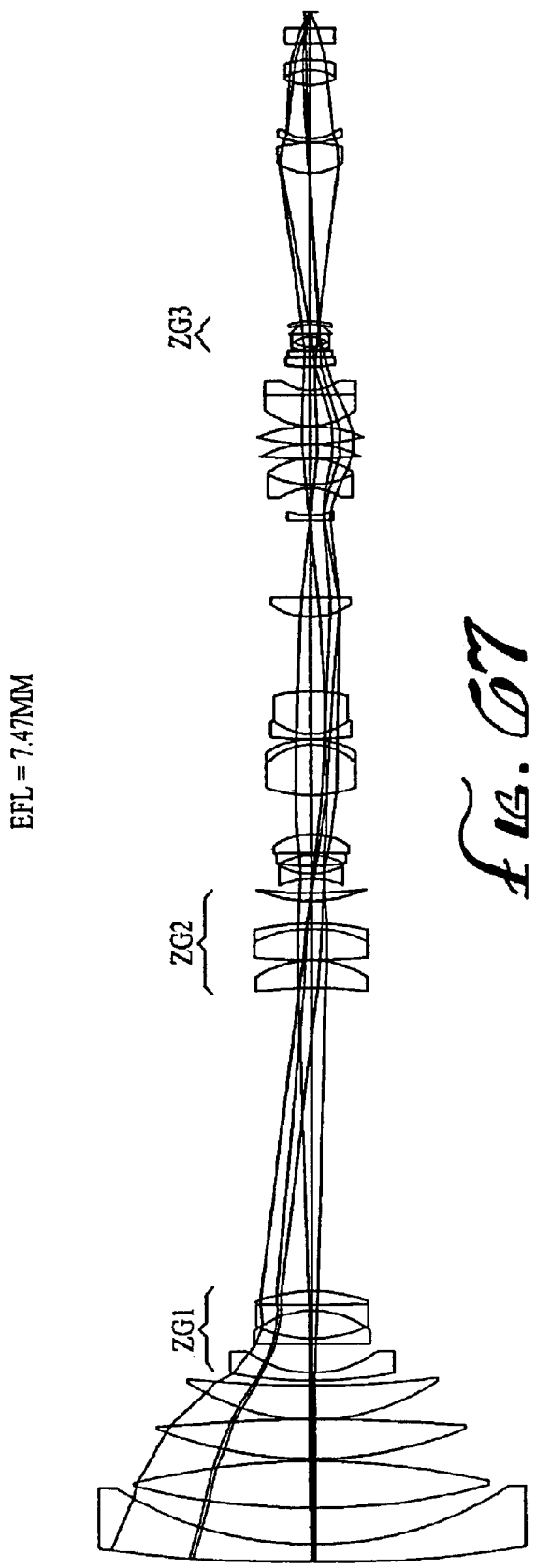
FIGS. 67–70 are figures that relate to a still further embodiment of the invention having a zoom ratio of about 400:1 with FIGS. 67 and 68 being optical diagrams at focal lengths of 7.47 mm and 2983 mm, respectively, and FIGS. 69 and 70 being ray aberration graphs at focal lengths of 7.47 mm and 2983 mm, respectively.
Figure 68:
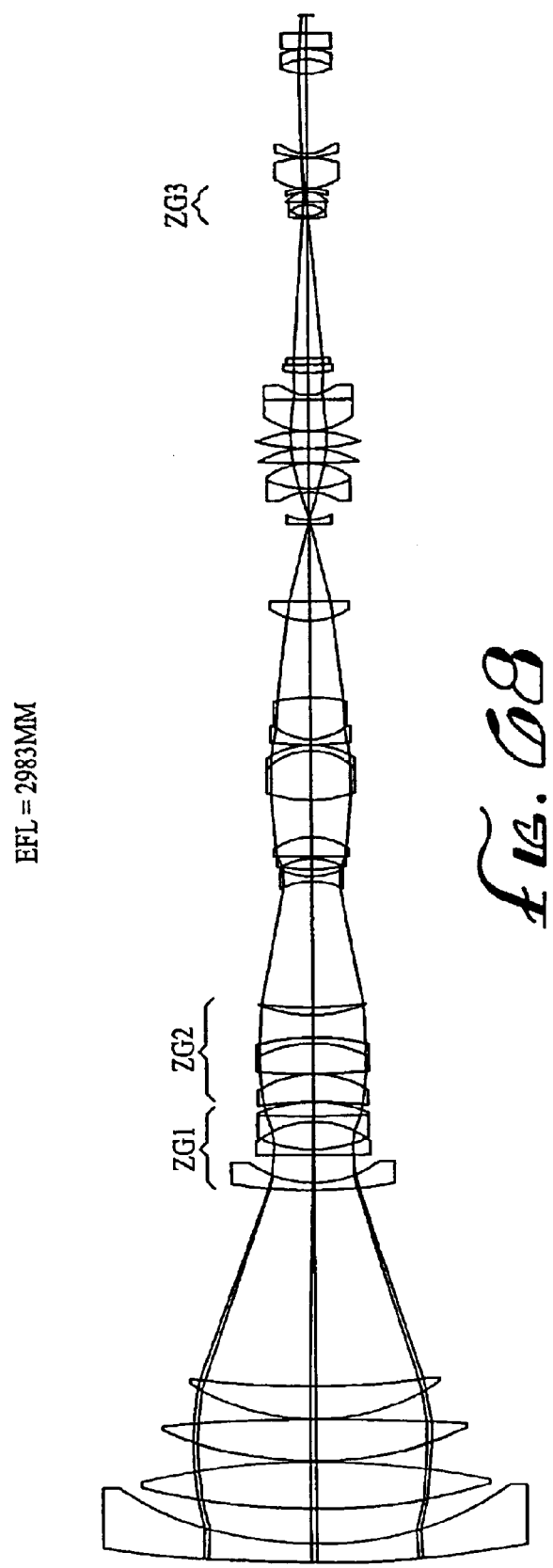

FIGS. 65 and 66 illustrate an example of another embodiment of the present invention. This embodiment of the zoom lens system of the present invention is very similar to the embodiment of FIGS. 10–62, except that a binary (diffractive) surface is provided. Specifically, the binary surface is provided on the front surface (surface No. 6 in the prescription) of the third lens element from the left. As described above with respect to FIGS. 10–62, that third lens element is the first (front) of two lens elements comprising the second focus group FG2, which is movable axially for accomplishing the focusing together with the movable first focus group FG1 comprised of only the second lens element. The lens system optical prescription for the embodiment of FIGS. 65 and 66 is set forth below in the tables generally entitled "Tables for FIGS. 65 and 66."

TABLES FOR FIGS. 65 and 66
LENS SYSTEM OPTICAL PRESCRIPTION

| Surface | Radius | Thickness | Glass Name |
|---|---|---|---|
| OBJECT | Infinity | Variable | |
| S1 | Infinity | 50.000 | |
| S2 | −617.930 | 5.200 | S-LAM60 |
| S3 | 425.207 | Variable | |
| S4 | −2291.780 | 4.900 | S-TIH6 |
| S5 | 545.459 | Variable | |
| S6# | 961.467 | 19.482 | BK7 |
| S7 | −607.161 | 0.730 | |
| S8 | 1355.262 | 12.601 | BK7 |
| S9 | −1118.653 | Variable | |
| S10 | 986.310 | 20.386 | S-FPL51 |
| S11 | −502.874 | 0.730 | |
| S12 | 343.826 | 21.232 | S-FPL51 |
| S13 | 64586.450 | 0.730 | |
| S14 | 181.736 | 24.150 | S-FPL53 |
| S15 | 476.848 | Variable | |

-continued

TABLES FOR FIGS. 65 and 66
LENS SYSTEM OPTICAL PRESCRIPTION

| | | | |
|---|---|---|---|
| S16 | 208.678 | 3.120 | S-LAH66 |
| S17* | 40.147 | 6.111 | |
| S18 | 67.136 | 3.150 | S-LAH59 |
| S19 | 56.870 | 14.527 | |
| S20 | −98.690 | 2.730 | S-LAH66 |
| S21 | 90.992 | 12.506 | S-TIH53 |
| S22 | −174.619 | Variable | |
| S23 | 764.771 | 14.926 | S-FPL52 |
| S24 | −66.842 | 0.400 | |
| S25 | 133.738 | 17.704 | S-FPL51 |
| S26 | −69.988 | 3.100 | S-LAM66 |
| S27 | −1580.221 | 0.400 | |
| S28 | 65.214 | 9.613 | S-NSL36 |
| S29 | 129.561 | Variable | |
| STOP | Infinity | 8.811 | |
| S31* | −36.392 | 2.044 | S-BSM14 |
| S32 | −425.016 | 6.131 | |
| S33 | −43.308 | 5.233 | S-TIH53 |
| S34 | −33.861 | 0.200 | |
| S35 | 47.203 | 13.980 | S-FPL51 |
| S36 | −41.565 | 2.400 | S-LAM66 |
| S37 | −56.845 | 0.200 | |
| S38 | −109.533 | 1.950 | S-LAH63 |
| S39 | 31.532 | 10.159 | S-FPL51 |
| S40 | −173.403 | 45.721 | |
| S41 | 47.891 | 4.513 | S-LAH53 |
| S42 | −2514.287 | 41.843 | |
| S43 | −23.807 | 9.483 | S-LAH59 |
| S44 | −24.610 | 12.719 | |
| S45 | 61.223 | 3.114 | S-FPL51 |
| S46 | −45.071 | 0.150 | |
| S47 | 24.918 | 3.242 | S-BSM9 |
| S48 | −516.606 | Variable | |
| S49 | −72.073 | 1.059 | S-LAL54 |
| S50 | 23.513 | 2.783 | |
| S51 | −18.951 | 0.900 | S-LAH59 |
| S52 | −57.174 | 1.347 | |
| S53 | −21.150 | 21.292 | S-LAH60 |
| S54 | −31.181 | Variable | |
| S55 | −138.459 | 4.401 | S-BAL22 |
| S56 | −75.648 | 0.300 | |
| S57 | 606.713 | 5.842 | S-FPL51 |
| S58 | −96.488 | 0.300 | |
| S59 | 113.288 | 7.382 | S-FPL51 |
| S60 | −97.742 | 2.500 | S-TIH6 |
| S61 | −366.723 | 0.300 | |
| S62 | 400.000 | 0.000 | |
| S63 | 38.760 | 8.585 | S-FPL52 |
| S64 | 269.438 | 5.901 | |
| S65 | 115.000 | 0.450 | |
| S66 | 94.072 | 1.770 | S-LAL54 |
| S67 | 35.982 | 7.000 | |
| S68 | −90.502 | 2.010 | S-LAL8 |
| S69 | 29.972 | 6.150 | S-TIH53 |
| S70 | 82.308 | 2.725 | |
| S71 | 79.000 | 9.670 | |
| S72 | 76.232 | 6.100 | S-PHM52 |
| S73 | −75.003 | 0.761 | |
| S74 | 45.420 | 7.170 | S-FSL5 |
| S75 | −45.317 | 1.500 | S-TIH53 |
| S76 | 348.342 | 18.544 | |
| S77 | Infinity | 13.200 | S-BSL7 |
| S78 | Infinity | 2.000 | |
| S79 | Infinity | 33.000 | BAF52 |
| S80 | Infinity | 0.000 | |
| S81 | Infinity | 0.000 | |
| IMAGE | Infinity | | |

Note:
Maximum image diameter = 11.3 mm
*Surface profiles os aspheric surfaces S17 amd S31 are governed by the following conventional equation:

-continued

TABLES FOR FIGS. 65 and 66
LENS SYSTEM OPTICAL PRESCRIPTION $$Z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

where:
CURV = 1/(Radius of Surface)
Y = Aperture height, measured perpendicular to optical axis
K, A, B, C, D = Coefficients
Z = Position of surface profile for a given Y value, as measured along the optical axis from the pole (i.e. axial vertex) of the surface.

The coefficients for the surface S17 are:

K =   −0.3564029
A =   −8.6827410e−007
B =   −2.1510889e−010
C =   −6.3664850e−014
D =   −3.8937870e−018

The coefficients for the surface S31 are:

K =   0.4304792
A =   9.5769727e−007
B =   1.3131850e−009
C =   −1.4559220e−012
D =   3.1953640e−015

Surface profile of binary surface S3 is governed by the following conventional equation:
Added Phase = $A_1 p^2 + A_2 p^4 + A_3 p^6 + A_4 p^8 + A_5 p^{10}$
where:
$A_1, A_2, A_3, A_4$ and $A_5$ are coefficients and p is the normalized radial coordinate at the surface. The normalizing factor is set at unity and the p's become simply radial coordinates.

A1 =   −0.038094023
A2 =   −2.7327913e−006
A3 =   5.0795942e−010
A4 =   −5.0245151e−014
A5 =   1.5103625e−018

VARIABLE THICKNESS POSITIONS AND DATA

|      | P1       | P2       | P3       | P4       | P5       | P6       | P7       |
|------|----------|----------|----------|----------|----------|----------|----------|
| EFL  | 7.428    | 12.285   | 19.009   | 32.781   | 65.564   | 93.100   | 144.823  |
| F/No.| 1.949    | 1.949    | 1.949    | 1.949    | 1.949    | 2.010    | 2.090    |
| S0   | Infinity | 5322.630 | 2499.896 | Infinity | 5322.630 | Infinity | 5322.630 |
| S3   | 18.151   | 48.521   | 79.959   | 18.151   | 48.521   | 18.151   | 48.521   |
| S5   | 6.399    | 10.135   | 15.000   | 6.399    | 10.135   | 6.399    | 10.135   |
| S9   | 71.409   | 37.303   | 1.000    | 71.409   | 37.303   | 71.409   | 37.303   |
| S15  | 1.350    | 67.051   | 110.745  | 155.094  | 189.151  | 203.856  | 210.392  |
| S22  | 319.660  | 247.857  | 197.854  | 142.790  | 92.653   | 65.474   | 50.046   |
| S29  | 9.625    | 15.727   | 22.036   | 32.751   | 48.830   | 61.304   | 70.197   |
| S48  | 1.498    | 1.498    | 1.498    | 1.498    | 1.498    | 2.823    | 4.711    |
| S54  | 63.257   | 63.257   | 63.257   | 63.257   | 63.257   | 61.933   | 60.044   |

VARIABLE THICKNESS POSITIONS AND DATA

|      | P8       | P9       | P10      | P11      | P12      | P13      |
|------|----------|----------|----------|----------|----------|----------|
| EFL  | 206.030  | 486.383  | 715.335  | 2050.042 | 4776.501 | 1890.393 |
| F/No.| 2.360    | 2.840    | 5.600    | 14.500   | 14.500   | 5.600    |
| S0   | Infinity | 5322.630 | Infinity | Infinity | 8708.002 | 5322.630 |
| S3   | 18.151   | 48.521   | 18.151   | 18.151   | 37.472   | 48.521   |
| S5   | 6.399    | 10.135   | 6.399    | 6.399    | 8.770    | 10.135   |
| S9   | 71.409   | 37.303   | 71.409   | 71.409   | 49.718   | 37.303   |
| S15  | 215.814  | 218.878  | 223.339  | 224.980  | 224.980  | 223.339  |
| S22  | 33.074   | 24.338   | 10.235   | 1.719    | 1.719    | 10.235   |
| S29  | 81.746   | 87.419   | 97.063   | 103.934  | 103.934  | 97.063   |
| S48  | 9.572    | 14.559   | 31.080   | 63.536   | 63.536   | 31.080   |
| S54  | 55.183   | 50.196   | 33.675   | 1.220    | 1.220    | 33.675   |

The prescription of binary surface 6 is included following the lens system optical prescription table listed above. The addition of binary surface 6 to the basic lens system optical prescription of the embodiment of FIGS. 10–62 allows the substitution of less expensive glass, such as BK7, for the fluor-crown glass of lens elements 3 and 4 (third and fourth from the left in FIG. 65). Although other small changes are also made in the prescription, the zoom lens system of FIGS. 65 and 66 has the same number of lens elements and the same number of moving groups for focusing and zoom as the embodiment of FIGS. 10–62. FIG. 65 shows the zoom lens system with the zoom groups positioned at the longest focal length and the focus groups focused at infinity. Similarly, the ray aberration graphs of FIG. 66 are at infinity focus and the longest focal length.

Figure 69:
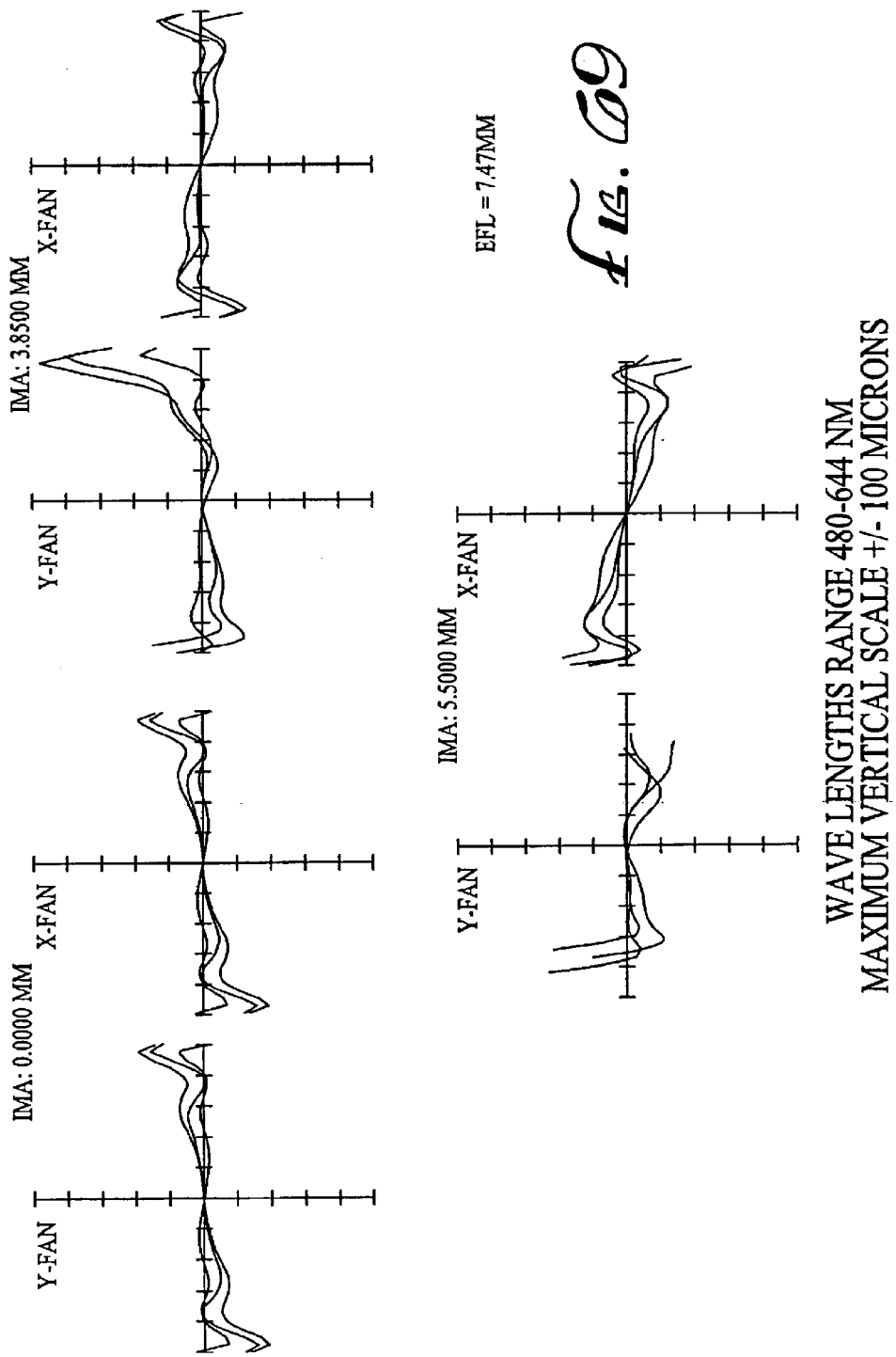
Figure 70:
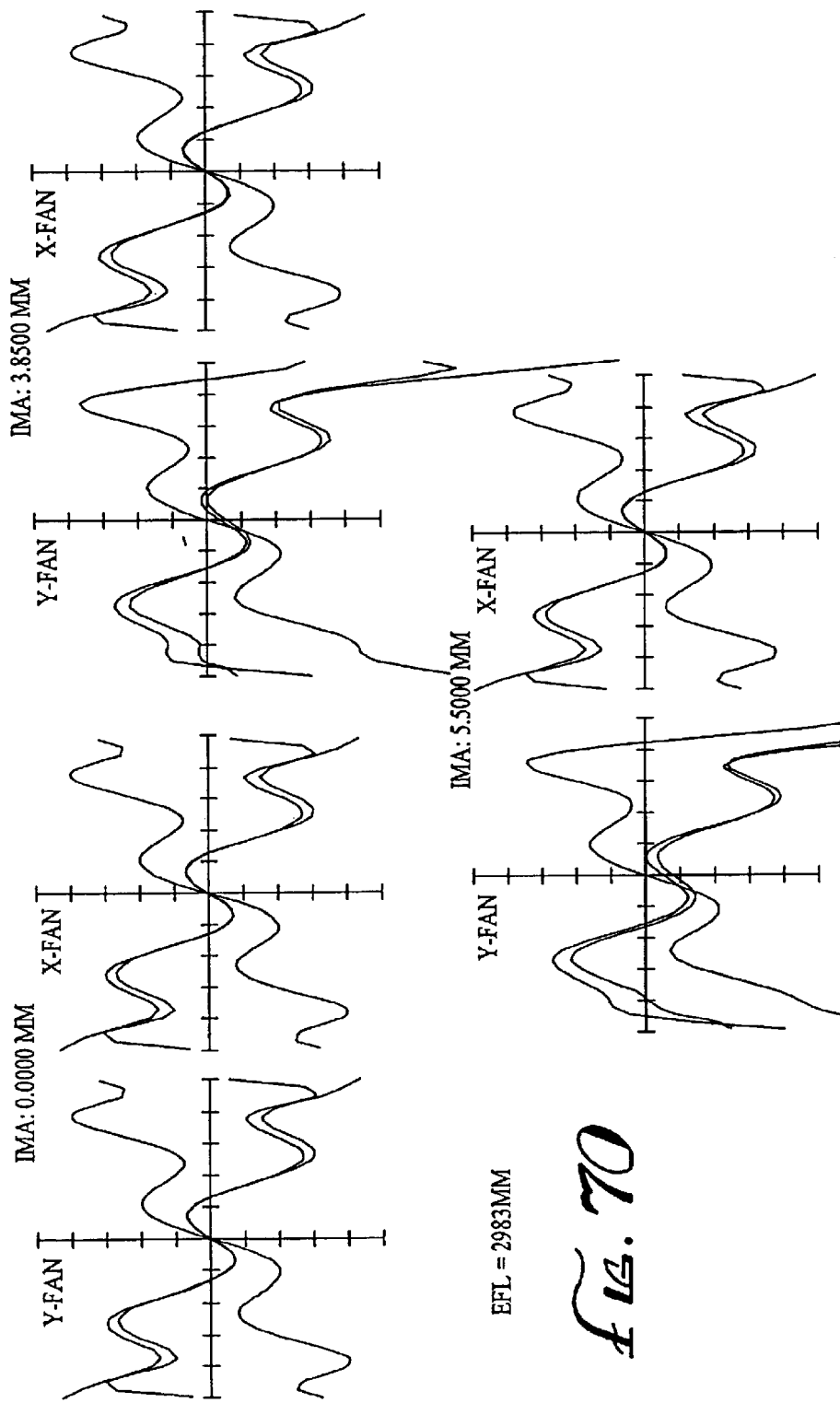

FIGS. 67–70 illustrate an example of another embodiment of the present invention. This embodiment of the zoom lens system of the present invention has a zoom ratio of about 400:1. Specifically, this embodiment has a zoom range of focal lengths of about 7.47 mm (the position shown in FIG. 67) to about 2983 mm (the position shown in FIG. 68). As with the embodiment of FIGS. 10–62, this embodiment has three moving zoom lens groups ZG1, ZG2 and ZG3, with two of them in the front zoom lens portion and one in the rear zoom lens portion. The ray aberration graphs of FIGS. 69 and 70 are at paraxial effective focal lengths (EFL) of 7.47 mm and 2983 mm, respectively, and illustrate that this embodiment performs well, considering the extremely wide range of focal lengths and large zoom ratio which is similar to the performance characteristics of the embodiment of FIGS. 10–62. The optical diagrams of FIGS. 67 and 68 and the ray aberration graphs of FIGS. 69 and 70 are shown at infinity focus.

The lens system optical prescription of FIGS. 67–70 is set forth below in the tables generally entitled "Tables for FIGS. 67 thru 70." The following data in the lens system optical prescription is set forth in the same manner and the legends have the same meanings as in the preceding lens system optical prescriptions.

| | TABLES FOR FIGS. 67 thru 70 LENS SYSTEM OPTICAL PRESCRIPTION | | |
|---|---|---|---|
| Surface | Radius | Thickness | Glass Name |
| OBJECT | Infinity | Variable | |
| S1 | 1018.780 | 15.000 | LAH78 |
| S2 | 277.432 | 28.775 | |
| S3 | 523.118 | 37.500 | S-FPL51 |
| S4 | −634.022 | 1.500 | |
| S5 | 323.390 | 30.000 | S-FPL51 |
| S6# | −2096.922 | −0.001 | |
| S7* | 177.503 | 27.000 | S-FPL51 |
| S8 | 667.737 | Variable | |
| S9 | 363.133 | 6.000 | TAF1 |
| S10* | 84.560 | 23.084 | |
| S11 | −1731.870 | 4.500 | TAF1 |
| S12 | 117.736 | 21.933 | |
| S13 | −68.241 | 4.672 | TAF1 |
| S14 | 1396.861 | 11.280 | PBH71 |
| S15 | −123.171 | Variable | |
| S16 | −351.922 | 21.562 | S-FPL51 |
| S17 | −87.960 | 0.750 | |
| S18 | 670.190 | 25.507 | LAK21 |
| S19 | −96.809 | 4.500 | FD6 |
| S20 | −253.794 | 18.318 | |
| S21 | 112.307 | 6.052 | FCS |
| S22 | 345.143 | Variable | |
| STOP | Infinity | 6.066 | |
| S24* | −49.612 | 4.500 | PSK53A |
| S25 | 45.951 | 6.491 | FD15 |
| S26 | 149.306 | 8.138 | |
| S27 | −53.675 | 2.556 | PSK53A |
| S28 | −436.714 | 15.264 | FD8 |
| S29 | −53.001 | 30.067 | |
| S30 | 96.369 | 40.439 | S-FPL51 |
| S31 | −47.937 | 4.500 | S-LAH75 |
| S32 | −65.887 | 0.018 | |
| S33 | 314.723 | 4.500 | S-LAH75 |
| S34 | 44.980 | 33.625 | S-FPL53 |
| S35 | −197.211 | 62.647 | |
| S36* | 59.624 | 15.000 | S-FPL53 |
| S37 | −45862.250 | 62.567 | |
| S38 | Infinity | 2.000 | |
| S39 | −250.000 | 2.000 | S-LAH66 |
| S40 | 38.600 | 21.997 | |
| S41 | −42.668 | 3.012 | PBH23W |
| S42 | 78.619 | 20.849 | S-LAL8 |
| S43 | −54.572 | 0.250 | |
| S44 | 701.714 | 11.340 | S-LAL8 |
| S45 | −96.232 | 0.250 | |
| S46 | 153.694 | 14.173 | S-LAL8 |

-continued

|  |  |  |  |
|---|---|---|---|
| S47 | −120.652 | 0.250 | |
| S48 | 57.764 | 24.753 | S-LAM2 |
| S49 | −654.450 | 3.706 | PBH6W |
| S50 | 36.175 | 17.533 | |
| S51 | 126.517 | 2.500 | PBH53W |
| S52 | 123.911 | 5.000 | S-BSM14 |
| S53 | −269.378 | 0.200 | |
| S54 | 119.317 | 5.000 | S-BSM18 |
| S55 | 249.395 | Variable | |
| S56 | 77.473 | 2.500 | S-LAH60 |
| S57 | 24.795 | 8.736 | |
| S58 | −17.880 | 2.000 | S-LAH55 |
| S59 | −73.667 | 1.561 | |
| S60 | −68.965 | 7.000 | PBH53W |
| S61 | −23.620 | 0.200 | |
| S62 | −39.257 | 2.000 | S-LAH65 |
| S63 | −73.267 | Variable | |
| S64* | 40.900 | 24.089 | S-BAL42 |
| S65* | −82.736 | 0.200 | |
| S66 | 68.814 | 3.000 | PBH53W |
| S67 | 33.834 | Variable | |
| S68 | 47.963 | 12.055 | S-BSL7 |
| S69 | −38.097 | 8.000 | PBH6W |
| S70 | −61.203 | Variable | |
| S71 | Infinity | 11.874 | S-BSL7 |
| S72 | Infinity | 14.000 | |
| IMAGE | Infinity | | |

Note:
Maximum image diameter = 11.0 mm
*Surface profiles os aspheric surfaces S7, S10, S24, S36, S64 amd S65 are governed by the following conventional equation:

$$Z = \frac{(CURV)Y^2}{1 + (1 - (1+K)(CURV)^2 Y^2)^{1/2}} + (A)Y^4 + (B)Y^6 + (C)Y^8 + (D)Y^{10} + (E)Y^{12}$$

where:
CURV = 1/(Radius of Surface)
Y = Aperture height, measured perpendicular to optical axis
K, A, B, C, D = Coefficients
Z = Position of surface profile for a given Y value, as measured along the optical axis from the pole (i.e. axial vertex) of the surface.

| The coefficients for the surface S7 are: | |
|---|---|
| K = | −0.01834396 |
| A = | 4.6192051e−009 |
| B = | 2.9277175e−013 |
| C = | −5.3760139e−018 |
| D = | 4.4429222e−022 |
| E = | 0 |
| The coefficients for the surface S10 are: | |
| K = | 0.1385814 |
| A = | −6.1078514e−008 |
| B = | −1.7110958e−012 |
| C = | −1.4298682e−015 |
| D = | −7.3308393e−019 |
| E = | 0 |
| The coefficients for the surface S24 are: | |
| K = | −0.1283323 |
| A = | −2.7157663e−007 |
| B = | 1.4568941e−010 |
| C = | −1.4055959e−012 |
| D = | 9.7130719e−016 |
| E = | 0 |
| The coefficients for the surface S36 are: | |
| K = | 0.009973727 |
| A = | 3.3999271e−008 |
| B = | 1.4717268e−010 |
| C = | −1.0665963e−013 |
| D = | 6.8463872e−017 |
| E = | 0 |

-continued

The coefficients for the surface S64 are:

| | |
|---|---|
| K = | −4.594951 |
| A = | 5.9382510e−006 |
| B = | −4.3333569e−009 |
| C = | −2.6412286e−013 |
| D = | 5.0607811e−015 |
| E = | −3.8443669e−018 |

The coefficients for the surface S65 are:

| | |
|---|---|
| K = | −0.2743554 |
| A = | 1.2036084e−006 |
| B = | 3.8383867e−009 |
| C = | −1.5101902e−011 |
| D = | 2.3291313e−014 |
| E = | −1.3549754e−017 |

Surface profile of binary surface S6 is governed by the following conventional equation:
Added Phase = $A_1 p^2 + A_2 p^4 + A_3 p^6 + A_4 p^8 + A_5 p^{10}$
where:
$A_1, A_2, A_3, A_4$ and $A_5$ are coefficients and p is the normalized radial coordinate at the surface. The normalizing factor is set at unity and the p's become simply radial coordinates.

| | |
|---|---|
| A1 = | −0.0183497 |
| A2 = | 0.1385814 |
| A3 = | −0.1283323 |
| A4 = | 0.0099737 |
| A5 = | −4.5949510 |
| A6 = | −0.2743554 |

VARIABLE THICKNESS POSITIONS AND DATA

| | P1 | P2 | P3 | P4 | P5 | P6 | P7 |
|---|---|---|---|---|---|---|---|
| EFL | 7.471 | 11.746 | 18.475 | 29.059 | 45.676 | 649.701 | 2981.989 |
| F/No. | 1.600 | 1.600 | 1.600 | 1.600 | 1.600 | 6.000 | 18.000 |
| S0 | Infinity | Infinity | Infinity | Infinity | Infinity | Infinity | Infinity |
| S8 | 3.884 | 47.335 | 81.309 | 107.642 | 127.477 | 147.901 | 156.198 |
| S15 | 243.496 | 190.547 | 145.303 | 105.453 | 68.586 | 39.080 | 0.104 |
| S22 | 5.292 | 14.777 | 26.064 | 39.600 | 56.513 | 65.772 | 96.339 |
| S55 | 1.000 | 1.000 | 1.000 | 1.000 | 1.000 | 98.702 | 111.239 |
| S63 | 117.540 | 117.540 | 117.540 | 117.540 | 117.540 | 30.129 | 0.368 |
| S67 | 42.175 | 42.175 | 42.175 | 42.175 | 42.175 | 20.670 | 63.421 |
| S70 | 14.512 | 14.512 | 14.512 | 14.512 | 14.512 | 25.727 | 0.199 |

Figure 71:
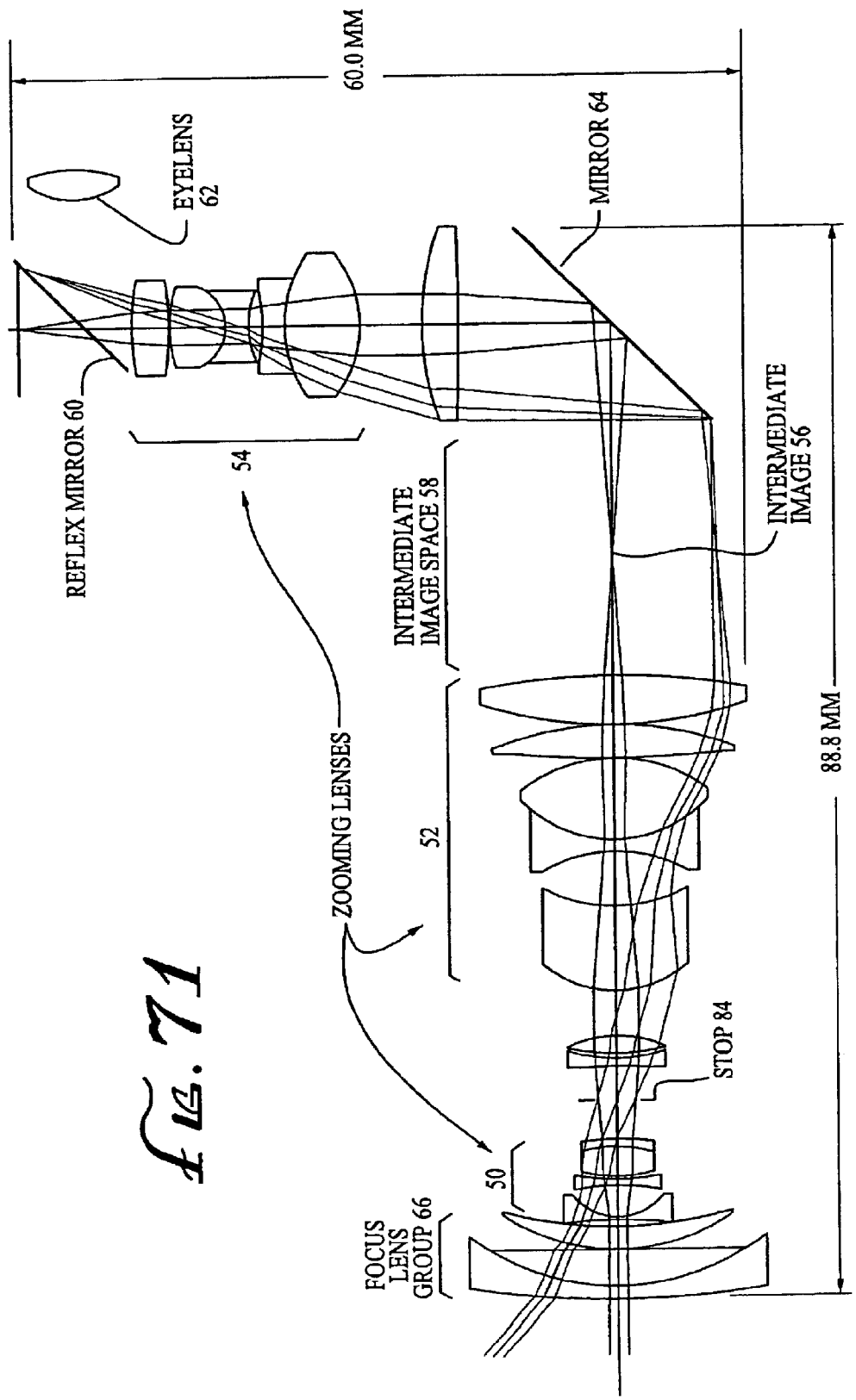

Detailed Description of Folded Lens Embodiment. FIG. 71 is an optical diagram illustrating an example of still another embodiment of the present invention incorporating one or more mirrors for folding the lens for added compactness. The example of FIG. 71 is similar to the previously-described embodiments, with three general zoom groups identified as 50, 52 and 54. An intermediate image is located at 56. The focus group 66 is movable during focusing, but is stationary when the lens is at a constant focus. The aperture stop is located at 84. Unique to the folded zoom lens embodiment of FIG. 71 is a mirror 64 located between the front and rear zoom groups 52 and 54 for "folding" or bending the radiation rays. The embodiment of FIG. 71 may be employed in any camera, but is particularly suited for small cameras such as point-and-shoot handheld cameras because the folded design enables the lens to fit into a smaller space. FIG. 71 illustrates an SLR embodiment containing a reflex mirror 60 and an eyelens 62 for enabling a user to see the image while the reflex mirror 60 is in the position indicated in FIG. 71.

Embodiments of the present invention are particularly suited to folding because mirror 64 may be placed within the intermediate image space 58 in any area that does not interfere with the movement of the zoom groups 52 and 54. In contrast, conventional compact zoom lenses have lens elements that must retract into the body of the camera, which eliminates most or all or the air gaps within the lens and precludes the insertion of a mirror. In the example of FIG. 71, the mirror 64 is located on the image side of the intermediate image 56. However, in other embodiments, the mirror 64 may be located on the object side of the intermediate image 56. It should be understood that other embodiments of the present invention may have multiple folds (mirrors), and that the mirrors need not be oriented at 45 degrees with respect to the optical axis.

The folded lens illustrated in the example of FIG. 71 enables several useful design possibilities and advantages. As mentioned above, the fold in the lens enables the zoom lens to take up less space. Furthermore, the folded zoom lens enables some or all of the lens elements to reside within the body of the camera, further improving compactness. In one embodiment, even the focus lens group 66 may reside entirely within the body of the camera, protecting the lens and making the camera even more compact. In addition, the folded zoom lens enables compact cameras to achieve a zoom ratio of about 10:1 or higher, compared to a maximum of about 4:1 in conventional compact cameras. Moreover, conventional SLR cameras require a bulky pentaprism for flipping the image, and thus compact cameras typically avoid through-the-lens viewing. However, because of the intermediate image 56 and mirrors 64 and 60 in the present invention, the final image is already properly oriented without the need for a bulky pentaprism, and through-the-lens viewing is made possible even in cameras of a compact size.

The exemplary folded zoom lens of FIG. 71 provides an EFL of about 12 mm to 120 mm, a zoom ratio of about 10:1, an "f" number range of about f/3 to f/5 at full aperture and a maximum field of view angle in object space of about 84.1 degrees to 10.3 degrees, and receives radiation within a waveband of at least 486 nm to 588 nm. The image generated by the embodiment of FIG. 71 is about 12 mm in height by about 18 mm in width with a diagonal dimension of about 21.65 mm, which is about half the size of the image in a conventional 35 mm still photography camera.

FIGS. 72A–72D are optical diagrams illustrating the folded zoom lens example embodiment of FIG. 71 at other zoom positions, with the folded lens shown in a flat (unfolded) orientation for clarity and the zoom groups in various exemplary positions. As in FIG. 71, the focus lens group 66 in the example of FIGS. 72A–72D is movable for focusing and stationary at a constant focus, and the mirror 64 and eyelens 62 are also stationary. The aperture stop is located at 84 and is movable during zooming. The zoom lens example of FIGS. 72A–72D is actually comprised of eight moving zoom groups 68, 70, 72, 74, 76, 78, 80 and 82, although it should be understood that other embodiments of the folded zoom lens may include more or fewer zoom groups. The folded zoom lens example of FIGS. 72A–72D utilizes all spherical surfaces, but it should be understood that other embodiments may employ aspheres and/or binary (diffractive) surfaces.

Figure 73A:
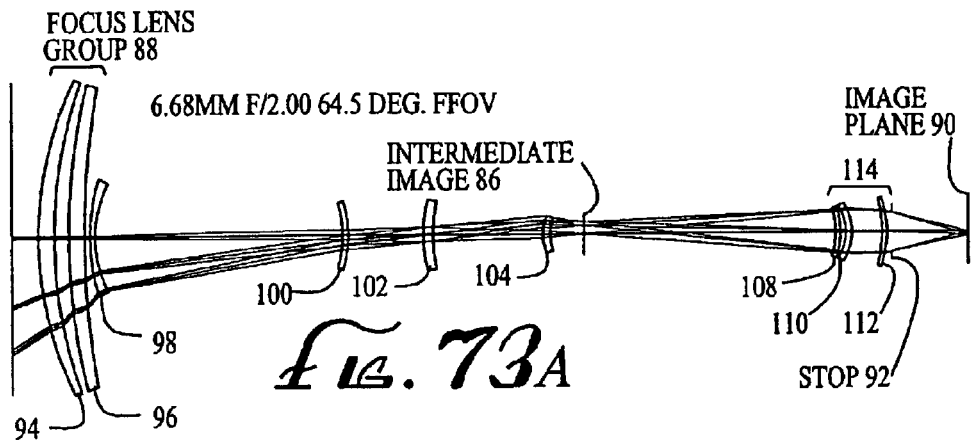
FIGS. 73A–73C are optical diagrams for an example of an infrared (IR) embodiment of the zoom lens system of this invention, illustrating various positions of the zoom groups.
Figure 73B:
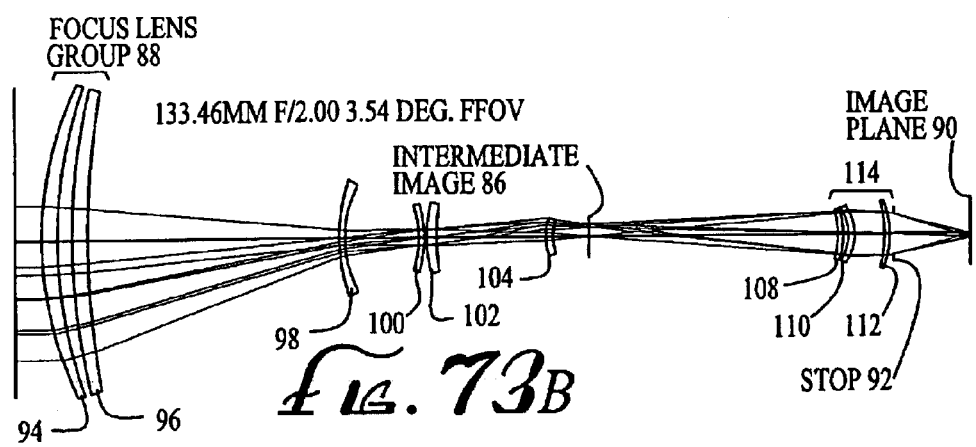
Figure 73C:
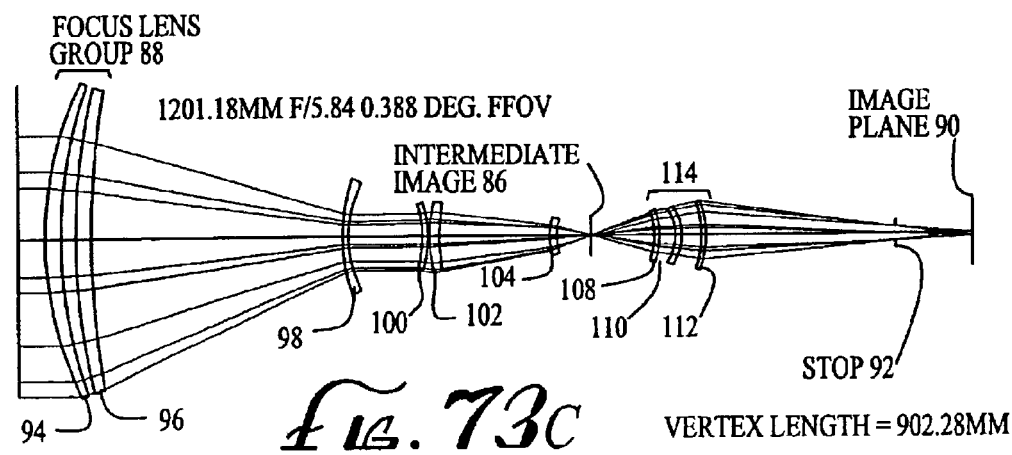

Detailed Description of Infrared Embodiment. FIGS. 73A–73C are optical diagrams for an example of an infrared (IR) embodiment of the zoom lens system of the present invention, illustrating various positions of the zoom groups. The intermediate image is located at 86. The focus group 88 is movable during focusing, but is stationary at a constant focus. The final image plane is located at 90, and the aperture stop is located at 92. The embodiment of FIGS. 73A–73C may be employed in low light and surveillance cameras because the zoom lens system is designed for infrared wavelengths. The example of FIGS. 73A–73C provides an EFL of 6.68 mm to 1201.2 mm, an "f" number range of f/2.00 to f/5.84, an image diagonal of 8.0 mm, a maximum field of view angle in object space of 64.5 degrees to 0.388 degrees, and a vertex length of 902.28 mm. There is a −4.93% distortion at the 6.68 mm focal length position and +0.34% distortion at the 1201.2 mm focal length position. This distortion increases the effective zoom ratio to 190:1. There are a total of nine elements in the example of FIGS. 73A–73C, with six elements (94, 96, 98, 100, 102 and 104) in the zoom kernel 106, and three elements (108, 110 and 112) in the zoom relay 114. Note that the "zoom kernel," as referred to herein, represents all of the elements from object space to the intermediate image, while the "zoom relay," as referred to herein, represents all of the elements from the intermediate image to the final image.

The lens system optical prescription for the IR embodiment of FIGS. 73A–73C is set forth below in the tables generally entitled "Tables for FIGS. 73A, 73B and 73C." The following data in the lens system optical prescription is set forth in the same manner and the legends have the same meanings as in the preceding lens system optical prescriptions.

TABLES FOR FIGS. 73A, 73B AND 73C
LENS SYSTEM OPTICAL PRESCRIPTION

| Surface | Radius | Thickness | Refractive Material |
|---|---|---|---|
| OBJECT | Infinity | Infinity | |
| S1 | Infinity | 25.000 | |
| S2* | 341.091 | 15.000 | GERMANIUM |
| S3# | 442.256 | 14.496 | |
| S4 | 628.089 | 15.000 | ZNSE |
| S5 | 817.176 | Variable | |
| S6* | 191.321 | 5.000 | GERMANIUM |
| S7 | 101.374 | Variable | |
| S8 | −108.986 | 5.000 | GERMANIUM |
| S9 | −133.542 | Variable | |
| S10* | 132.195 | 10.000 | GERMANIUM |
| S11 | 215.451 | 106.451 | |
| S12* | 44.406 | 7.000 | GERMANIUM |
| S13* | 47.364 | Variable | |
| S14* | −146.583 | 5.000 | GERMANIUM |
| S15* | −103.306 | Variable | |
| S16* | −48.015 | 6.000 | ZNSE |
| S17* | −54.690 | Variable | |
| S18* | −134.510 | 5.000 | GERMANIUM |
| S19* | −96.541 | Variable | |
| STOP | Infinity | 74.251 | |
| IMAGE | Infinity | | |

Note:
Maximum image diameter = 8.0 mm
*Surface profiles of aspheric surfaces S2, S6, S10, S12, S13, S14, S15, S16, S17, S18 and S19 are governed by the following conventional equation:

$$Z = \frac{(CURV)Y^2}{1 + (1 - (1+K)(CURV)^2 Y^2)^{1/2}} + (A)Y^4 + (B)Y^6 + (C)Y^8 + (D)Y^{10} + (E)Y^{12} + (F)Y^{14} + (G)Y^{16}$$

where:
CURV = 1/(Radius of Surface)
Y = Aperture height, measured perpendicular to optical axis
K, A, B, C, D = Coefficients
Z = Position of surface profile for a given Y value, as measured along the optical axis from the pole (i.e. axial vertex) of the surface.

The coefficients for the surface S2 are:

| | |
|---|---|
| K = | −0.3170663 |
| A = | 7.1675212e−010 |
| B = | 4.6490286e−015 |
| C = | 3.1509558e−020 |
| D = | −3.0230207e−026 |
| E = | 1.8711604e−043 |
| F = | 7.2023035e−034 |
| G = | −1.6899714e−038 |

The coefficients for the surface S6 are:

| | |
|---|---|
| K = | 0.0000000 |
| A = | 8.8834511e−009 |
| B = | −1.1017434e−012 |
| C = | 4.2407818e−016 |
| D = | −4.5843672e−020 |
| E = | 0 |
| F = | 0 |
| G = | 0 |

The coefficients for the surface S10 are:

| | |
|---|---|
| K = | 0.0000000 |
| A = | −4.1468720e−008 |
| B = | −1.1864804e−012 |
| C = | 1.0375271e−016 |
| D = | 1.4819552e−020 |
| E = | 0 |
| F = | 0 |
| G = | 0 |

-continued

The coefficients for the surface S12 are:

| | |
|---|---|
| K = | 0.1424633 |
| A = | -1.3741884e-008 |
| B = | 2.0574529e-010 |
| C = | 2.2356569e-013 |
| D = | -9.2592205e-016 |
| E = | 0 |
| F = | 0 |
| G = | 0 |

The coefficients for the surface S13 are:

| | |
|---|---|
| K = | 0.1341907 |
| A = | 2.5853953e-007 |
| B = | 6.3040925e-010 |
| C = | -8.9182471e-013 |
| D = | -2.1087914e-016 |
| E = | 0 |
| F = | 0 |
| G = | 0 |

The coefficients for the surface S14 are:

| | |
|---|---|
| K = | 0.0000000 |
| A = | -2.3627230e-006 |
| B = | -3.2069853e-009 |
| C = | 1.9995538e-012 |
| D = | -4.1873811e-015 |
| E = | -4.5598387e-018 |
| F = | 1.5355757e-021 |
| G = | 2.7742963e-025 |

The coefficients for the surface S15 are:

| | |
|---|---|
| K = | 0.0000000 |
| A = | -1.9992749e-006 |
| B = | -2.7451965e-009 |
| C = | 2.5915567e-012 |
| D = | -5.4747396e-015 |
| E = | 1.0432409e-018 |
| F = | -9.7041838e-023 |
| G = | 3.5844261e-025 |

The coefficients for the surface S16 are:

| | |
|---|---|
| K = | 0.0000000 |
| A = | -5.5264489e-007 |
| B = | -3.4855834e-011 |
| C = | -1.5605019e-013 |
| D = | 8.4346229e-016 |
| E = | -2.6930213e-019 |
| F = | 7.0886850e-022 |
| G = | -4.8763355e-025 |

The coefficients for the surface S17 are:

| | |
|---|---|
| K = | 0.0000000 |
| A = | -1.9256081e-007 |
| B = | 9.7560057e-012 |
| C = | -3.1406997e-013 |
| D = | 4.6996712e-016 |
| E = | 4.3471337e-019 |
| F = | -3.7957715e-022 |
| G = | -2.4875152e-026 |

The coefficients for the surface S18 are:

| | |
|---|---|
| K = | 0.0000000 |
| A = | 4.5197079e-007 |
| B = | -4.7688707e-010 |
| C = | -2.2771179e-013 |
| D = | -7.3812375e-016 |
| E = | 6.1621050e-019 |
| F = | -2.9782920e-023 |
| G = | -2.8295343e-026 |

The coefficients for the surface S19 are:

| | |
|---|---|
| K = | 0.0000000 |
| A = | 3.9066750e-007 |
| B = | -2.6768710e-010 |
| C = | -3.7378469e-013 |
| D = | -4.0450877e-016 |
| E = | 3.9230103e-019 |
| F = | -3.7514135e-023 |

-continued

| | |
|---|---|
| G = | -8.0738327e-027 |

Added Phase = $A_1 p^2 + A_2 p^4 + A_3 p^6 + A_4 p^8 + A_5 p^{10}$
where: $A_1, A_2, A_3, A_4$ and $A_5$ are coefficients and p is the normalized radial coordinate at the surface. The normalizing factor is set at unity and the p's become simply radial coordinates.

| | |
|---|---|
| A1 = | -0.0052552326 |
| A2 = | -1.2587653e-008 |
| A3 = | 5.4668365e-013 |
| A4 = | 8.418658e-018 |
| A5 = | 1.3774055e-022 |

VARIABLE THICKNESS POSITIONS AND DATA

| | P1 | P2 | P3 | P4 | P5 | P6 |
|---|---|---|---|---|---|---|
| EFL | 6.677 | 7.583 | 9.331 | 11.805 | 14.069 | 23.805 |
| F/No. | 2.000 | 2.000 | 2.000 | 2.000 | 2.000 | 2.000 |
| S5 | 5.000 | 25.000 | 55.000 | 85.000 | 105.000 | 155.000 |
| S7 | 239.848 | 216.543 | 180.384 | 143.845 | 119.259 | 58.715 |
| S9 | 72.916 | 76.220 | 82.379 | 88.919 | 93.504 | 104.048 |
| S13 | 276.674 | 276.674 | 276.674 | 276.674 | 276.674 | 276.674 |
| S15 | 5.030 | 5.030 | 5.030 | 5.030 | 5.030 | 5.030 |
| S17 | 29.517 | 29.517 | 29.517 | 29.517 | 29.517 | 29.517 |
| S19 | 5.000 | 5.000 | 5.000 | 5.000 | 5.000 | 5.000 |

VARIABLE THICKNESS POSITIONS AND DATA

| | P7 | P8 | P9 | P10 | P11 | P12 |
|---|---|---|---|---|---|---|
| EFL | 48.419 | 84.275 | 133.455 | 175.637 | 231.172 | 304.215 |
| F/No. | 2.000 | 2.000 | 2.000 | 2.300 | 2.900 | 3.400 |
| S5 | 205.000 | 231.305 | 243.545 | 243.545 | 243.545 | 243.545 |
| S7 | 16.543 | 30.757 | 72.218 | 72.218 | 72.218 | 72.218 |
| S9 | 96.221 | 55.701 | 2.000 | 2.000 | 2.000 | 2.000 |
| S13 | 276.674 | 276.674 | 276.674 | 248.444 | 220.313 | 187.659 |
| S15 | 5.030 | 5.030 | 5.030 | 42.180 | 79.972 | 109.931 |
| S17 | 29.517 | 29.517 | 29.517 | 22.953 | 12.626 | 5.000 |
| S19 | 5.000 | 5.000 | 5.000 | 2.644 | 3.310 | 13.631 |

VARIABLE THICKNESS POSITIONS AND DATA

| | P13 | P14 | P15 | P16 | P17 |
|---|---|---|---|---|---|
| EFL | 400.368 | 526.915 | 693.449 | 912.675 | 1201.182 |
| F/No. | 3.500 | 3.800 | 4.600 | 5.300 | 5.840 |
| S5 | 243.545 | 243.545 | 243.545 | 243.545 | 243.545 |
| S7 | 72.218 | 72.218 | 72.218 | 72.218 | 72.218 |
| S9 | 2.000 | 2.000 | 2.000 | 2.000 | 2.000 |
| S13 | 146.432 | 112.380 | 97.552 | 94.304 | 95.940 |
| S15 | 114.831 | 95.642 | 67.311 | 40.305 | 16.014 |
| S17 | 10.137 | 19.763 | 26.212 | 25.615 | 18.454 |
| S19 | 44.821 | 88.436 | 125.146 | 155.997 | 185.814 |

Figure 75:
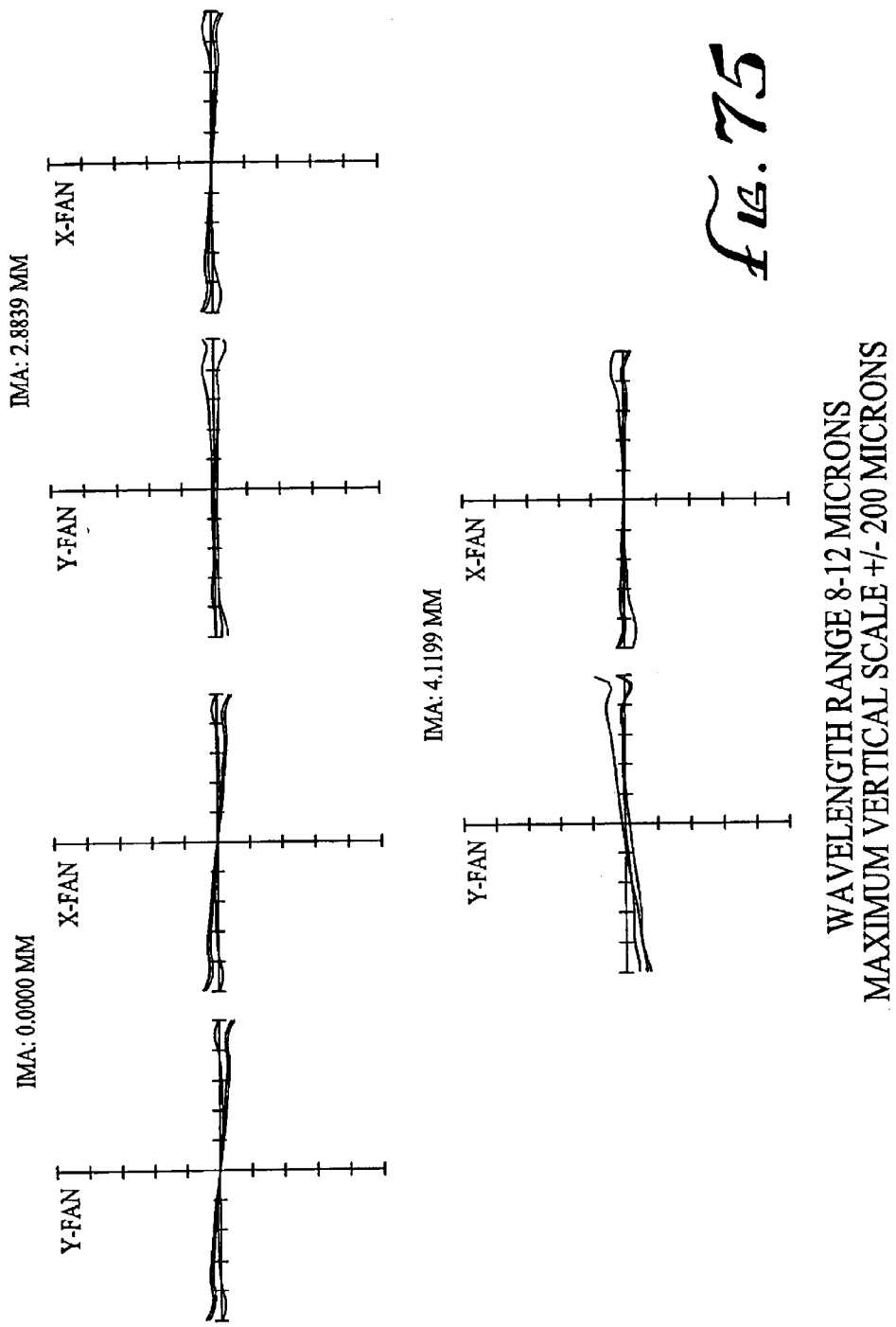
Figure 76:
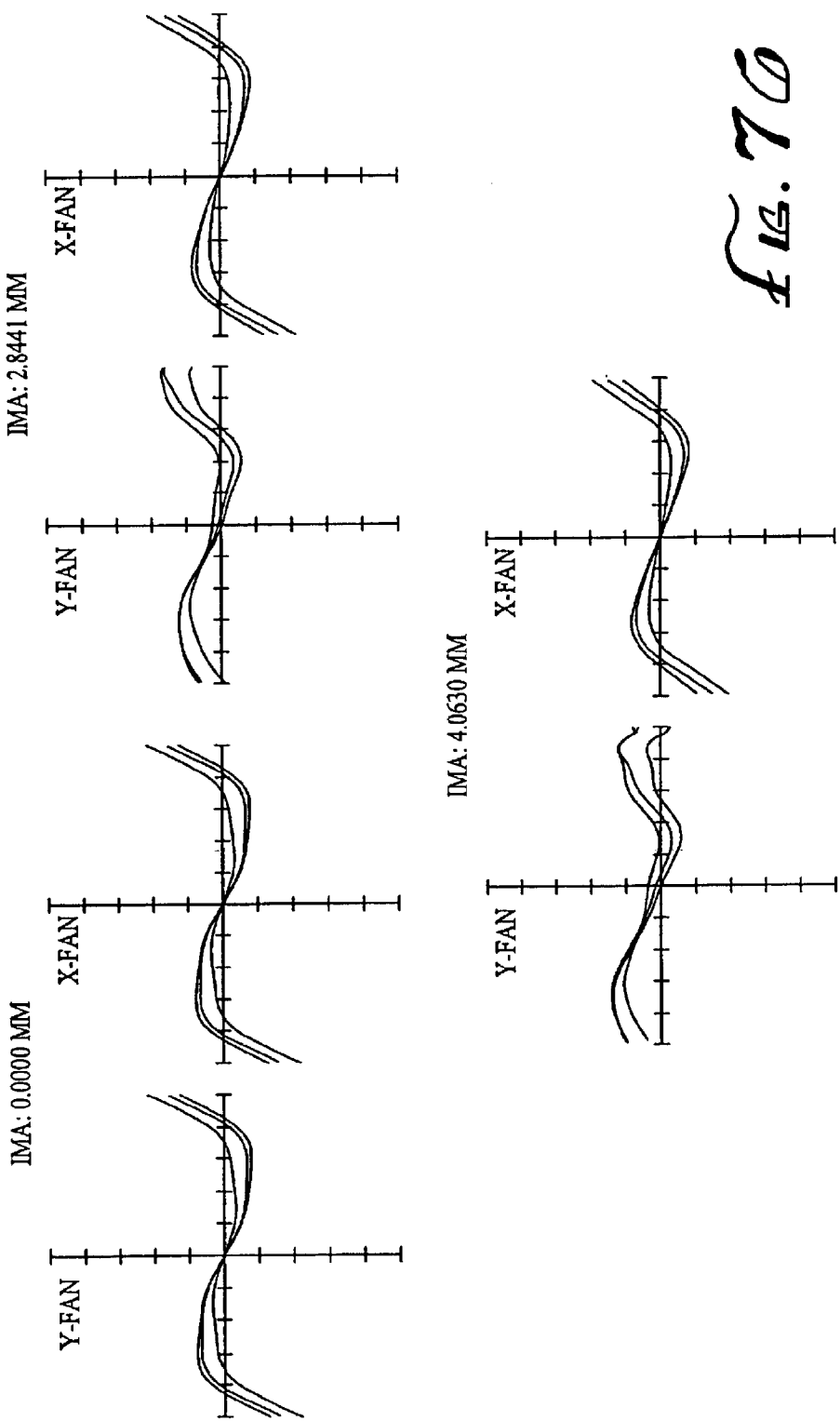

FIGS. 74–76 are ray aberration graphs corresponding to the position of the zoom groups shown in FIGS. 73A–73C, respectively. The ray aberration graphs of FIGS. 74–76 are at paraxial effective focal lengths (EFL) of 6.68 mm, 133.46 mm, and 1201.18 mm, respectively, and a wavelength range of 8–12 microns. The optical diagrams of FIGS. 73A–73C and the ray aberration graphs of FIGS. 74–76 are shown at infinity focus.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A zoom lens system for forming a final image of an object, said system having an object side and an image side and forming a first intermediate real image between the object and the final image, said system comprising in order from the object side to the image side:

a first optical unit including at least two lens elements and located between the object and the first intermediate real image, said unit comprising at least one optical subunit which is moved to change the size (magnification) of the first intermediate real image; and a second optical unit including at least two lens elements and located between the first intermediate real image and the final image, at least a portion of which is moved to change the size (magnification) of the final image;

wherein the zoom lens system has a zoom ratio of at least 10 to 1.

2. The zoom lens system as recited in claim 1, the second optical unit comprising at least one optical subunit, and at least one of the optical subunits is movable to hold an axial position of the final image substantially stationary as the focal length of the system is changed.

3. The zoom lens system as recited in claim 1, wherein the second optical unit comprises at least one optical subunit and at least one of the optical subunits in each of the first and second optical units moves continuously as the focal length of the system is changed.

4. The zoom lens system as recited in claim 1, wherein the second optical unit comprises at least one optical subunit and at least one of the optical subunits in one of the first and second optical units is at least temporarily stationary while at least one of the optical subunits in the other of the first and second optical units moves as the focal length of the system is changed.

5. The zoom lens system as recited in claim 1, wherein:
(a) the second optical unit comprises at least one optical subunit; and
(b) a change in the focal length of the system includes at least one first motion and at least one second motion wherein:
(i) the first motion can precede or follow the second motion;
(ii) for the first motion, at least one optical subunit of the first optical unit moves without movement of any optical subunit of the second optical unit; and
(iii) for the second motion, at least one optical subunit of the second optical unit moves without movement of any optical subunit of the first optical unit.

6. The zoom lens system as recited in claim 5, wherein a change in the focal length of the system includes only a single first motion and a single second motion.

7. The zoom lens system as recited in claim 1, further comprising a focus unit on the object side of the first optical unit for focusing at least one of the intermediate and final images.

8. The zoom lens system as recited in claim 1 wherein the first optical unit comprises an aperture stop and the system further comprises a pupil imaging unit located between the first and second optical units for imaging an exit pupil of the first optical unit to form an entrance pupil of the second optical unit.

9. The zoom lens system as recited in claim 1 wherein the second optical unit comprises an aperture stop and the system further comprises a pupil imaging unit located between the first and second optical units for imaging an entrance pupil of the second optical unit to form an exit pupil of the first optical unit.

10. The zoom lens system as recited in claim 1, further comprising an image stabilization unit on the image side of the second optical unit for stabilizing the final image.

11. The zoom lens system as recited in claim 7, the focus unit comprising two optical subunits that are movable along the optical axis of the zoom lens system.

12. The zoom lens system as recited in claim 11, wherein the optical axis is straight.

13. The zoom lens system as recited in claim 7, the focus unit comprising seven or fewer lens elements.

14. The zoom lens system as recited in claim 10, the image stabilization unit comprising at least one lens element that is laterally movable off the optical axis of the zoom lens system.

15. The zoom lens system as recited in claim 10, the image stabilization unit comprising at least one lens element that is axially movable along the optical axis of the zoom lens system.

16. The zoom lens system as recited in claim 10, the image stabilization unit comprising at least one laterally movable lens element that is laterally movable off the optical axis of the zoom lens system and at least one axially movable lens element that is axially movable along the optical axis, the at least one laterally movable lens element separated from the at least one axially movable lens element by an air gap, wherein radiation from the object and passing through the air gap is substantially collimated.

17. The zoom lens system as recited in claim 14, wherein radiation from the object and passing through the system is substantially collimated at the at least one laterally movable lens element.

18. The zoom lens system as recited in claim 15, wherein radiation from the object and passing through the system is substantially collimated at the at least one axially movable lens element.

19. The zoom lens system as recited in claim 1, wherein one or more additional intermediate real images are formed between the object and the final image.

20. The zoom lens system as recited in claim 19, further comprising one or more additional optical units for changing the size (magnification) of the one or more additional intermediate real images.

21. The zoom lens system as recited in claim 1, wherein the first intermediate real image is formed in an air space between optical elements in the zoom lens system and remains in the air space during zooming.

22. The zoom lens system as recited in claim 19, wherein the one or more additional intermediate real images are formed in one or more air spaces between optical elements in the zoom lens system and remain in the one or more air spaces during zooming.

23. The zoom lens system of claim 1 wherein the system comprises at least one aspheric optical surface.

24. The zoom lens system of claim 1 wherein the system comprises at least one diffractive optical surface.

25. The zoom lens system of claim 1 wherein the system comprises at least one aspheric optical surface and at least one diffractive optical surface.

26. A zoom lens system for forniing a final image of an object, said system forming a first intermediate real image between the object and the final image, said system comprising compounded first and second zoom lenses wherein the compounded first and second zoom lenses have controlled pupil imaging with respect to one another and wherein the zoom lens system has a zoom ratio of at least 10 to 1.

27. The zoom lens system as recited in claim 26, wherein at least a portion of each of the first and second zoom lenses moves continuously as the focal length of the system is changed.

28. The zoom lens system as recited in claim 26, wherein at least a portion of one of the first and second zoom lenses is at least temporarily stationary while at least a portion of the other of the first and second zoom lenses moves as the focal length of the system is changed.

29. The zoom lens system as recited in claim 26, wherein a change in the focal length of the system includes at least one first motion and at least one second motion wherein:
 (a) the first motion can precede or follow the second motion;
 (b) for the first motion, only the first zoom lens changes the focal length of the system; and
 (c) for the second motion, only the second zoom lens changes the focal length of the system.

30. The zoom lens system as recited in claim 29, wherein a change in the focal length of the system includes only a single first motion and a single second motion.

31. A zoom lens system for forming a final image of an object, said system having an object side and an image side and comprising in order from the object side to the image side:
 a zoom lens that forms an intermediate real image; and
 a variable focal length relay system that receives the intermediate real image and changes its magnification to form the final image;
 wherein the zoom lens system has a zoom ratio of at least 10 to 1.

32. The zoom lens system as recited in claim 31, wherein at least a portion of each of the zoom lens and the relay system moves continuously as the focal length of the system is changed.

33. The zoom lens system as recited in claim 31, wherein at least a portion of one of the zoom lens and the relay system is at least temporarily stationary while at least a portion of the other of the zoom lens and the relay system moves as the focal length of the system is changed.

34. The zoom lens system as recited in claim 31, wherein a change in the focal length of the system includes at least one first motion and at least one second motion wherein:
 (a) the first motion can precede or follow the second motion;
 (b) for the first motion, only the zoom lens changes the focal length of the system; and
 (c) for the second motion, only the relay system changes the focal length of the system.

35. The zoom lens system as recited in claim 34, wherein a change in the focal length of the system includes only a single first motion and a single second motion.

36. A zoom lens system for forming a final image of an object, the zoom lens system having a range of focal lengths between a maximum focal length and a minimum focal length and forming at least a first intermediate real image between the object and the final image for all focal lengths within the range of focal lengths, the zoom lens system having an object side and an image side and comprising in order from the object side to the image side:
 a first lens unit having a focal length that is changed to change the size (magnification) of the first intermediate real image, the first lens unit being located between the object and the first intermediate real image; and
 a second lens unit for changing the size (magnification) of the final image, the second lens unit being located between the first intermediate real image and the final image;
 wherein the zoom lens system has a zoom ratio of at least 10 to 1.

37. The zoom lens system as recited in claim 36, wherein at least a portion of each of the first and second lens units moves continuously as the focal length of the system is changed.

38. The zoom lens system as recited in claim 36, wherein at least a portion of one of the first and second lens units is at least temporarily stationary while at least a portion of the other of the first and second lens units moves as the focal length of the system is changed.

39. The zoom lens system as recited in claim 36, wherein a change in the focal length of the system includes at least one first motion and at least one second motion wherein:
 (a) the first motion can precede or follow the second motion;
 (b) for the first motion, only the first lens unit changes the focal length of the system; and
 (c) for the second motion, only the second lens unit changes the focal length of the system.

40. The zoom lens system as recited in claim 39, wherein a change in the focal length of the system includes only a single first motion and a single second motion.

41. A zoom lens system having an object side and an image side and comprising in order from the object side to the image side:
 a variable focal length lens unit that forms an intermediate real image of an object; and
 a variable focal length lens unit that forms a real image of the intermediate real image;
 wherein the zoom lens system has a zoom ratio of at least 10 to 1.

42. The zoom lens system as recited in claim 41, wherein at least a portion of each of the variable focal length lens units moves continuously as the focal length of the system is changed.

43. The zoom lens system as recited in claim 41, wherein at least a portion of one of one of the variable focal length lens units is at least temporarily stationary while at least a portion of the other of the variable focal length lens units moves as the focal length of the system is changed.

44. The zoom lens system as recited in claim 41, wherein a change in the focal length of the system includes at least one first motion and at least one second motion wherein:
 (a) the first motion can precede or follow the second motion;
 (b) for the first motion, only th&. variable focal length lens unit that forms the intermediate real image changes the focal length of the system; and
 (c) for the second motion, only the variable focal length lens unit that forms a real image of the intermediate real image changes the focal length of the system.

45. The zoom lens system as recited in claim 44, wherein a change in the focal length of the system includes only a single first motion and a single second motion.

46. A compound zoom lens system for collecting radiation from an object and delivering the radiation to a sensor, said system comprising multiple zoom lens portions including a first zoom lens portion nearest to the object for forming an intermediate image of the object and a last zoom lens portion nearest to the sensor for delivering radiation from the intermediate image to the sensor, wherein the compound zoom lens system has a zoom ratio of at least 10 to 1.

47. The compound zoom lens system as recited in claim 46, wherein at least a portion of each of the first and last zoom lens portions moves continuously as the focal length of the system is changed.

48. The compound zoom lens system as recited in claim 46, wherein at least a portion of one of the first and last zoom lens portions is at least temporarily stationary while at least a portion of the other of the first and last zoom lens portions moves as the focal length of the system is changed.

49. The compound zoom lens system as recited in claim 46, wherein a change in the focal length of the system includes at least one first motion and at least one second motion wherein:
(a) the first motion can precede or follow the second motion;
(b) for the first motion, only the first zoom lens portion changes the focal length of the system; and
(c) for the second motion, only the last zoom lens portion changes the focal length of the system.

50. The compound zoom lens system as recited in claim 49, wherein a change in the focal length of the system includes only a single first motion and a single second motion.

51. The compound zoom lens system as recited in claim 46 wherein the multiple zoom lens portions include only the first zoom lens portion and the last zoom lens portion.

52. A zoom lens system for forming a final image of an object, said system having a variable focal length, an optical axis, an aperture stop, and a chief ray that crosses the optical axis at the aperture stop, said system comprising:
two lens units for changing the focal length of the system and for forming the final image, one of the units having a variable focal length and the other unit having at least a portion that is moveable;
wherein the chief ray crosses the optical axis at at least one other location besides said aperture stop for all focal lengths of the system;
wherein the system forms an intermediate real image that is located between the two lens units for all focal lengths of the system; and
wherein the zoom lens system has a zoom ratio of at least 10 to 1.

53. The zoom lens system as recited in claim 52, wherein the optical axis is straight.

54. The zoom lens system as recited in claim 52, wherein the system has a lens surface closest to the object and the at least one other location at which the chief ray crosses the optical axis is between said lens surface and the final image for all focal lengths of the system.

55. The zoom lens systems recited in claim 52, wherein at least a portion of each of the two lens units moves continuously as the focal length of the system is changed.

56. The zoom lens system as recited in claim 52, wherein at least a portion of one of the two lens units is at least temporarily stationary while at least a portion of the other of the two lens units moves as the focal length of the system is changed.

57. The zoom lens system as recited in claim 52, wherein a change in the focal length of the system includes at least one first motion and at least one second motion wherein:
(a) the first motion can precede or follow the second motion;
(b) for the first motion, only the lens unit having a variable focal length changes the focal length of the system; and
(c) for the second motion, only the lens unit having at least a portion that is moveable changes the focal length of the system.

58. The zoom lens system as recited in claim 57, wherein the change in the focal length of the system includes only a single first motion and a single second motion.

59. A zoom lens system comprising:
a zoom kernel for forming an intermediate real image; and
a zoom relay that zooms for magnifying the intermediate real image to form a final image;
wherein the zoom lens system has a zoom ratio of at least 10 to 1.

60. The zoom lens system as recited in claim 59, wherein at least a portion of each of the zoom kernel and the zoom relay moves continuously as the focal length of the system is changed.

61. The zoom lens system as recited in claim 59, wherein at least a portion of one of the zoom kernel and the zoom relay is at least temporarily stationary while at least a portion of the other of the zoom kernel and the zoom relay moves as the focal length of the system is changed.

62. The zoom lens system as recited in claim 59, wherein a change in the focal length of the system includes at least one first motion and at least one second motion wherein:
(a) the first motion can precede or follow the second motion;
(b) for the first motion, only the zoom kernel changes the focal length of the system; and
(c) for the second motion, only the zoom relay changes the focal length of the system.

63. The zoom lens system as recited in claim 62, wherein a change in the focal length of the system includes only a single first motion and a single second motion.

64. The zoom lens system as recited in claim 59, the zoom kernel comprising a zoom lens having a +−++ construction.

65. The zoom lens system as recited in claim 59, the zoom kernel comprising a zoom lens having a +−−+ construction.

66. The zoom lens system as recited in claim 59, the zoom kernel comprising a zoom lens having a −+ construction.

67. The zoom lens system as recited in claim 59, the zoom kernel comprising a zoom lens having a −++ construction.

68. The zoom lens system as recited in claim 59, the zoom kernel comprising a zoom lens having a −+−+ construction.

69. The zoom lens system as recited in claim 59, the zoom relay comprising a zoom lens having a +−++ construction.

70. The zoom lens system as recited in claim 59, the zoom relay comprising a zoom lens having a +−+ construction.

71. The zoom lens system as recited in claim 59, the zoom relay comprising a zoom lens having a −+ construction.

72. The zoom lens system as recited in claim 59, the zoom kernel comprising a first lens unit for focusing at least one of the intermediate and final images.

73. The zoom lens system as recited in claim 72, wherein internal motions within the first lens unit are used to contribute to the correction of focus breathing.

74. The zoom lens system as recited in claim 59, wherein the system comprises one or more lens elements each with at least one aspheric surface for contributing to the correction of at least one of distortion and spherical aberration.

75. The zoom lens system as recited in claim 59, wherein the system comprises one or more fluor crown glass or calcium fluoride lens elements for contributing to the correction of color aberrations.

76. The zoom lens system as recited in claim 59, wherein the system comprises one or more lens elements having a diffractive surface for contributing to the correction of color aberrations.

77. A zoom lens system having a first lens unit that forms a real intermediate image and a second lens unit that forms a second image of the real intermediate image, said zoom lens system having a zoom ratio of at least 120 to 1.

78. The zoom lens system as recited in claim 77 wherein the zoom ratio is at least 200 to 1.

79. A zoom lens system for forming a final image of an object, said system having an object side and an image side and forming a first intermediate real image between the object and the final image, said system comprising in order from the object side to the image side:

a first optical unit including at least two lens elements and located between the object and the first intermediate real image, said unit comprising at least one optical subunit which is moved to change the size (magnification) of the first intermediate real image; and a second optical unit including at least two lens elements and located between the first intermediate real image and the final image, at least a portion of which is moved to change the size (magnification) of the final image;

wherein the optical subunit whose movement serves as the primary source of magnification change for the first optical unit has a negative power.

80. The zoom lens system as recited in claim 79, wherein the system has a zoom ratio of at least 10 to 1.

81. The zoom lens system as recited in claim 79, the second optical unit comprising at least one optical subunit, and at least one of the optical subunits is movable to hold an axial position of the final image substantially stationary as the focal length of the system is changed.

82. The zoom lens system as recited in claim 79, wherein the second optical unit comprises at least one optical subunit and at least one of the optical subunits in each of the first and second optical units moves continuously as the focal length of the system is changed.

83. The zoom lens system as recited in claim 79, wherein the second optical unit comprises at least one optical subunit and at least one of the optical subunits in one of the first and second optical units is at least temporarily stationary while at least one of the optical subunits in the other of the first and second optical units moves as the focal length of the system is changed.

84. The zoom lens system as recited in claim 79, wherein:
  (a) the second optical unit comprises at least one optical subunit; and
  (b) a change in the focal length of the system includes at least one first motion and at least one second motion wherein:
    (i) the first motion can precede or follow the second motion;
    (ii) for the first motion, at least one optical subunit of the first optical unit moves without movement of any optical subunit of the second optical unit; and
    (iii) for the second motion, at least one optical subunit of the second optical unit moves without movement of any optical subunit of the first optical unit.

85. The zoom lens system as recited in claim 84, wherein a change in the focal length of the system includes only a single first motion and a single second motion.

86. The zoom lens system as recited in claim 79, further comprising a focus unit on the object side of the first optical unit for focusing at least one of the intermediate and final images.

87. The zoom lens system as recited in claim 79 wherein the first optical unit comprises an aperture stop and the system further comprises a pupil imaging unit located between the first and second optical units for imaging an exit pupil of the first optical unit to form an entrance pupil of the second optical unit.

88. The zoom lens system as recited in claim 79 wherein the second optical unit comprises an aperture stop and the system further comprises a pupil imaging unit located between the first and second optical units for imaging an entrance pupil of the second optical unit to form an exit pupil of the first optical unit.

89. The zoom lens system as recited in claim 79, further comprising an image stabilization unit on the image side of the second optical unit for stabilizing the final image.

90. The zoom lens system as recited in claim 86, the focus unit comprising two optical subunits that are movable along the optical axis of the zoom lens system.

91. The zoom lens system as recited in claim 90, wherein the optical axis is straight.

92. The zoom lens system as recited in claim 86, the focus unit comprising seven or fewer lens elements.

93. The zoom lens system as recited in claim 89, the image stabilization unit comprising at least one lens element that is laterally movable off the optical axis of the zoom lens system.

94. The zoom lens system as recited in claim 89, the image stabilization unit comprising at least one lens element that is axially movable along the optical axis of the zoom lens system.

95. The zoom lens system as recited in claim 89, the image stabilization unit comprising at least one laterally movable lens element that is laterally movable of the optical axis of the zoom lens system and at least one axially movable lens element that is axially movable along the optical axis, the at least one laterally movable lens element separated from the at least one axially movable lens element by an air gap, wherein radiation from the object and passing through the air gap is substantially collimated.

96. The zoom lens system as recited in claim 93, wherein radiation from the object and passing through the system is substantially collimated at the at least one laterally movable lens element.

97. The zoom lens system as recited in claim 94, wherein radiation from the object and passing through the system is substantially collimated at the at least one axially movable lens element.

98. The zoom lens system as recited in claim 79, wherein one or more additional intermediate real images are formed between the object and the final image.

99. The zoom lens system as recited in claim 98, further comprising, one or more additional optical units for changing the size (magnification) of the one or more additional intermediate real images.

100. The zoom lens system as recited in claim 79, wherein the first intermediate real image is formed in an air space between optical elements in the zoom lens system and remains in the air space during zooming.

101. The zoom lens system as recited in claim 98, wherein the one or more additional intermediate real images are formed in one or more air spaces between optical elements in the zoom lens system and remain in the one or more air spaces during zooming.

102. The zoom lens system of claim 79 wherein the system comprises at least one aspheric optical surface.

103. The zoom lens system of claim 79 wherein the system comprises at least one diffractive optical surface.

104. The zoom lens system of claim 79 wherein the system comprises at least one aspheric optical surface and at least one diffractive optical surface.

105. A zoom lens system for forming a final image of an object, said system forming a first intermediate real image between the object and the final image, said system comprising compounded first and second zoom lenses wherein the compounded first and second zoom lenses have controlled pupil imaging with respect to one another and wherein (i) the first of the compounded zoom lenses comprises an optical unit which has a negative power and (ii) movement of said optical unit serves as the primary source of magnification change for said first of the compounded zoom lenses.

106. The zoom lens system as recited in claim 105, wherein the system has a zoom ratio of at least 10 to 1.

107. The zoom lens system as recited in claim 105, wherein at least a portion of each of the first and second zoom lenses moves continuously as the focal length of the system is changed.

108. The zoom lens system as recited in claim 105, wherein at least a portion of one of the first and second zoom lenses is at least temporarily stationary while at least a portion of the other of the first and second zoom lenses moves as the focal length of the system is changed.

109. The zoom lens system as recited in claim 105, wherein a change in the focal length of the system includes at least one first motion and at least one second motion wherein:
 (a) the first motion can precede or follow the second motion;
 (b) for the first motion, only the first zoom lens changes the focal length of the system; and
 (c) for the second motion, only the second zoom lens changes the focal length of the system.

110. The zoom lens system as recited in claim 109, wherein a change in the focal length of the system includes only a single first motion and a single second motion.

111. A zoom lens system for forming a final image of an object, said system having an object side and an image side and comprising in order from the object side to the image side:
 a zoom lens that forms an intermediate real image; and
 a variable focal length relay system that receives the intermediate real image and changes its magnification to form the final image;
 wherein (i) the zoom lens that forms an intermediate real image comprises an optical unit which has a negative power and (ii) movement of said optical unit serves as the primary source of magnification change for said zoom lens that forms an intermediate real image.

112. The zoom lens system as recited in claim 111, wherein the system has a zoom ratio of at least 10 to 1.

113. The zoom lens system as recited in claim 111, wherein at least a portion of each of the zoom lens and the relay system moves continuously as the focal length of the system is changed.

114. The zoom lens system as recited in claim 111, wherein at least a portion of one of the zoom lens and the relay system is at least temporarily stationary while at least a portion of the other of the zoom lens and the relay system moves as the focal length of the system is changed.

115. The zoom lens system as recited in claim 111, wherein a change in the focal length of the system includes at least one first motion and at least one second motion wherein:
 (a) the first motion can precede or follow the second motion;
 (b) for the first motion, only the zoom lens changes the focal length of the system; and
 (c) for the second motion, only the relay system changes the focal length of the system.

116. The zoom lens system as recited in claim 115, wherein a change in the focal length of the system includes only a single first motion and a single second motion.

117. A zoom lens system for forming a final image of an object, the zoom lens system having a range of focal lengths between a maximum focal length and a minimum focal length and forming at least a first intermediate real image between the object and the final image for all focal lengths within the range of focal lengths, the zoom lens system having an object side and an image side and comprising in order from the object side to the image side:
 a first lens unit having a focal length that is changed to change the size (magnification) of the first intermediate real image, the first lens unit being located between the object and the first intermediate real image; and
 a second lens unit for changing the size (magnification) of the final image, the second lens unit being located between the first intermediate real image and the final image;
 wherein (i) the first lens unit comprises an optical subunit which has a negative power and (ii) movement of said optical subunit serves as the primary source of magnification change for said first lens unit.

118. The zoom lens system as recited in claim 117, wherein the system has a zoom ratio of at least 10 to 1.

119. The zoom lens system as recited in claim 117, wherein at least a portion of each of the first and second lens units moves continuously as the focal length of the system is changed.

120. The zoom lens system as recited in claim 117, wherein at least a portion of one of the first and second lens units is at least temporarily stationary while at least a portion of the other of the first and second lens units moves as the focal length of the system is changed.

121. The zoom lens system as recited in claim 117, wherein a change in the focal length of the system includes at least one first motion and at least one second motion wherein:
 (a) the first motion can precede or follow the second motion;
 (b) for the first motion, only the first lens unit changes the focal length of the system; and
 (c) for the second motion, only the second lens unit changes the focal length of the system.

122. The zoom lens system as recited in claim 121, wherein a change in the focal length of the system includes only a single first motion and a single second motion.

123. A zoom lens system having an object side and an image side and comprising in order from the object side to the image side:
 a variable focal length lens unit that forms an intermediate real image of an object; and
 a variable focal length lens unit that forms a real image of the intermediate real image;
 wherein (i) the variable focal length lens unit that forms the intermediate real image comprises an optical subunit which has a negative power and (ii) movement of said optical subunit serves as the primary source of magnification change for said variable focal length lens unit that forms the intermediate real image.

124. The zoom lens system as recited in claim 123, wherein the system has a zoom ratio of at least 10 to 1.

125. The zoom lens system as recited in claim 123, wherein at least a portion of each of the variable focal length lens units moves continuously as the focal length of the system is changed.

126. The zoom lens system as recited in claim 123, wherein at least a portion of one of one of the variable focal length lens units is at least temporarily stationary while at least a portion of the other of the variable focal length lens units moves as the focal length of the system is changed.

127. The zoom lens system as recited in claim 123, wherein a change in the focal length of the system includes at least one first motion and at least one second motion wherein:
 (a) the first motion can precede or follow the second motion;

(b) for the first motion, only the variable focal length lens unit that forms the intermediate real image changes the focal length of the system; and (c) for the second motion, only the variable focal length lens unit that forms a real image of the intermediate real image changes the focal length of the system.

128. The zoom lens system as recited in claim 127, wherein a change in the focal length of the system includes only a single first motion and a single second motion.

129. A compound zoom lens system for collecting radiation from an object and delivering the radiation to a sensor, said system comprising multiple zoom lens portions including a first zoom lens portion nearest to the object for forming an intermediate image of the object and a last zoom lens portion nearest to the sensor for delivering radiation from the intermediate image to the sensor, wherein (i) the first zoom lens portion comprises an optical unit which has a negative power and (ii) movement of said optical unit serves as the primary source of magnification change for said first zoom lens portion.

130. The compound zoom lens system as recited in claim 129, wherein the system has a zoom ratio of at least 10 to 1.

131. The compound zoom lens system as recited in claim 129, wherein at least a portion of each of the first and last zoom lens portions moves continuously as the focal length of the system is changed.

132. The compound zoom lens system as recited in claim 129, wherein at least a portion of one of the first and last zoom lens portions is at least temporarily stationary while at least a portion of the other of the first and last zoom lens portions moves as the focal length of the system is changed.

133. The compound zoom lens system as recited in claim 129, wherein a change in the focal length of the system includes at least one first motion and at least one second motion wherein:

(a) the first motion can precede or follow the second motion;

(b) for the first motion, only the first zoom lens portion changes the focal length of the system; and (c) for the second motion, only the last zoom lens portion changes the focal length of the system.

134. The compound zoom lens system as recited in claim 133, wherein a change in the focal length of the system includes only a single first motion and a single second motion.

135. The compound zoom lens system as recited in claim 129 wherein the multiple zoom lens portions include only the first zoom lens portion and the last zoom lens portion.

136. A zoom lens system for forming a final image of an object, said system having a variable focal length, an optical axis, an aperture stop, and a chief ray that crosses the optical axis at the aperture stop, said system comprising:

two lens units for changing the focal length of the system and for forming the final image, one of the units having a variable focal length and the other unit having at least a portion that is moveable;

wherein the chief ray crosses the optical axis at at least one other location besides said aperture stop for all focal lengths of the system;

wherein the system forms an intermediate real image that is located between the two lens units for all focal lengths of the system; and wherein (i) the unit that has a variable focal length comprises an optical subunit which has a negative power and (ii) movement of said optical subunit serves as the primary source of magnification change for said lens unit that has a variable focal length.

137. The zoom lens system as recited in claim 136, wherein the system has a zoom ratio of at least 10 to 1.

138. The zoom lens system as recited in claim 136, wherein the optical axis is straight.

139. The zoom lens system as recited in claim 136, wherein the system has a lens surface closest to the object and the at least one other location at which the chief ray crosses the optical axis is between said lens surface and the final image for all focal lengths of the system.

140. The zoom lens system as recited in claim 136, wherein at least a portion of each of the two lens units moves continuously as the focal length of the system is changed.

141. The zoom lens system as recited in claim 136, wherein at least a portion of one of the two lens units is at least temporarily stationary while at least a portion of the other of the two lens units moves as the focal length of the system is changed.

142. The zoom lens system as recited in claim 136, wherein a change in the focal length of the system includes at least one first motion and at least one second motion wherein:

(a) the first motion can precede or follow the second motion;

(b) for the first motion, only the lens unit having a variable focal length changes the focal length of the system; and (c) for the second motion, only the lens unit having at least a portion that is moveable changes the focal length of the system.

143. The zoom lens system as recited in claim 142, wherein the change in the focal length of the system includes only a single first motion and a single second motion.

144. A zoom lens system comprising:

a zoom kernel for forming an intermediate real image; and a zoom relay that zooms for magnifying the intermediate real image to form a final image;

wherein (i) the zoom kernel comprises an optical unit which has a negative power and (ii) movement of said optical unit serves as the primary source of magnification change for said zoom kernel.

145. The zoom lens system as recited in claim 144, wherein the system has a zoom ratio of at least 10 to 1.

146. The zoom lens system as recited in claim 144, wherein at least a portion of each of the zoom kernel and the zoom relay moves continuously as the focal length of the system is changed.

147. The zoom lens system as recited in claim 144, wherein at least a portion of one of the zoom kernel and the zoom relay is at least temporarily stationary while at least a portion of the other of the zoom kernel and the zoom relay moves as the focal length of the system is changed.

148. The zoom lens system as recited in claim 144, wherein a change in the focal length of the system includes at least one first motion and at least one second motion wherein:

(a) the first motion can precede or follow the second motion;

(b) for the first motion, only the zoom kernel changes the focal length of the system; and (c) for the second motion, only the zoom relay changes the focal length of the system.

149. The zoom lens system as recited in claim 148, wherein a change in the focal length of the system includes only a single first motion and a single second motion.

150. The zoom lens system as recited in claim 144, the zoom kernel comprising a zoom lens having a +−++ construction.

151. The zoom lens system as recited in claim 144, the zoom kernel comprising a zoom lens having a +--+ construction.

152. The zoom lens system as recited in claim 144, the zoom relay comprising a zoom lens having a +-++ construction.

153. The zoom lens system as recited in claim 144, the zoom relay comprising a zoom lens having a +-+ construction.

154. The zoom lens system as recited in claim 144, the zoom relay comprising a zoom lens having a -+ construction.

155. The zoom lens system as recited in claim 144, the zoom kernel comprising a first lens unit for focusing at least one of the intermediate and final images.

156. The zoom lens system as recited in claim 155, wherein internal motions within the first lens unit are used to contribute to the correction of focus breathing.

157. The zoom lens system as recited in claim 144, wherein the system comprises one or more lens elements each with at least one aspheric surface for contributing to the correction of at least one of distortion and spherical aberration.

158. The zoom lens system as recited in claim 144, wherein the system comprises one or more fluor crown glass or calcium fluoride lens elements for contributing to the correction of color aberrations.

159. The zoom lens system as recited in claim 144, wherein the system comprises one or more lens elements having a diffractive surface for contributing to the correction of color aberrations.

160. A zoom lens system having a first lens unit that forms a real intermediate image and a second lens unit that forms a second image of the real intermediate image, said zoom lens system having a zoom ratio of at least 120 to 1, wherein (i) the first lens unit comprises an optical subunit which has a negative power and (ii) movement of said optical subunit serves as the primary source of magnification change for said first lens unit.

161. The zoom lens system as recited in claim 160 wherein the zoom ratio is at least 200 to 1.

* * * * *